US012613950B2

(12) United States Patent
Koh et al.

(10) Patent No.: US 12,613,950 B2
(45) Date of Patent: Apr. 28, 2026

(54) ELECTRONIC DEVICE, AND USER INTERFACE METHOD USING BIOMETRIC RECOGNITION IN ELECTRONIC DEVICE

(71) Applicant: Samsung Electronics Co., Ltd., Suwon-si (KR)

(72) Inventors: Sanghyuk Koh, Suwon-si (KR); Minsoo Kim, Suwon-si (KR); Juyeoung Kim, Suwon-si (KR); Seonkeun Park, Suwon-si (KR); Sunghoon Lee, Suwon-si (KR); Jaewoong Chung, Suwon-si (KR); Hanchul Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 47 days.

(21) Appl. No.: 18/643,472

(22) Filed: Apr. 23, 2024

(65) Prior Publication Data

US 2024/0273174 A1      Aug. 15, 2024

Related U.S. Application Data

(63) Continuation of application No. PCT/KR2022/016476, filed on Oct. 26, 2022.

(30) Foreign Application Priority Data

Oct. 26, 2021    (KR) ........................ 10-2021-0143268
Mar. 23, 2022    (KR) ........................ 10-2022-0035992

(51) Int. Cl.
　　*G06F 21/32*　　　(2013.01)
　　*G06F 3/0482*　　　(2013.01)
　　　　　(Continued)

(52) U.S. Cl.
　　CPC ............ *G06F 21/32* (2013.01); *G06F 3/0482* (2013.01); *G06V 40/1365* (2022.01); *G06V 40/172* (2022.01); *G06V 40/197* (2022.01)

(58) Field of Classification Search
　　CPC ..... G06F 21/32; G06F 3/0482; G06V 40/197; G06V 40/1365; G06V 40/172
　　See application file for complete search history.

(56) References Cited

U.S. PATENT DOCUMENTS 6,810,480 B1 * 10/2004 Parker ..................... G06F 21/32
　　　　　　　　　　　　　　　　713/168
9,762,581 B1 * 9/2017 Wang .................... H04L 63/102
　　　　　　　　　(Continued)

FOREIGN PATENT DOCUMENTS

CN　　　103176727 A　　6/2013
CN　　　110222491 A　　9/2019
　　　　　　(Continued)

OTHER PUBLICATIONS

International Search Report dated Jan. 31, 2023, issued in International Patent Application No. PCT/KR2022/016476.
　　　　　　(Continued)

*Primary Examiner* — Mohamed A. Wasel
(74) *Attorney, Agent, or Firm* — Jefferson IP Law, LLP

(57) ABSTRACT

An electronic device is provided. The electronic device includes a housing, a flexible display, a biometric recognition sensor, memory storing one or more computer programs, and one or more processors, wherein the one or more computer programs include computer-executable instructions that, when executed by the one or more processors, cause the electronic device to receive a first input for recognizing biometric information through the biometric recognition sensor, identify whether the first input is an input related to user authentication in a running application, perform user authentication related to a state of the elec-
(Continued)

tronic device, display, on the flexible display a user interface including a menu available for an execution request by receiving a second input while the first input is being held, and perform function corresponding to a menu selected using the user interface, based on the receiving of the second input while the first input is being held.

20 Claims, 34 Drawing Sheets

(51) Int. Cl.

| | | |
|---|---|---|
| *G06V 40/12* | (2022.01) | |
| *G06V 40/16* | (2022.01) | |
| *G06V 40/18* | (2022.01) | |

(56) References Cited

U.S. PATENT DOCUMENTS

| | | | |
|---|---|---|---|
| 2008/0010610 A1 | 1/2008 | Lim et al. | |
| 2011/0254792 A1 | 10/2011 | Waters et al. | |
| 2012/0046077 A1 | 2/2012 | Kim et al. | |
| 2014/0317527 A1 | 10/2014 | Won et al. | |
| 2015/0208244 A1 | 7/2015 | Nakao | |
| 2015/0370438 A1 | 12/2015 | Ito | |
| 2015/0371073 A1 | 12/2015 | Cho et al. | |
| 2016/0091988 A1 | 3/2016 | Skowronski et al. | |
| 2016/0142407 A1 | 5/2016 | Chun et al. | |
| 2016/0349971 A1* | 12/2016 | Chi ..................... | G09G 5/373 |

| | | | |
|---|---|---|---|
| 2017/0316250 A1 | 11/2017 | Roh et al. | |
| 2019/0080189 A1 | 3/2019 | Van Os et al. | |
| 2020/0004940 A1* | 1/2020 | Cho ..................... | G06F 9/451 |
| 2020/0026836 A1* | 1/2020 | Cho ..................... | G06V 40/70 |
| 2020/0125708 A1 | 4/2020 | Jeon et al. | |
| 2020/0320181 A1* | 10/2020 | Deutschmann ......... | G06F 21/32 |
| 2020/0341514 A1 | 10/2020 | Li et al. | |
| 2021/0152685 A1 | 5/2021 | Li | |
| 2021/0173914 A1* | 6/2021 | Keith, Jr. ............... | G06F 21/45 |
| 2021/0382615 A1 | 12/2021 | Kim et al. | |
| 2022/0261093 A1* | 8/2022 | Zhang .................. | G06F 1/1652 |

FOREIGN PATENT DOCUMENTS

| | | | |
|---|---|---|---|
| EP | 3 644 204 A1 | 4/2020 | |
| JP | 2014-071476 A | 4/2014 | |
| KR | 10-0744400 B1 | 7/2007 | |
| KR | 10-2014-0126140 A | 10/2014 | |
| KR | 10-2017-0082229 A | 7/2017 | |
| KR | 10-2017-0122386 A | 11/2017 | |
| KR | 10-2020-0045198 A | 5/2020 | |
| KR | 10-2020-0101187 A | 8/2020 | |
| KR | 10-2020-0132942 A | 11/2020 | |

OTHER PUBLICATIONS

Extended European Search Report dated Jan. 27, 2025, issued in European Application No. 22887608.2-1218.
European Office Action dated Nov. 5, 2025, issued in European Application No. 22887608.2-1218.

* cited by examiner

ELECTRONIC DEVICE, AND USER INTERFACE METHOD USING BIOMETRIC RECOGNITION IN ELECTRONIC DEVICE

CROSS-REFERENCE TO RELATED APPLICATION(S)

This application is a continuation application, claiming priority under § 365(c), of an International application No. PCT/KR2022/016476, filed on Oct. 26, 2022, which is based on and claims the benefit of a Korean patent application number 10-2021-0143268, filed on Oct. 26, 2021, in the Korean Intellectual Property Office, and of a Korean patent application number 10-2022-0035992, filed on Mar. 23, 2022, in the Korean Intellectual Property Office, the disclosure of each of which is incorporated by reference herein in its entirety.

BACKGROUND

1. Field

The disclosure relates to a user interface in an electronic device.

2. Description of Related Art

As portable electronic devices such as smartphones, tablet personal computers (PCs), and smart watches are widely used, there is an increasing user demand for portability and ease of use. Electronic devices may provide a touch screen display that is an output device for outputting visual information and replaces a mechanical input device (e.g., a button-type input device), and may have various sensors mounted thereto. For example, the electronic device may include a flexible display, such as a foldable or rollable display. In addition, recent electronic devices may be implemented to include sensor modules (or biometric recognition sensors) including fingerprint sensors, face recognition sensors, and iris sensors.

The above information is presented as background information only to assist with an understanding of the disclosure. No determination has been made, and no assertion is made, as to whether any of the above might be applicable as prior art with regard to the disclosure.

SUMMARY

In electronic devices, biometric recognition may be used for user authentication, and user authentication may be performed by receiving input for biometric recognition. For example, if user authentication is required while running an application, the electronic device may receive input for biometric recognition and perform user authentication required for the application. However, it may be necessary to perform user authentication first and then execute a function available after successful user authentication, among a plurality of functions.

There may be various functions available, in connection with user authentication, after performing user authentication in an electronic device. Typically, user authentication is performed merely by receiving input for biometric recognition, but the user may not be able to quickly and easily make an input for selecting the function available after user authentication.

Aspects of the disclosure are to address at least the above-mentioned problems and/or disadvantages and to provide at least the advantages described below. Accordingly, an aspect of the disclosure is to provide an electronic device that, if user authentication is successful by a first input for biometric recognition, displays a function available through a second input of the user while the first input is being held and, if the user makes a second input while holding the first input, quickly perform the above function, and a user interface method using a biometric recognize function in the electronic device.

Another aspect of the disclosure is to provide an electronic device that, if user authentication is successful by a first input for biometric recognition in a first state (e.g., a locked state, an unlocked state, a display expansion state, a display contraction state, or a specified-application deactivation (or non-execution) state), displays a function (or icon) for switching the first state to a second state (e.g., un unlocked state, a locked state, a display contraction state, a display expansion state, or a specified-application activation (or execution) state) related to the first state through a second input of the user while the first input is being held and, if the user makes a second input while holding the first input, quickly perform the function for switching the first state to the second state, and a user interface method using a biometric recognition function in the electronic device.

Additional aspects will be set forth in part in the description which follows and, in part, will be apparent from the description, or may be learned by practice of the presented embodiments.

In accordance with an aspect of the disclosure, an electronic device is provided. The electron device includes a housing, a flexible display, one or more sensors including at least one biometric recognition sensor, memory storing one or more computer programs, and one or more processors communicatively coupled to the flexible display, the one or more sensors and the memory, wherein the one or more computer programs include computer-executable instructions that, when executed by the one processors, cause the electronic device to receive a first input for recognizing biometric information through the at least one biometric recognition sensor, identify, in response to the first input, whether the first input is an input associated with user authentication in a running application, perform, in response to the first input not being an input associated with the user authentication in the running application, user authentication associated with a state of the electronic device, based on success of the user authentication associated with the state of the electronic device, display, on the flexible display, a user interface comprising at least one menu available for an execution request by receiving a second input while the first input is being held, and perform a function corresponding to a menu selected using the user interface based on the receiving of the second input while the first input is being held.

In accordance with another aspect of the disclosure, a user interface method performed by an electronic device using biometric recognition is provided. The user interface method includes receiving, by the electronic device, a first input for biometric information recognition through at least one biometric recognition sensor, identifying, by the electronic device in response to the first input, whether the first input is an input associated with user authentication in a running application, performing, by the electronic device in response to the first input not being an input associated with the user authentication in the running application, user authentication associated with a state of the electronic device, based on success of the user authentication associated with the state of the electronic device, displaying, by the electronic device on a display, a user interface comprising at least one menu available for an execution request by receiving a second input while the first input is being held, and performing, by the electronic device, a function corresponding to a menu selected using the user interface, based on the receiving of the second input while the first input is being held.

In accordance with another aspect of the disclosure, one or more non-transitory computer-readable storage media storing one or more computer programs including computer-executable instructions that, when executed by one or more processors, cause the electronic device to perform operations are provided. The operations include receiving, by the electronic device, a first input for recognizing biometric information through at least one biometric recognition sensor, identifying, by the electronic device in response to the first input, whether the first input is an input associated with user authentication in a running application, performing, by the electronic device in response to the first input not being an input associated with the user authentication in the running application, user authentication associated with a state of the electronic device, based on success of the user authentication associated with the state of the electronic device, displaying, by the electronic device on a display, a user interface comprising at least one menu available for an execution request by receiving a second input while the first input is being held, and performing, by the electronic device, a function corresponding to a menu selected using the user interface, based on the receiving of the second input while the first input is being held.

According to various embodiments of the disclosure, if user authentication is successful through a first input for biometric recognition, a function available through a second input of the user is displayed while the first input is being held, and if the user makes a second input while holding the first input, the function is quickly performed so that user authentication and specific functions may be performed quickly and sequentially, thereby providing convenience to the user.

According to various embodiments of the disclosure, if user authentication is successful by a first input for biometric recognition in a first state (e.g., a locked state, an unlocked state, a display expansion state, a display contraction state, or a specified-application deactivation (or non-execution) state), a function (or icon) for switching the first state to a second state (e.g., un unlocked state, a locked state, a display contraction state, a display expansion state, or a specified-application activation (or execution) state) through a second input of the user is displayed while the first input is being held, and if the user makes a second input while holding the first input, the function for switching the first state to the second state is quickly performed, so that the first state may quickly switch to the second state through user authentication.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

It should be appreciated that the blocks in each flowchart and combinations of the flowcharts may be performed by one or more computer programs which include instructions. The entirety of the one or more computer programs may be stored in a single memory device or the one or more computer programs may be divided with different portions stored in different multiple memory devices.

Any of the functions or operations described herein can be processed by one processor or a combination of processors. The one processor or the combination of processors is circuitry performing processing and includes circuitry like an application processor (AP, e.g. a central processing unit (CPU)), a communication processor (CP, e.g., a modem), a graphics processing unit (GPU), a neural processing unit (NPU) (e.g., an artificial intelligence (AI) chip), a Wi-Fi chip, a Bluetooth® chip, a global positioning system (GPS) chip, a near field communication (NFC) chip, connectivity chips, a sensor controller, a touch controller, a finger-print sensor controller, a display drive integrated circuit (IC), an audio CODEC chip, a universal serial bus (USB) controller, a camera controller, an image processing IC, a micropro-cessor unit (MPU), a system on chip (SoC), an integrated circuit (IC), or the like.

Figure 1:
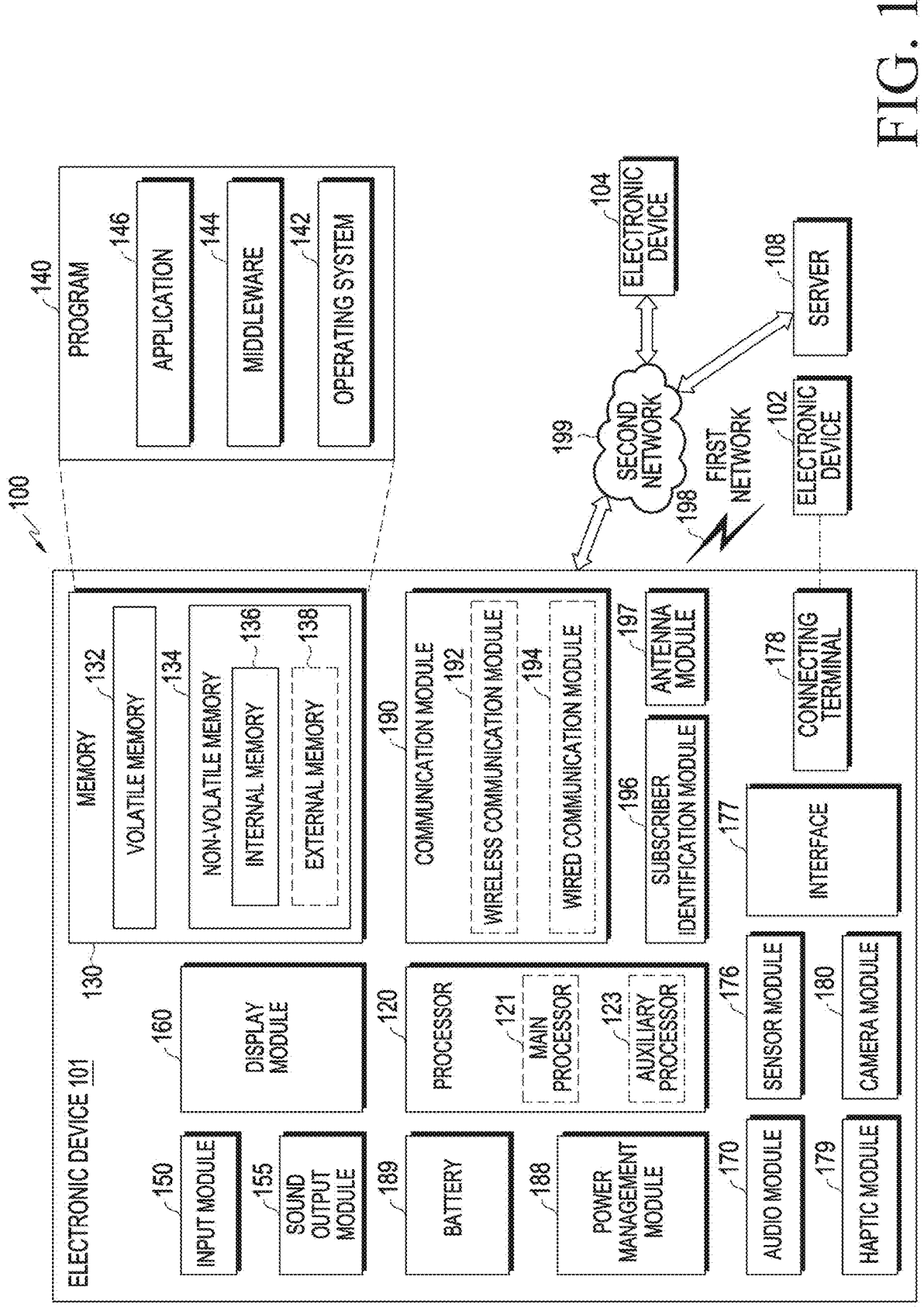
FIG. 1 is a block diagram of an electronic device in a network environment according to an embodiment of the disclosure.

FIG. 1 is a block diagram illustrating an electronic device in a network environment according to embodiment of the disclosure.

Referring to FIG. 1, an electronic device 101 in a network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 executes, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 is adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data includes, for example, software (e.g., the program 140) and input data or output data for a command related thereto. The memory 130 may include the volatile memory 132 or the non-volatile memory 134.

The program 140 may be stored in the memory 130 as software, and includes, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 includes, for example, a microphone, a mouse, a keyboard, a key (e.g., a button), or a digital pen (e.g., a stylus pen).

The sound output module 155 may output sound signals to the outside of the electronic device 101. The sound output module 155 includes, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 includes, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 includes, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 includes, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 includes, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 includes, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 is implemented as at least part of, for example, a power management integrated circuit (PMIC).

The battery 189 may supply power to at least one component of the electronic device 101. According to an embodiment, the battery 189 includes, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a fifth generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips)

separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter wave (mmWave) band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing 1eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, is selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102 or 104, or the server 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example.

The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2A:
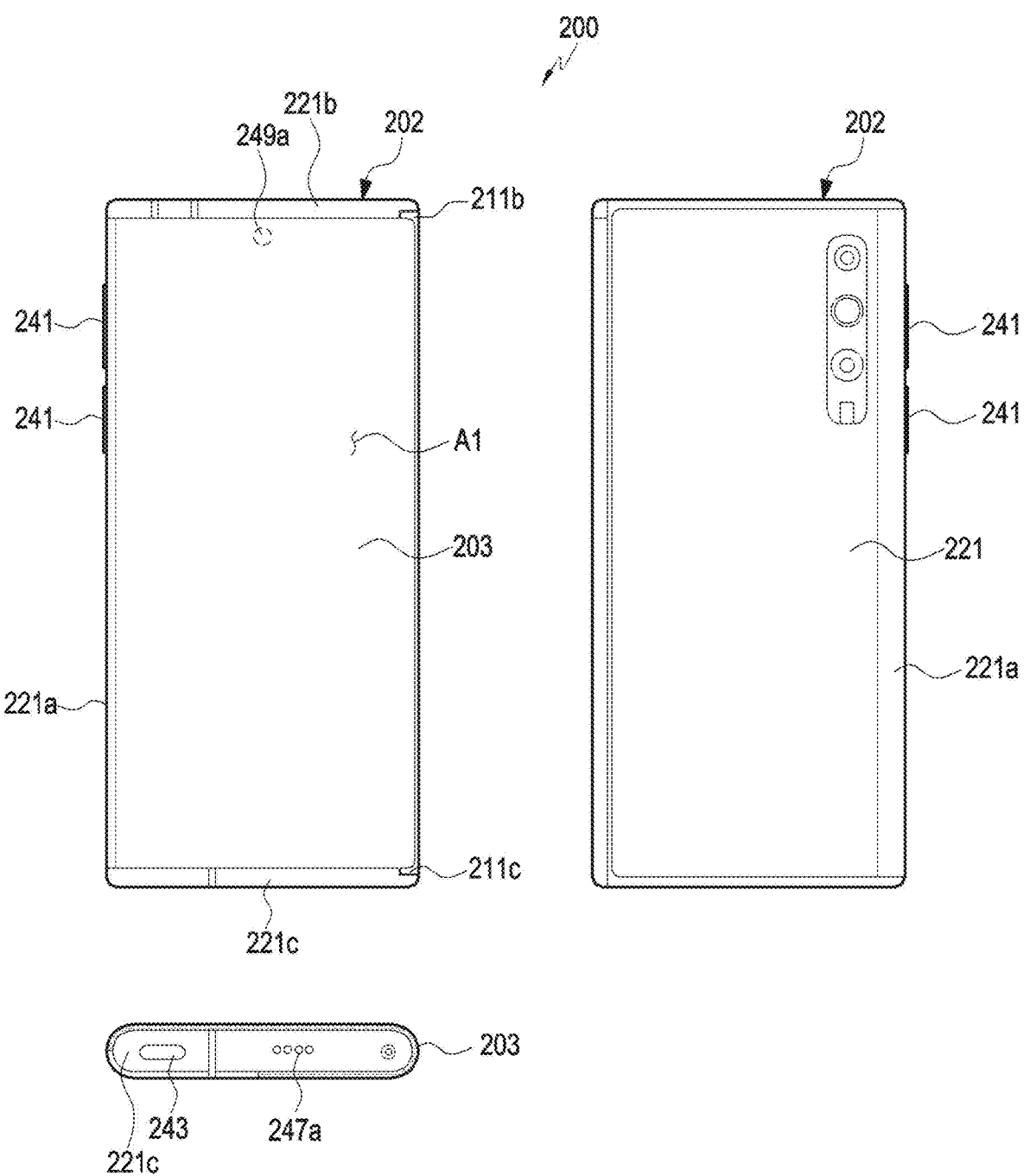
FIG. 2A is a diagram illustrating a state in which a second display area of a flexible display is stored in a second housing according to an embodiment of the disclosure.

FIG. 2A is a diagram illustrating a state in which a second display area of a flexible display is stored in a second housing according to an embodiment of the disclosure.

Figure 2B:
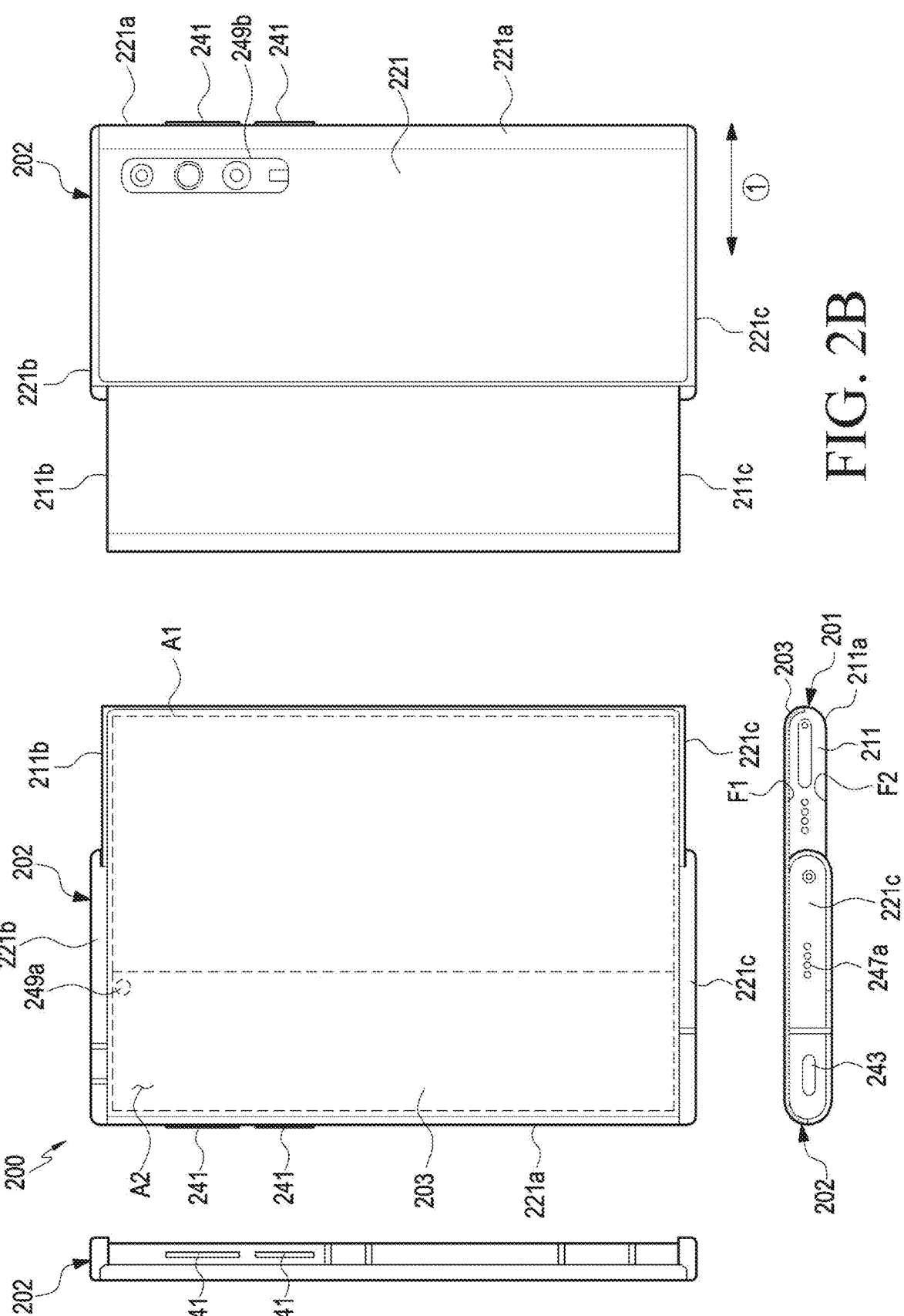
FIG. 2B is a diagram illustrating a state in which a second display area of a flexible display is exposed to the outside of a second housing according to an embodiment of the disclosure.

FIG. 2B is a diagram illustrating a state in which a second display area of a flexible display is exposed to the outside of a second housing according to an embodiment of the disclosure.

FIGS. 2A and 2B show a structure in which a flexible display 203 expands to the right when viewed from the front of an electronic device 101. The state shown in FIG. 2A may be defined as the state in which a first housing 201 is closed with respect to a second housing 202, and the state shown in FIG. 2B may be defined as the state in which the first housing 201 is open with respect to the second housing 202. Depending on the embodiment, a "closed state" or "open state" may be defined as the state in which the electronic device is closed or open.

Referring to FIGS. 2A and 2B, the electronic device 101 may include housings 201 and 202. The housings 201 and 202 may include a second housing 202 and a first housing 201 disposed to be movable relative to the second housing 202. In a certain embodiment, it may be interpreted as a structure in which the second housing 202 is provide to slide on the first housing 201 in the electronic device 101. According to an embodiment, the first housing 201 may be disposed to reciprocate a certain distance in the direction shown relative to the second housing 202, for example, in the direction indicated by arrow). All or some of the configurations of the electronic device 101 in FIGS. 2A and 2B may be the same as the configurations of the electronic device 101 in FIG. 1.

According to an embodiment, the first housing 201 is called, for example, a first structure, a slide part, or a slide housing, and may be disposed to reciprocate on the second housing 202. According to an embodiment, the first housing 201 may accommodate various electrical and electronic components such as a circuit board or battery. The second housing 202 is called, for example, a second structure, a main part, or a main housing, and may guide the movement of the first housing 201. A portion (e.g., a first display area A1) of the display 203 may be seated on the first housing 201. According to an embodiment, another portion (e.g., a second display area A2) of the display 203 may be received inside the second housing 202 (e.g., a slide-in operation) or exposed to the outside of the second housing 202 (e.g., a slide-out operation) as the first housing 201 moves (e.g., slides) relative to the second housing 202. According to an embodiment, a motor, a speaker, a SIM socket, and/or a sub-circuit board electrically connected to the main circuit board may be disposed in the first housing 201. A main circuit board having electrical components such as an application processor (AP) and a communication processor (CP), which are mounted thereto, may be disposed in the second housing 202.

According to an embodiment, the first housing 201 may include a first plate 211 (e.g., a slide plate). The first plate 211 may have a first face (e.g., the first face F1 in FIG. 2B) constituting at least a portion of the first plate 211 and a second face F2 facing in the opposite direction of the first face F1. According to an embodiment, the first plate 211 may support at least a portion (e.g., the first display area A1) of the display 203. According to an embodiment, the first housing 201 may include a first plate 211, a 1-1$^{st}$ side wall 211a extending from the first plate 211, a 1-2$^{nd}$ side wall 211b extending from the 1-1$^{st}$ side wall 211a and the first plate 211, and a 1-3rd side wall 221c extending from the 1-1$^{st}$ side wall 211a and the first plate 211 and parallel to the 1-2$^{nd}$ side wall 211b.

According to an embodiment, the second housing 202 may include a second plate 221 (main case), a 2-1$^{st}$ side wall 221a extending from the second plate 221, a 2-2$^{nd}$ side wall 221b extending from the 2-1$^{st}$ side wall 221a and the second plate 221, and a 2-3$^{rd}$ side wall 221c extending from the second side wall 221a and the second plate 221 and parallel to the 2-2$^{nd}$ side wall 221b. According to an embodiment, the 2-2$^{nd}$ side wall 221b and the 2-3$^{rd}$ side wall 221c may be formed perpendicular to the 2-1$^{st}$ side wall 221a. According to an embodiment, the second plate 221, the 2-1$^{st}$ side wall 221a, the 2-2$^{nd}$ side wall 221b, and the 2-3$^{rd}$ side wall 221c may be formed to have an opening on one side (e.g., the front face) so as to accommodate (or surround) at least a portion of the first housing 201. For example, the first housing 201 is coupled to the second housing 202 so as to be at least partially surrounded by the same, and slides in a direction parallel to the first face F1 or the second face F2, for example, in the direction of arrow ①, while being guided by the second housing 202. According to an embodiment, the second plate 221, the 2-1$^{st}$ side wall 221a, the 2-2$^{nd}$ side wall 221b, and/or the 2-3$^{rd}$ side wall 221c may be formed integrally. According to another embodiment, the second plate 221, the 2-1$^{st}$ side wall 221a, the 2-2$^{nd}$ side wall 221b, and/or the 2-3$^{rd}$ side wall 221c may be configured as separate housings and then coupled or assembled to each other.

According to an embodiment, the second plate 221 and/or the 2-1$^{st}$ side wall 221*a* may cover at least a portion of the flexible display 203. For example, at least a portion of the flexible display 203 is received inside the second housing 202, and the second plate 221 and/or the 2-1$^{st}$ side wall 221*a* may cover a portion of the flexible display 203 received inside the second housing 202.

According to various embodiments, the first housing 201 may move relative to the second housing 202 between an open state and a closed state in a first direction (e.g., the direction ① parallel to the 2-2$^{nd}$ side wall 221*b* or the 2-3$^{rd}$ side wall 221*c*, and the first housing 201 may move to be located at a first distance from the 2-1$^{st}$ side wall 221*a* in the closed state and at a second distance, which is greater than the first distance, from the 2-1$^{st}$ side wall 221*a* in the open state. In a certain embodiment, in the closed state, the first housing 201 may surround a portion of the 2-1$^{st}$ side wall 221*a*.

According to an embodiment, the electronic device 101 may include a display 203, a key input device 241, a connector hole 243, audio module 247*a*, or camera modules 249*a* and 249*b*. Although not shown, the electronic device 101 may further include an indicator (e.g., a light-emitting diode (LED) device) or various sensor modules. All or some of the configurations of the display 203, the audio modules 247*a*, and the camera modules 249*a* and 249*b* in FIGS. 2A and 2B may be the same as those of the display module 160, the audio module 170, and the camera module 180 in FIG. 1.

According to various embodiments, the display 203 may include a first display area A1 and a second display area A2. According to an embodiment, the first display area A1 may be disposed on the first housing 201. For example, the first display area A1 extends substantially across at least a portion of the first face F1 to be disposed on the first face F1. The second display area A2 may extend from the first display area A1 and may be inserted or received into the second housing 202 (e.g., a structure) or may be exposed to the outside of the second housing 202 according to the sliding movement of the first housing 201.

According to various embodiments, the second display area A2 may move substantially while being guided by one area of the first housing 201 so as to be received inside the second housing 202 or the space formed between the first housing 201 and the second housing 202 or to be exposed to the outside. According to an embodiment, the second display area A2 may move based on the sliding movement of the first housing 201 in the first direction (e.g., the direction indicated by arrow ①). For example, while the first housing 201 slides, a portion of the second display area A2 is deformed into a curved shape at a position corresponding to the curved surface of the first housing 201.

According to various embodiments, when viewed from above of the first plate 211 (e.g., a slide plate), if the first housing 201 moves from the closed state to the open state, the second display area A2 may be gradually exposed to the outside of the second housing 202 to form a substantially flat surface together with the first display area A1. The display 203 may be combined with or disposed adjacent to a touch detection circuit, a pressure sensor capable of measuring the intensity (pressure) of touch, and/or a digitizer that detects a magnetic field-type stylus pen. In an embodiment, the second display area A2 may be at least partially received inside the second housing 202, and a portion of the second display area A2 may be visually exposed to the outside even in the state (e.g., the closed state) shown in FIG. 2A. According to an embodiment, regardless of the closed or open state, the exposed portion of the second display area A2 may be located on a portion of the first housing, and a portion of the second display area A2 may remain curved.

According to an embodiment, the electronic device 101 may include at least one hinge structure (not shown). The hinge structure may connect the first housing 201 and the second housing 202. For example, the hinge structure is connected to the first plate 211 and the second plate 221. According to an embodiment, the hinge structure may transmit a driving force for guiding the sliding movement of the first housing 201 to the first housing 201. For example, the hinge structure includes an elastic material (e.g., a spring) and provide an elastic force in a first direction (e.g., the direction (1 in FIG. 2B), based on the sliding movement of the first housing 201. According to an embodiment, the hinge structure may be excluded.

According to an embodiment, the key input device 241 may be located in an area of the first housing 201. Depending on the appearance and state of use, the electronic device 101 may be designed to exclude the illustrated key input device 241 or include additional key input device(s). According to an embodiment, the electronic device 101 includes a key input device, which is not shown, for example, a home key button or a touch pad disposed around the home key button. According to another embodiment, at least a portion of the key input device 241 may be disposed on the 2-1$^{st}$ side wall 221*a*, the 2-2$^{nd}$ side wall 221*b*, or the 2-3$^{rd}$ side wall 221*c* of the second housing 202.

According to various embodiments, the connector hole 243 may be omitted depending on the embodiment, and may accommodate a connector (e.g., a USB connector) for transmitting and receiving power and/or data to and from an external electronic device. Although not shown, the electronic device 101 may include a plurality of connector holes 243, and some of the plurality of connector holes 243 may function as connector holes for transmitting and receiving audio signals to and from an external electronic device. In the illustrated embodiment, although the connector hole 243 is disposed on the 2-3$^{rd}$ side wall 221*c*, the disclosure is not limited thereto, and the connector hole 243 or a connector hole (not shown) may be disposed on the 2-1$^{st}$ side wall 221*a* or the 2-2$^{nd}$ side wall 221*b*.

According to various embodiments, the audio module 247*a* may include at least one speaker hole 247*a* or at least one microphone hole. One of the speaker holes 247*a* may be provided as a receiver hall for voice calls, and the other may be provided as an external speaker hall. The electronic device 101 may include a microphone for acquiring sound, and the microphone may acquire external sound of the electronic device 101 through the microphone hole. According to an embodiment, the electronic device 101 may include a plurality of microphones to detect the direction of sound. According to an embodiment, the electronic device 101 may include an audio module in which the speaker hole 247*a* and the microphone hole are implemented as one hole, or may include a speaker (e.g., a piezo speaker) excluding the speaker hole 247*a*.

According to various embodiments, the camera modules 249*a* and 249*b* may include a first camera module 249*a* and a second camera module 249*b*. The second camera module 249*b* may be located in the first housing 201 and may photograph a subject in the opposite direction of the first display area A1 of the display 203. The electronic device 101 may include a plurality of camera modules 249*a* and 249*b*. For example, the electronic device 101 includes at least one of a wide-angle camera, a telephoto camera, or a close-up camera and, depending on the embodiment, include an infrared projector and/or an infrared receiver to measure the distance to the subject. The camera modules 249a and 249b may include one or more lenses, an image sensor, and/or an image signal processor. The first camera module 249a may be disposed to face in the same direction as the display 203. For example, the first camera module 249a is disposed around the first display area A1 or in an area overlapping the display 203, and when disposed in the area overlapping the display 203, may photograph a subject through the display 203.

According to various embodiments, an indicator (not shown) of the electronic device 101 may be disposed in the first housing 201 or the second housing 202, and may include a light-emitting diode to provide state information of the electronic device 101 as a visual signal. A sensor module (not shown) of the electronic device 101 may generate an electrical signal or data value corresponding to an internal operation state of the electronic device 101 or an external environmental state. The sensor module includes, for example, a proximity sensor, a fingerprint sensor, or a biometric sensor (e.g., an iris/face recognition sensor or an HRM sensor). In another embodiment, a sensor module further includes, for example, at least one of a gesture sensor, a gyro sensor, an atmospheric pressure sensor, a magnetic sensor, an acceleration sensor, a grip sensor, a color sensor, an infrared (IR) sensor, a temperature sensor, a humidity sensor, or an illuminance sensor. According to an embodiment, the first housing 201 may include a first plate 211 and a slide cover (not shown). The first plate 211 and the slide cover (not shown) may be mounted (e.g., at least partially connected) to the second housing 202 and may reciprocate in a straight line along one direction (e.g., the direction of arrow ① in FIG. 2B) while being guided by the second housing 202. According to an embodiment, the first plate 211 may support the display 203. For example, the first plate 211 includes a first face F1, and the first display area A1 of the display 203 may be substantially located on the first face F1 to remain flat. The slide cover may protect the display 203 located on the first plate 211. For example, at least a portion of the display 203 is located between the first plate 211 and the slide cover. According to an embodiment, the first plate 211 and the slide cover may be made of a metal material and/or a non-metal (e.g., polymer) material. According to an embodiment, the first plate 211 may accommodate at least some (e.g., the battery 189 in FIG. 1, a motor (not shown), and a rack (not shown)) of the components of the electronic device 101. According to various embodiments, at least one or a plurality of substrates may be accommodated in the second housing 202. For example, the second housing 202 includes a circuit board (or main circuit board) (not shown), and the main circuit board may have a processor, memory, and/or an interface mounted thereon. The processor includes, for example, one or more of a central processing unit, an application processor, a graphics processing unit, an image signal processor, a sensor hub processor, or a communication processor. According to various embodiments, the circuit board may include a flexible printed circuit board-type radio frequency cable (FRC). For example, the circuit board is disposed on at least a portion of the second plate 221 and electrically connected to an antenna module (e.g., the antenna module 197 in FIG. 1) and a communication module (e.g., the communication module 190 in FIG. 1).

According to an embodiment, the memory includes, for example, volatile memory or non-volatile memory.

According to an embodiment, the interface includes, for example, a high-definition multimedia interface (HDMI), a universal serial bus (USB) interface, an SD card interface, and/or an audio interface. For example, the interface is electrically or physically connect the electronic device 101 to an external electronic device and include a USB connector, an SD card/MMC connector, or an audio connector.

According to an embodiment, the electronic device 101 may further include a separate sub-circuit board spaced apart from the circuit board inside the second housing 202. The sub-circuit board may be electrically connected to electrical components disposed in the end area of the electronic device 101, such as a battery, a speaker, and/or a SIM socket and may transmit signals and power.

According to an embodiment, the battery is a device for supplying power to at least one element of the electronic device 101, and includes, for example, a non-rechargeable primary battery, a rechargeable secondary battery, or a fuel cell. At least a portion of the battery may be disposed substantially on the same plane as, for example, the circuit board. The battery may be disposed integrally inside the electronic device 101 or disposed to be detachable from the electronic device 101.

According to an embodiment, the electronic device 101 may include a rack (not shown) that is disposed on the second housing 202 (e.g., the second plate 221) and guides the sliding movement of the first housing 201 (e.g., the first plate 211), and a motor (not shown) that transmits driving force to a gear (not shown) for rotational movement along the rack.

Figure 3:
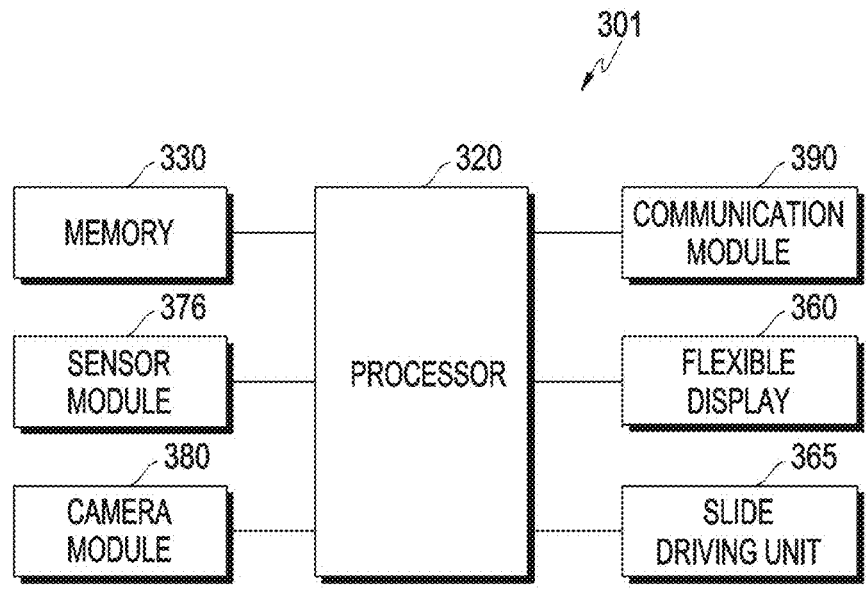
FIG. 3 is a block diagram of an electronic device according to an embodiment of the disclosure.

FIG. 3 is a block diagram of an electronic device according to an embodiment of the disclosure.

Referring to FIG. 3, an electronic device 301 (e.g., the electronic device 101 in FIG. 1) according to an embodiment may include at least one processor 320, memory 330, a flexible display 360, a slide driving unit 365, a sensor module 376, a camera module 380, and/or a communication module 390. The electronic device 301 according to an embodiment is not limited thereto and may be configured to further include various elements or to exclude some of the elements. The electronic device 301 according to an embodiment may further include all or some of the configurations of the electronic device 101 shown in FIG. 1.

The flexible display 360 (e.g., the display module 160 in FIG. 1 or the display 203 in FIGS. 2A and 2B) (hereinafter also referred to as a display) according to an embodiment may be implemented in the form of a touch screen. In the case where the flexible display 360 is implemented in the form of a touch screen together with an input module, it may display a variety of information produced according to a user's touch action. According to an embodiment, the display 360 may be configured to be rollable when sliding in or out. According to an embodiment, based on the slide-in or slide-out operation of the display 360, the display 360 may switch to an expansion state in which the screen expands by the display 360 or to a contraction state in which the screen contracts by the display 360. For example, the display 360 moves in a first direction (slide-out direction) with respect to the first housing 201 and/or the second housing 202, thereby switching to an expansion state (e.g., a partial expansion state or a full expansion state) in which at least a portion (e.g., A2) is exposed to the front face of the electronic device 101 from the inside of the first housing 201 and/or the second housing 202, and may move in a second direction (e.g., slide-in direction) opposite the first direction from the first direction with respect to the first housing 201 and/or the second housing 202, thereby switching to a contraction state in which at least a portion (e.g., A2) is not exposed to the front face of the electronic device 101.

The slide driving unit 365 according to an embodiment may include a motor, a gear, and/or a rack and cause the display 360 (e.g., the first housing 201) (or at least a portion (e.g., A2) of the display 203) to slide in or out through the motor, the gear, and/or the rack. According to an embodiment, the motor may be driven by receiving power (or current) to transmit driving force to a gear connected to the motor. The motor according to an embodiment may be implemented to provide a specified thrust (force) (e.g., a force of about 3 kgf), based on the repulsion force when the display 360 slides in or out, and the motor may have a specified diameter (e.g., approximately 6.2T or more) to provide the specified force. The gear according to an embodiment may enable the display 360 to slide in or out in conjunction with the rack, based on the driving force from the motor.

The sensor module 376 (e.g., the sensor module 176 in FIG. 1) according to an embodiment may include at least one biometric recognition sensor and gyro sensor. According to an embodiment, the at least one biometric recognition sensor may include a fingerprint sensor, a face recognition sensor, and/or an iris recognition sensor. The fingerprint sensor according to an embodiment may sense a fingerprint produced by a user's finger touch and provide fingerprint sensing information to the processor 320. The face recognition sensor according to an embodiment may recognize a face using a facial image obtained using the camera module 380 and depth information obtained using a depth sensor, and provide face recognition information to the processor 320. The iris recognition sensor according to an embodiment may recognize the iris using an Eye image obtained using the camera module 380 and an IR image obtained using an IR sensor, and provide iris recognition information to the processor 320. The gyro sensor according to an embodiment may provide the processor 320 with tilt-up, tilt-down, tilt-left, or tilt-right information depending on an angle at which a portion (top, bottom, left, or right portion) of the front face of the electronic device 301 is tilted in the upward direction (the +z-axis direction) or downward direction (the −z-axis direction) from a horizontal state in which the front face thereof is parallel to the horizontal plane.

The camera module 380 according to an embodiment may perform photography and provide the captured face image or eye image (or iris image) to the face recognition sensor or iris recognition sensor of the sensor module 376 or the processor 320.

The communication module 390 (e.g., the communication module 190 in FIG. 1) according to an embodiment, based on the control of at least one processor 320, may communicate with an external electronic device 104 through a first network 198 (e.g., short-range communication networks such as Bluetooth, Wi-Fi direct, or infrared data association (IrDA)) or a second network 199 (e.g., long-range communication networks such as a legacy cellular network, a 5G network, a next-generation communication network (e.g., new radio access technology), the Internet, or a computer network (e.g., LAN or WAN)).

At least one processor 320 (e.g., the processor 120 in FIG. 1) according to an embodiment may control the overall operation of the elements included in the electronic device 301.

The processor 320 according to an embodiment may obtain (or receive) a first input for biometric information recognition. For example, the biometric information recognition includes fingerprint recognition, face recognition, iris recognition, or recognition using other biometric information. For example, the first input for biometric information recognition includes a fingerprint input through an input area (e.g., a fingerprint input area disposed within the display area or an area on a physical key (e.g., a side key, a back key, a front key (home button), or another key)) corresponding to the fingerprint sensor, a face input through the face recognition sensor, or an iris input through the iris sensor.

The processor 320 according to an embodiment may identify whether or not the first input for biometric information recognition is an input requested by a user authentication-related application (e.g., a payment application) that is already running. If the first input for biometric information recognition is the input requested by the user authentication-related application that is already running, the processor 320 according to an embodiment may perform user authentication (e.g., second user authentication) through the process of the user authentication-related application. If the first input for biometric information recognition is not the input requested by the user authentication-related application that is already running, the processor 320 according to an embodiment may identify a first state (or current state) of the electronic device 301 and perform user authentication (e.g., first user authentication) associated with the first state in the first state. For example, the first state includes at least one of a locked state, an unlocked state, a display expansion state, a display contraction state, a specified application deactivation (or non-execution) state, or a specified application activation (or execution) state. For example, the processor 320 recognizes a fingerprint input through the fingerprint sensor in the first state and compare the recognized fingerprint with a pre-registered fingerprint of the user, thereby performing user authentication (or identify successful user authentication). For example, the processor 320 recognizes a face through the face recognition sensor in the first state and compare the recognized face with a pre-registered face of the user, thereby performing user authentication (or identify successful user authentication). For example, the processor 320 recognizes an iris through the iris recognition sensor in the first state and compare the recognized iris with a pre-registered iris of the user, thereby performing user authentication (or identify successful user authentication).

The processor 320 according to an embodiment, based on the successful user authentication associated with the first state, may display a user interface (e.g., a pop-up window) including at least one menu (e.g., a shortcut menu or a function icon) available for execution request (or triggerable) using a second input (e.g., an additional input) while holding the first input. For example, the processor 320, based on the successful user authentication associated with the first state, may display a pop-up window including at least one menu at a position adjacent to an input unit that receives the first input (or an area including an input area for receiving the first input or adjacent to the input area for receiving the first input) while the first input is being held. For example, the processor 320 stops displaying the pop-up window if the first input is not held. For example, at least one shortcut menu or function icon is displayed on the pop-up window, and guide (or description) information about a second input (e.g., a tilt-up, -down, -left, or -light input, a swipe-up, -down, -left, or -right input, an input of movement of a face subject to face recognition in the upward, downward, left, or right direction, or an input of movement of an iris (or eye) subject to iris recognition in the upward, downward, left, or right direction) for executing a function corresponding each shortcut menu or function icon may be further displayed thereon. For example, the function corresponding to at least one menu is a function of switching the electronic device 301 from a first state (e.g., a locked state, an unlocked state, a display expansion state, a display contraction state, or a specified-application deactivation (or non-execution) state) to a second state (e.g., un unlocked state, a locked state, a display contraction state, a display expansion state, or a specified-application activation (or execution) state). For example, if the first state is a locked state, the second state is an unlocked state, if the first state is a display contraction state, the second state may be a display expansion state, if the first state is a display expansion state, the second state may be a display contraction state, and if the first state is a specified-application deactivation (non-execution) state, the second state may be a specified-application activation (execution) state. For example, the specified application is a phone application, a camera application, a text application, or another application executable in the electronic device.

After successful user authentication based on the first input, the processor 320 according to an embodiment, based on receiving a second input while the first input is being held, may select a menu included in the user interface and performs a function corresponding to the selected menu. For example, after successful user authentication based on a first input (fingerprint input, face input, or iris input) for biometric recognition in the locked state, the processor 320, based on receiving a second input (e.g., a tilt-up, -down, -left, or -light input, a swipe-up, -down, -left, or -right input, an input of movement of a face subject to face recognition in the upward, downward, left, or right direction, or an input of movement of an iris (or eye) subject to iris recognition in the upward, downward, left, or right direction) while the first input is being held, may select an unlock menu (or unlock icon) and perform an unlock function corresponding to the selected unlock menu. For example, after successful user authentication based on a first input (fingerprint input, face input, or iris input) for biometric recognition in the display contraction (or expansion) state, the processor 320, based on receiving a second input (e.g., a tilt-up, -down, -left, or -light input, a swipe-up, -down, -left, or -right input, an input of movement of a face subject to face recognition in the upward, downward, left, or right direction, or an input of movement of an iris (or eye) subject to iris recognition in the upward, downward, left, or right direction) while the first input is being held, may select a display expansion (or contraction) menu (or icon) through the slide driving unit 365 and perform a function corresponding to the selected menu. For example, after successful user authentication based on a first input (fingerprint input, face input, or iris input) for biometric recognition in the specified-application deactivation (non-execution) (or activation (execution)) state, the processor 320, based on receiving a second input (e.g., a tilt-up, -down, -left, or -light input, a swipe-up, -down, -left, or -right input, an input of movement of a face subject to face recognition in the upward, downward, left, or right direction, or an input of movement of an iris (or eye) subject to iris recognition in the upward, downward, left, or right direction) while the first input is being held, may select a menu to activate (execute) (or deactivate (not execute)) the specified application and perform a function corresponding to the selected menu.

The memory 330 according to an embodiment may store application programs and data. For example, the memory 330 stores an application (function or program) related to the operation of the processor 320 of the electronic device 301. The memory 330 according to an embodiment may store a variety of data generated during execution of the program 140, as well as programs (e.g., the program 140 in FIG. 1) used for functional operation. The memory 330 may generally include a program 140 and a data area (not shown). The program 140 may store program information related to driving the electronic device 301, such as an operating system (OS) (e.g., the operating system 142 in FIG. 1) that boots the electronic device 301. The data area (not shown) may store transmitted and/or received data and generated data according to various embodiments. In addition, the memory 330 may be configured to include at least one storage medium from among flash memory, a hard disk, multimedia card micro-type memory (e.g., secure digital (SD) or extreme digital (XD) memory), random-access memory (RAM), and read-only memory (ROM).

According to an embodiment, the electronic device 301 is not limited to the configuration shown in FIG. 3 and may be configured to further include various elements. According to an embodiment, the electronic device 301 may further include an image processing module (not shown). The image processing module may perform two-dimensional (2D) or three-dimensional (3D) image processing and/or rendering operations under the control of the processor 320.

In the above-described embodiment, the primary elements of the electronic device have been described through the electronic device 301 in FIG. 3. However, in various embodiments, not all of the elements shown in FIG. 3 are essential elements, and the electronic device 301 may be implemented to include more elements than the illustrated elements, or may be implemented to include fewer elements than those.

According to various embodiments, an electronic device (e.g., the electronic device 101 in FIG. 1, the electronic device 200 in FIGS. 2A and 2B, or the electronic device 301 in FIG. 3) may include a housing (e.g., the first housing 201 and/or the second housing 202 in FIGS. 2A and 2B), a flexible display (e.g., the display module 160 in FIG. 1, the display 203 in FIGS. 2A and 2B, or the flexible display 360 in FIG. 3), one or more sensors (e.g., the sensor module 176 in FIG. 1 or the sensor module 376 in FIG. 3) including at least one biometric recognition sensor, memory storing one or more computer programs, and one or more processors (e.g., the processor 120 in FIG. 1 or the processor 320 in FIG. 3) communicatively coupled to the flexible display, the one or more sensors and the memory, wherein the one or more computer programs include computer-executable instructions that, when executed by the one or more processors, cause the electronic device to receive a first input for recognizing biometric information through the at least one biometric recognition sensor, identify, in response to the first input, whether the first input is an input associated with user authentication in a running application, perform, in response to the first input not being an input associated with the user authentication in the running application, user authentication associated with a state of the electronic device, based on success of the user authentication associated with the state of the electronic device, display, on the flexible display, a user interface comprising at least one menu available for an execution request by receiving a second input while the first input is being held, and perform a function corresponding to a menu selected using the user interface, based on the receiving of the second input while the first input is being held.

According to various embodiments, the state of the electronic device includes one of a locked state, an unlocked state, a display expansion state, a display contraction state, a specified-application deactivation state, or a specified-application activation state.

According to various embodiments, the electronic device further include a slide driving unit (e.g., the slide driving unit 365 in FIG. 3) configured to slide the flexible display in an expansion direction or contraction direction, wherein the flexible display is configured to be in an expansion state where at least a portion of inside of the housing is exposed to a front face of the electronic device or be in a contraction state where the at least the portion is not exposed to the front face of the electronic device by moving in an expansion direction or a contraction direction with respect to the housing by the slide driving unit, and wherein the one or more computer programs further include computer-executable instructions that, when executed by the one or more processors, cause the electronic device to display the user interface including a display expansion menu for switching from the display contraction state to the display expansion state when the electronic device is in the display contraction state, and display the user interface including a display contraction menu for switching from the display expansion state to the display contraction state when the electronic device is in the display expansion state.

According to various embodiments, the one or more computer programs further include computer-executable instructions that, when executed by the one or more processors, cause the electronic device to display, when the electronic device is in the locked state, the user interface including an unlock menu for switching the locked state to the unlocked state.

According to various embodiments, the one or more computer programs further include computer-executable instructions that, when executed by the one or more processors, cause the electronic device to display, when the electronic device is in the specified-application deactivation state, the user interface including a specified-application execution menu for switching the specified-application deactivation state to the specified-application activation state.

According to various embodiments, the at least one biometric recognition sensor includes a fingerprint sensor, and the first input for biometric information recognition may include a fingerprint input.

According to various embodiments, the at least one biometric recognition sensor includes a face recognition sensor, and the first input for recognizing biometric information may include a face input.

According to various embodiments, the at least one biometric recognition sensor includes an iris sensor, and the first input for biometric information recognition includes an iris input.

According to various embodiments, the second input includes a tilt-up, -down, -left, or -light input for at least a portion of the electronic device, a swipe-up, -down, -left, or -right input, an input of movement of a face subject to face recognition in the upward, downward, left, or right direction, or an input of movement of an iris subject to iris recognition in the upward, downward, left, or right direction.

According to various embodiments, the one or more computer programs further include computer-executable instructions that, when executed by the one or more processors, cause the electronic device to perform user authentication in the running application, based on the first input, in response to the first input being an input associated with user authentication in the running application.

Figure 4:
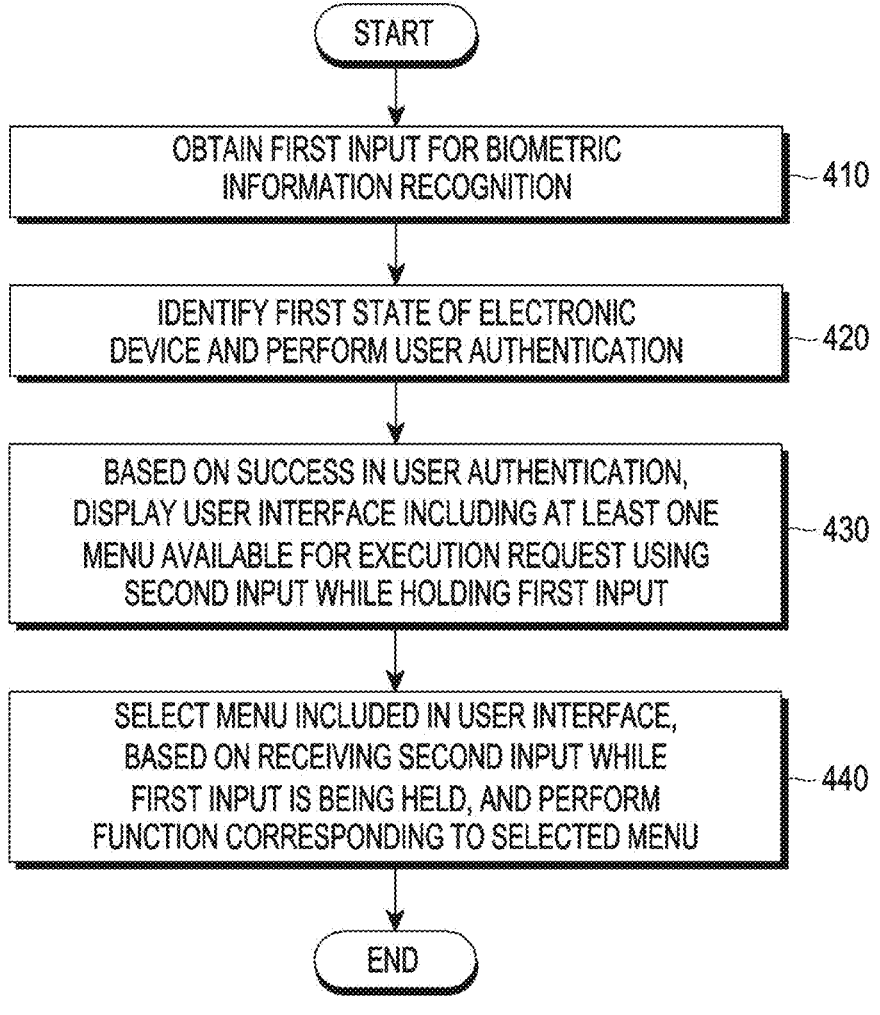
FIG. 4 is a flowchart illustrating an operation of providing a user interface using biometric information recognition in an electronic device according to an embodiment of the disclosure.

FIG. 4 is a flowchart illustrating an operation of providing a user interface using biometric information recognition in an electronic device according to an embodiment of the disclosure.

Referring to FIG. 4, a processor (e.g., the processor 120 in FIG. 1 or the processor 320 in FIG. 3) of an electronic device (e.g., the electronic device 101 in FIG. 1 or the electronic device 301 in FIG. 3) according to an embodiment may perform at least one of operations 410 to 440.

In operation 410, the processor 320 according to an embodiment may obtain (or receive) a first input for biometric information recognition. For example, biometric information recognition includes fingerprint recognition, face recognition, iris recognition, or recognition using other biometric information. For example, the first input for biometric information recognition includes a fingerprint input through an input area (e.g., a fingerprint input area disposed within the display area or an input area on a physical key (e.g., a side key, a back key, a front key (home button), or another key)) corresponding to the fingerprint sensor, a face input through the face recognition sensor, or an iris input through the iris sensor.

In operation 420, the processor 320 according to an embodiment may identify a first state (or current state) of the electronic device 301 and perform user authentication (e.g., first user authentication) associated with the first state. For example, the first state includes at least one of a locked state, an unlocked state, a display expansion state, a display contraction state, a specified application deactivation (or non-execution) state, or a specified application activation (or execution) state. For example, the processor 320 recognizes a fingerprint input through the fingerprint sensor in the first state and compare the recognized fingerprint with a pre-registered fingerprint of the user, thereby performing user authentication (or identify successful user authentication). For example, the processor 320 recognizes a face image input through the face recognition sensor in the first state and compare the recognized a face with a pre-registered face of the user, thereby performing user authentication (or identify successful user authentication). For example, the processor 320 recognizes an iris image input through the iris recognition sensor in the first state and compare the recognized iris with a pre-registered iris of the user, thereby performing user authentication (or identify successful user authentication).

In operation 430, the processor 320 according to an embodiment, based on the successful user authentication, may display a user interface including at least one menu available for execution request (or triggerable) using a second input (e.g., an additional input or a different type of input from the first input) while holding the first input. For example, the processor 320, based on the successful user authentication, displays, as a user interface, a pop-up window including at least one menu at a position adjacent to an input area for receiving the first input (or an area including an input area for receiving the first input or adjacent to the input area for receiving the first input), among the display area, while the first input is being held. For example, the processor 320 stops displaying the pop-up window if the first input is not held. For example, one or more shortcut menus or specified function icons are displayed on the pop-up window, and guide (or description) information about a second input (e.g., a tilt-up, -down, -left, or -light input, a swipe-up, -down, -left, or -right input, an input of movement of a face subject to face recognition in the upward, downward, left, or right direction, or an input of movement of an iris (or eye) subject to iris recognition in the upward, downward, left, or right direction) for executing each specified function may be further displayed thereon. For example, at least one shortcut menu or function icon includes a shortcut menu or function icon corresponding to a function of switching the electronic device 301 from a first state (e.g., a locked state, an unlocked state, a display expansion state, a display contraction state, or a specified-application deactivation (or non-execution) state) to a second state (e.g., un unlocked state, a locked state, a display contraction state, a display expansion state, or a specified-application activation (or execution) state). For example, if the first state is a locked state, the second state is an unlocked state, if the first state is a display contraction state, the second state may be a display expansion state, if the first state is a display expansion state, the second state may be a display contraction state, and if the first state is a specified-application deactivation (non-execution) state, the second state may be a specified-application activation (execution) state. For example, the specified application is a phone application, a camera application, a text application, or another application executable in the electronic device.

In operation 440, the processor 320 according to an embodiment may select a menu included in the user interface, based on receiving the second input while the first input is being held, and perform a function corresponding to the selected menu. For example, the processor 320, based on receiving a second input (e.g., a tilt-up, -down, -left, or -light input, a swipe-up, -down, -left, or -right input, an input of movement of a face subject to face recognition in the upward, downward, left, or right direction, or an input of movement of an iris (or eye) subject to iris recognition in the upward, downward, left, or right direction) while a first input (fingerprint (or fingerprint information) input, face (face information or face image) input, or iris (or iris information) input) is being held in the locked state, may select an unlock menu and perform an unlock function corresponding to the selected unlock menu. For example, the processor 320, based on receiving a second input (e.g., a tilt-up, -down, -left, or -light input, a swipe-up, -down, -left, or -right input, an input of movement of a face subject to face recognition in the upward, downward, left, or right direction, or an input of movement of an iris (or eye) subject to iris recognition in the upward, downward, left, or right direction) while a first input (fingerprint (or fingerprint information) input, face (face information or face image) input, or iris (or iris information) input) is being held in the display contraction (or expansion) state, may select a display expansion (or contraction) menu through the slide driving unit 365 and perform a function corresponding to the selected menu. For example, the processor 320, based on receiving a second input (e.g., a tilt-up, -down, -left, or -light input, a swipe-up, -down, -left, or -right input, an input of movement of a face subject to face recognition in the upward, downward, left, or right direction, or an input of movement of an iris (or eye) subject to iris recognition in the upward, downward, left, or right direction) while a first input (fingerprint (or fingerprint information) input, face (face information or face image) input, or iris (or iris information) input) is being held in the state in which the first input (fingerprint input, face input, or iris input) is held in the specified-application deactivation (non-execution) (or activation (execution)) state, may select a menu to activate (execute) (or deactivate (not execute)) the specified application and perform a function corresponding to the selected menu.

According to various embodiments, a user interface method performed by an electronic device (e.g., the electronic device 101 in FIG. 1, the electronic device 200 in FIGS. 2A and 2B, or the electronic device 301 in FIG. 3) using biometric recognition includes receiving, by the electronic device, a first input for recognizing biometric information through at least one biometric recognition sensor, identifying, by the electronic device in response to the first input, whether the first input is an input associated with user authentication in a running application, performing, by the electronic device in response to the first input not being an input associated with the user authentication in the running application, user authentication associated with a state of the electronic device, based on success of the user authentication associated with the state of the electronic device, displaying, by the electronic device on a display, a user interface comprising at least one menu available for an execution request by receiving a second input while the first input is being held, and performing, by the electronic device, a function corresponding to a menu selected using the user interface, based on the receiving of the second input while the first input is being held.

According to various embodiments, in the method, the state of the electronic device includes one of a locked state, an unlocked state, a display expansion state, a display contraction state, a specified-application deactivation state, or a specified-application activation state.

According to various embodiments, the method includes displaying the user interface including a display expansion menu for switching from the display contraction state to the display expansion state when the electronic device in the display contraction state and displaying the user interface including a menu for switching from the display expansion state to the display contraction state when the electronic device is in the display expansion state.

According to various embodiments, the method includes displaying, when the electronic device is in the locked state, the user interface including an unlock menu for switching the locked state to the unlocked state.

According to various embodiments, the method includes displaying, when the electronic device is in the specified-application deactivation state, the user interface including a specified-application execution menu for switching the specified-application deactivation state to the specified-application activation state.

According to various embodiments, in the method, the first input for recognizing biometric information includes a fingerprint input, and user authentication may be performing by recognizing the fingerprint input using a fingerprint sensor.

According to various embodiments, in the method, the first input for biometric information recognition includes a face input, and user authentication may be performing by recognizing the face input using a face recognition sensor.

According to various embodiments, in the method, the first input for biometric information recognition includes an iris input, and user authentication may be performing by recognizing the iris input using an iris recognition sensor.

According to various embodiments, the second input includes a tilt-up, -down, -left, or -light input for at least a portion of the electronic device, a swipe-up, -down, -left, or -right input, an input of movement of a face subject to face recognition in the upward, downward, left, or right direction, or an input of movement of an iris subject to iris recognition in the upward, downward, left, or right direction.

Figure 5:
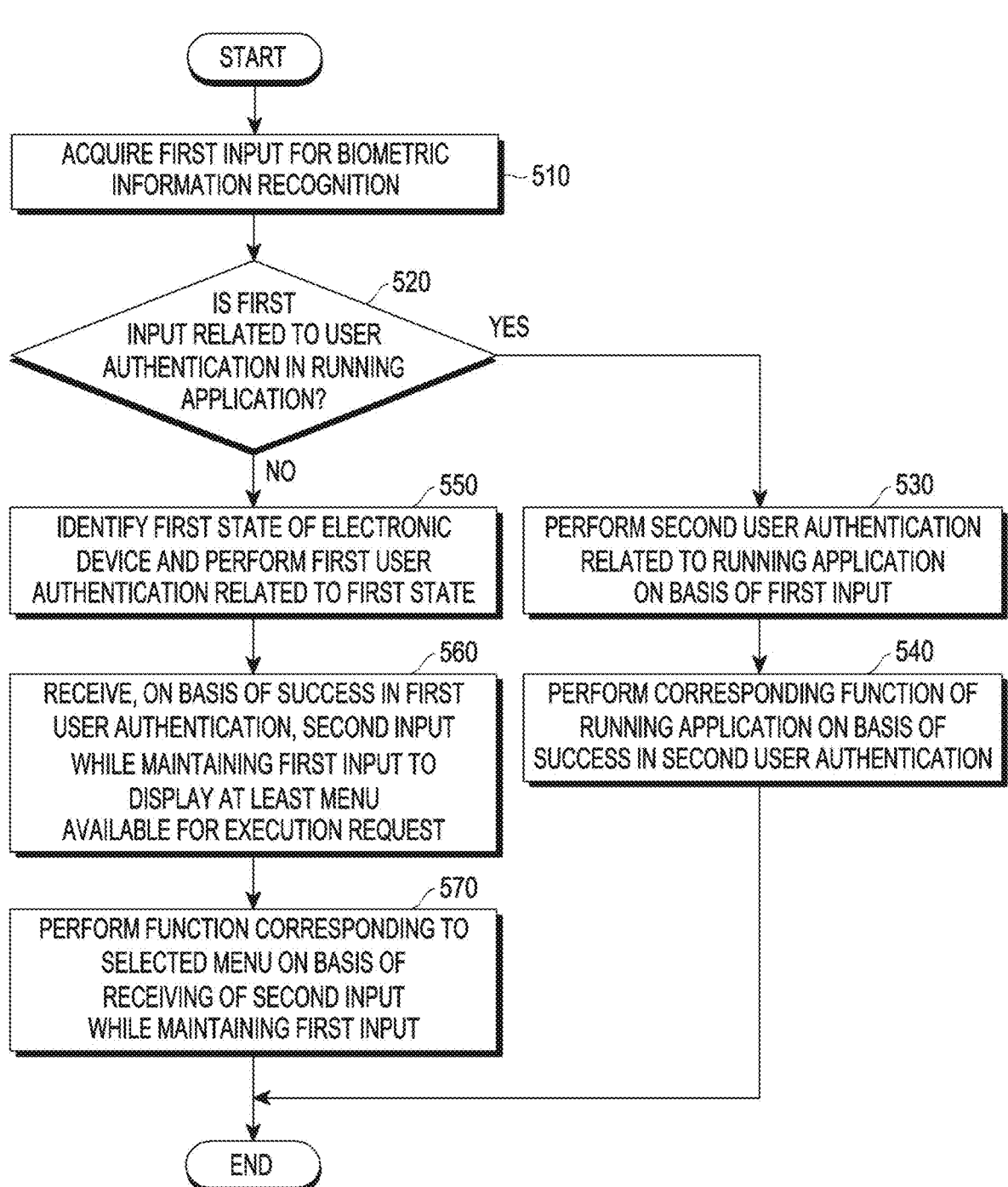
FIG. 5 is a flowchart illustrating an operation of providing a user interface depending on whether or not a first input for biometric information recognition is an input requested by a user authentication-related application that is already running in an electronic device according to an embodiment of the disclosure.

FIG. 5 is a flowchart illustrating an operation of providing a user interface depending on whether or not a first input for biometric information recognition is an input associated with user authentication in an application that is already running in an electronic device according to an embodiment of the disclosure.

Referring to FIG. 5, a processor (e.g., the processor 120 in FIG. 1 or the processor 320 in FIG. 3) of an electronic device (e.g., the electronic device 101 in FIG. 1 or the electronic device 301 in FIG. 3) according to an embodiment may perform at least one of operations 510 to 570.

In operation 510, the processor 320 according to an embodiment may obtain (or receive) a first input for biometric information recognition. For example, biometric information recognition includes fingerprint recognition, face recognition, iris recognition, or recognition using other biometric information. For example, the first input for biometric information recognition includes a fingerprint (fingerprint information) input through an input area (e.g., a fingerprint input area disposed within the display area or an input area on a physical key (e.g., a side key, a back key, a front key (home button), or another key)) corresponding to the fingerprint sensor, a face (face information or face image) input through the face recognition sensor, or an iris (iris information or iris image) input through the iris sensor.

In operation 520, the processor 320 according to an embodiment may identify whether or not the first input for biometric information recognition is an input associated with user authentication (e.g., a login, payment, or another authentication function) in a running application. For example, the processor 320 identifies whether or not the first input for biometric information recognition is an input associated with user authentication based on a user authentication request (or biometric recognition request) in a payment application that is running. According to an embodiment, the processor 320 may identify, while an application is running, whether the first input for biometric information recognition is intended for user authentication in the running application or for performing a shortcut (or menu or function). For example, if a biometric recognition interface (e.g., a fingerprint sensor, a face recognition sensor, an iris sensor, or another biometric recognition sensor (or module)) is automatically activated by a running application, and if a first input for biometric information recognition is received through the biometric recognition interface, the processor 320 identifies that the first input is intended for user authentication. For example, if the user makes a direct input to activate or interact with the biometric recognition interface, regardless of the operation of the running application, the processor 320 identifies that it is intended to perform a shortcut. For example, if the user makes an input to activate or interact with the biometric recognition interface in a locked state, the processor 320 provides a shortcut interface (e.g., a shortcut menu or a shortcut input screen) for performing a shortcut and perform an unlock operation through the shortcut interface.

In operation 530, if the first input for biometric information recognition is an input associated with user authentication (e.g., a login, payment, or another authentication function) in the running application, the processor 320 according to an embodiment, based on the first input, may perform user authentication (e.g., second user authentication) associated with the running application. For example, the processor 320 may recognize a fingerprint input through the fingerprint sensor and compare the recognized fingerprint with a pre-registered fingerprint of the user, thereby performing user authentication (or identify successful user authentication). For example, the processor 320 may recognize a face through the face recognition sensor and compare the recognized face with a pre-registered face of the user, thereby performing user authentication (or identify successful user authentication). For example, the processor 320 may recognize an iris through the iris recognition sensor and compare the recognized iris with a pre-registered iris of the user, thereby performing user authentication (or identify successful user authentication).

In operation 540, the processor 320 according to an embodiment, based on the success in the second user authentication, may perform a corresponding function (e.g., a pay function of a payment application) associated with the user authentication in the running application.

In operation 550, if the first input for biometric information recognition is not an input associated with user authentication (e.g., a login, payment, or another authentication function) in the running application, the processor 320 according to an embodiment may identify a first state (or current state) of the electronic device 301 and perform user authentication (e.g., first user authentication) associated with the first state in the first state. For example, the first state may include a locked state, an unlocked state, a display expansion state, a display contraction state, a specified-application deactivation (or non-execution) state, or a specified-application activation (or execution) state. For example, for the display expansion or contraction state, the processor 320 may identify the first state (or current state) of the electronic device 301, based on device state values (e.g., 0==contraction and 1==expansion) in the code stored in the memory 330. For example, the first user authentication may be performed in a similar manner as the second user authentication.

In operation 560, the processor 320 according to an embodiment, based on the success in the first user authentication associated with the first state, may display at least one menu (e.g., a shortcut menu or a function icon) available for execution request (or triggerable) using (or by receiving) a second input (e.g., an additional input or a different type of input from the first input) while holding the first input. For example, the processor 320, based on the success in the first user authentication, may display a user interface (e.g., a pop-up window) including at least one menu (e.g., a shortcut menu or a function icon) at a position adjacent to the first input area (or an area including an input area for receiving the first input or adjacent to the input area for receiving the first input), among the display area, while the first input is being held. For example, the processor 320 may stop displaying the pop-up window if the first input is not held. For example, menus (e.g., a shortcut menu or a function icon) respectively corresponding to one or more specified functions may be displayed on the pop-up window, and guide (or description) information about a second input (e.g., a tilt-up, -down, -left, or -light input, a swipe-up, -down, -left, or -right input, an input of movement of a face subject to face recognition in the upward, downward, left, or right direction, or an input of movement of an iris (or eye) subject to iris recognition in the upward, downward, left, or right direction) for executing each specified function may be further displayed thereon. For example, at least one specified function may include a function of switching the electronic device 301 from a first state (e.g., a locked state, an unlocked state, a display expansion state, a display contraction state, or a specified-application deactivation (or non-execution) state) to a second state (e.g., un unlocked state, a locked state, a display contraction state, a display expansion state, or a specified-application activation (or execution) state). For example, if the first state is a locked state, the second state may be an unlocked state, if the first state is a display contraction state, the second state may be a display expansion state, if the first state is a display expansion state, the second state may be a display contraction state, and if the first state is a specified-application deactivation (non-execution) state, the second state may be a specified-application activation (execution) state. For example, the specified application may be a phone application, a camera application, a text application, or another application executable in the electronic device.

In operation 570, the processor 320 according to an embodiment may perform a function corresponding to the selected menu, based on receiving the second input while the first input is being held. For example, the processor 320, based on receiving a second input (e.g., a tilt-up, -down, -left, or -light input, a swipe-up, -down, -left, or -right input, an input of movement of a face subject to face recognition in the upward, downward, left, or right direction, or an input of movement of an iris (or eye) subject to iris recognition in the upward, downward, left, or right direction) while a first input (fingerprint (or fingerprint information) input, face (face information or face image) input, or iris (or iris information) input) is being held in the locked state, may perform an unlock function corresponding to the selected unlock menu. For example, the processor 320, based on receiving a second input (e.g., a tilt-up, -down, -left, or -light input, a swipe-up, -down, -left, or -right input, an input of movement of a face subject to face recognition in the upward, downward, left, or right direction, or an input of movement of an iris (or eye) subject to iris recognition in the upward, downward, left, or right direction) while a first input (fingerprint (or fingerprint information) input, face (face information or face image) input, or iris (or iris information) input) is being held in the display contraction (or expansion) state, may select a display expansion (or contraction) menu and perform a display expansion (or contraction) function corresponding to the selected menu through the slide driving unit 365. For example, the processor 320, based on receiving a second input (e.g., a tilt-up, -down, -left, or -light input, a swipe-up, -down, -left, or -right input, an input of movement of a face subject to face recognition in the upward, downward, left, or right direction, or an input of movement of an iris (or eye) subject to iris recognition in the upward, downward, left, or right direction) while a first input (fingerprint (or fingerprint information) input, face (face information or face image) input, or iris (or iris information) input) is being held in the state in which the first input (fingerprint input, face input, or iris input) is held in the specified-application deactivation (non-execution) (or activation (execution)) state, may select an application menu and perform a function to activate (execute) (or deactivate (not execute)) the specified application.

Figure 6:
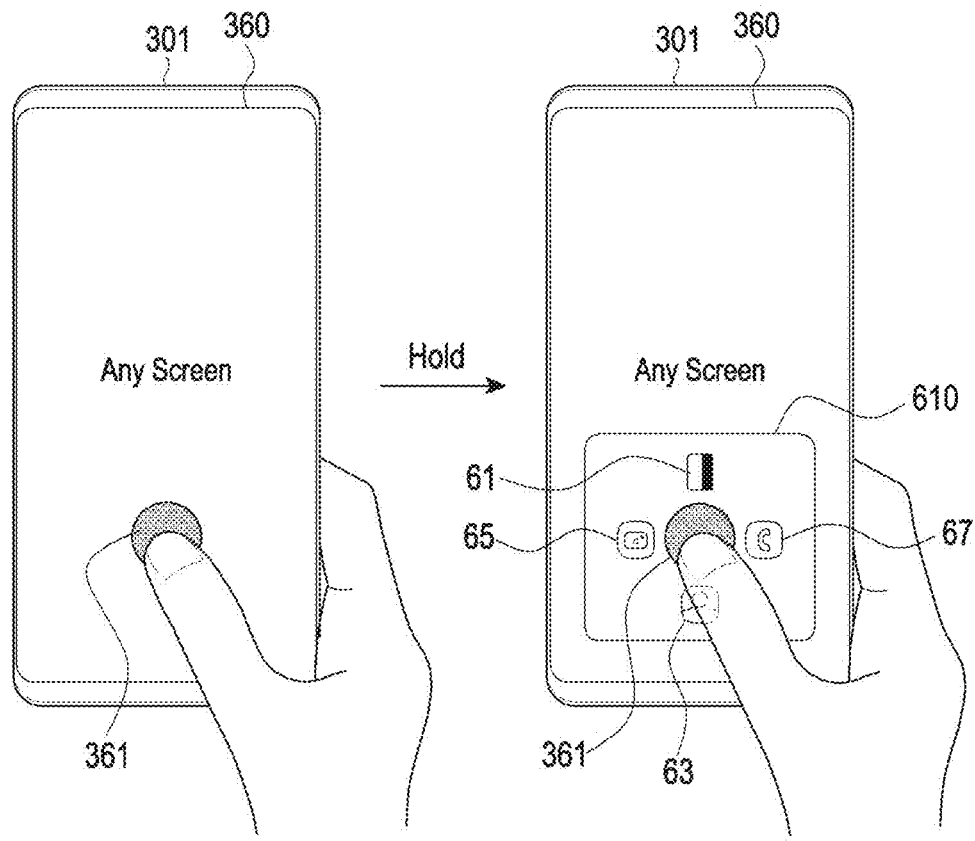
FIG. 6 is a diagram illustrating an example of displaying at least one specified function available for execution request using a second input while holding a first input for fingerprint recognition in a display contraction and locked state according to an embodiment of the disclosure.

FIG. 6 is a diagram illustrating an example of displaying at least one specified function available for execution request using a second input while holding a first input for fingerprint recognition in a display contraction state according to an embodiment of the disclosure.

Referring to FIG. 6, a processor (e.g., the processor 120 in FIG. 1 or the processor 320 in FIG. 3) of an electronic device 301 (e.g., the electronic device 101 in FIG. 1 or the electronic device 200 in FIGS. 2A and 2B) according to an embodiment may be displaying a screen (e.g., any screen) corresponding to the current state on the contracted display 360 in the display contraction state. For example, the processor 320 is displaying an application screen when the application is running, displaying a home screen n a home screen state, displaying a lock screen in a locked state, or displaying a standby screen in a standby state. In addition, the processor 320 may be displaying various screens depending on the current state of the electronic device 301.

The processor 320 of the electronic device 301 according to an embodiment may receive a first input (e.g., a touch input or a long-touch input) for fingerprint recognition through at least one area (e.g., a fingerprint input area) 361 of the display 360 in a display contraction state. The processor 320 according to an embodiment may identify whether or not the first input for fingerprint recognition is an input associated with user authentication (e.g., a login, payment, or another authentication function) in an application that is (already) running. For example, the processor 320 identifies whether or not the first input for fingerprint recognition is an input associated with user authentication based on a user authentication request (or fingerprint recognition request) in an application (e.g., a payment application) that is running. For example, if the first input for fingerprint recognition is not intended for user authentication associated with the running application (running content=NOT Authentication), the processor 320 may identify that it is intended to perform a shortcut. For example, if a first input for fingerprint recognition is performed for user authentication in a running application, the processor 320 identifies that it is intended for user authentication associated with the running application. For example, if the user makes a direct input to activate the fingerprint sensor or interact with the fingerprint sensor, regardless of the operation of the running application, the processor 320 identifies that it is intended to perform a shortcut. If the first input for fingerprint recognition is not an input associated with user authentication (e.g., a login, payment, or another authentication function) in an application that is running, the processor 320 according to an embodiment may identify a first state (or current state) of the electronic device 301. For example, the first state includes a locked state, an unlocked state, a display expansion state, a display contraction state, a specified-application deactivation (or non-execution) state, or a specified-application activation (or execution) state. The processor 320 according to an embodiment may perform first user authentication associated with the first state and, based on the success in the first user authentication, may display a user interface (e.g., a pop-up window) 610 including at least one menu (e.g., a shortcut menu or a function icon) available for execution request (or triggerable) using a second input (e.g., an additional input or a different type of input from the first input) while holding the first input. For example, the processor 320 stops displaying the pop-up window 610 if the first input is not held. For example, at least one menu (e.g., a shortcut menu or function icon) (e.g., 61, 63, 65, and 67) is displayed on the pop-up window 610. For example, at least one menu (e.g., a shortcut menu or function icon) (e.g., 61, 63, 65, and 67) includes a display expansion function icon 61 for switching a display contraction state to a display expansion state and an unlock function icon 63 for switching a locked state to an unlocked state, and may further include a camera function (or application) icon 65, a phone function (or application) icon 67, and/or other function (or application) icons. For example, the processor 320 displays the user interface (e.g., a pop-up window) 610 in an area adjacent to the fingerprint input area 361 (or an area including the fingerprint input area 361). The processor 320 according to an embodiment may stop displaying the user interface (e.g., a pop-up window) 610 when the first input is not held. For example, the display expansion function icon 61, the unlock function icon 63, the camera function (or application) icon 65, or the phone function (or application) icon 67 are respectively selected for execution request using a second input (e.g., an additional input or a different type of input from the first input) that is further input while the first input is being held. For example, the second input includes a tilt-up, -down, -left, or -light input, a swipe-up, -down, -left, or -right input, an input of movement of a face subject to face recognition in the upward, downward, left, or right direction, or an input of movement of an iris (or eye) subject to iris recognition in the upward, downward, left, or right direction.

Figure 7A:
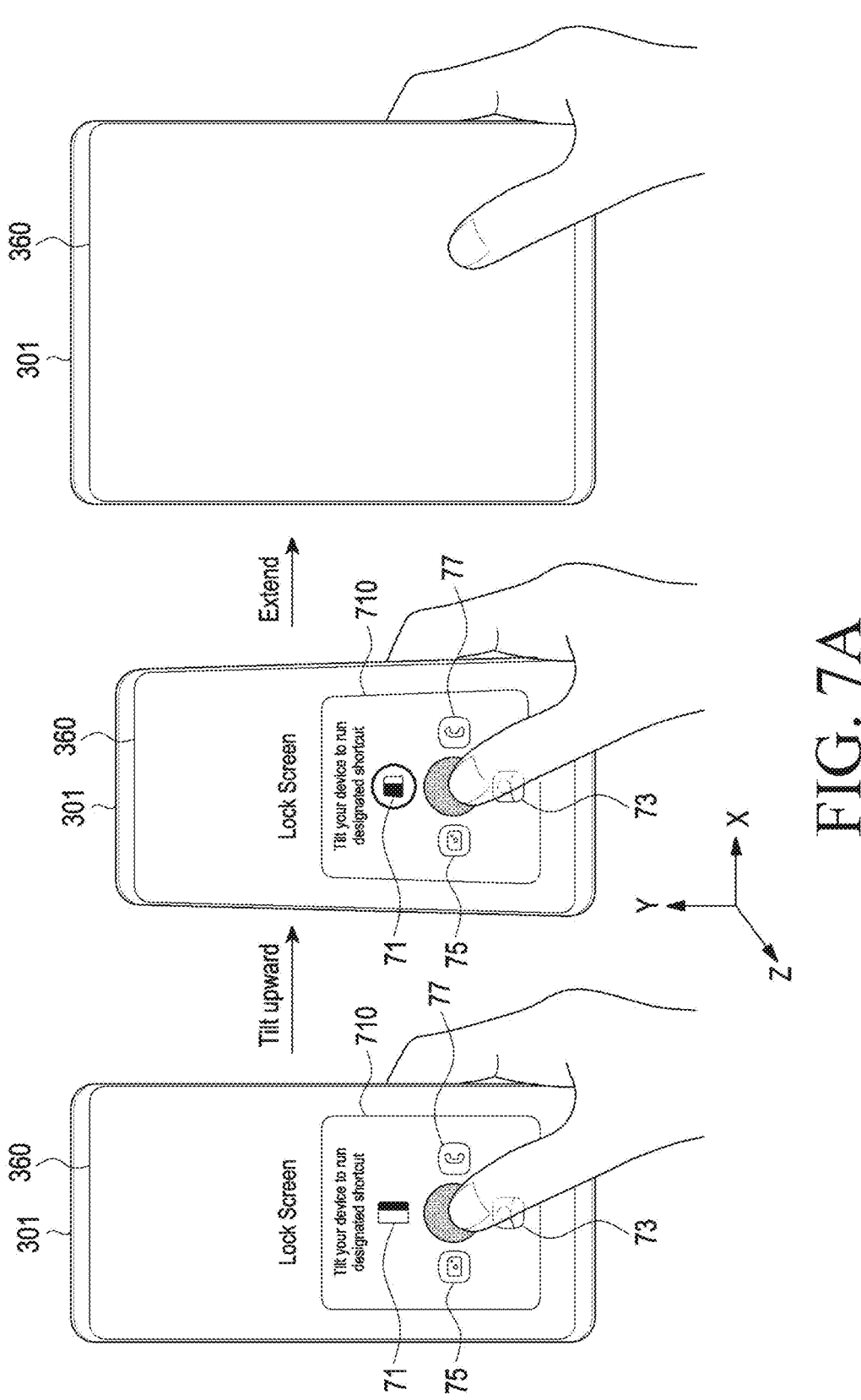
FIG. 7A is a diagram illustrating the case where a second input for tilting up an electronic device is received while holding at least a first input for fingerprint recognition according to an embodiment of the disclosure.

FIG. 7A is a diagram illustrating the case where a second input for tilting up an electronic device is received while holding a first input for fingerprint recognition according to an embodiment of the disclosure.

Figure 7B:
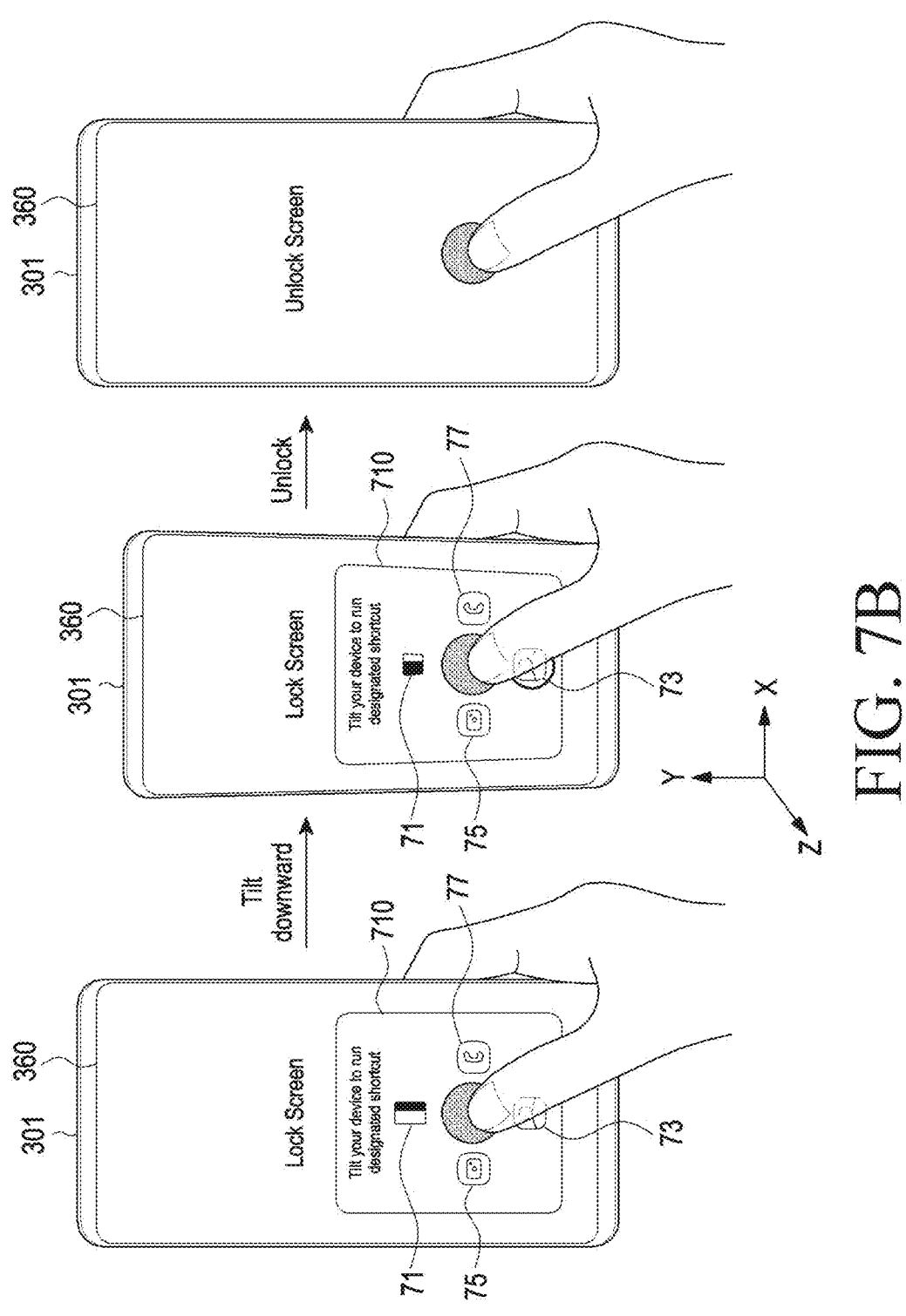
FIG. 7B is a diagram illustrating the case where a second input for tilting down an electronic device is received while holding a first input for fingerprint recognition according to an embodiment of the disclosure.

FIG. 7B is a diagram illustrating the case where a second input for tilting down an electronic device is received while holding a first input for fingerprint recognition according to an embodiment of the disclosure.

Referring to FIG. 7A, a processor (e.g., the processor 120 in FIG. 1 or the processor 320 in FIG. 3) of an electronic device 301 (e.g., the electronic device 101 in FIG. 1 or the electronic device 200 in FIGS. 2A and 2B) according to an embodiment, based on the successful user authentication through fingerprint recognition based on a first input, may display a user interface (e.g., a pop-up window) 710 including at least one menu (e.g., a shortcut menu or function icon) available for execution request using a second input while holding the first input. For example, at least one menu (e.g., a shortcut menu or function icon) available for execution request using the second input while the first input is held includes a display expansion function icon 71 for switching a display contraction state to a display expansion state and an unlock function icon 73 for switching a locked state to an unlocked state, and further includes a camera function (or application) icon 75, a phone function (or application) icon 77, and/or other function (or application) icons, or may not include some icons. The processor 320 according to an embodiment may identify reception of a second input for tilting the electronic device 301 (lower portion of the electronic device 301) upwards at a specified angle or more in the +Z-axis direction (or for tilting the lower portion of the electronic device 301 upwards more than the upper portion of the electronic device 301) through the gyro sensor while the first input is being held. If the second input for tilting the electronic device 301 upwards at a specified angle or more is received while the first input is being held, the processor 320 according to an embodiment may identify an execution request for the display expansion function icon 71. For example, the display expansion function icon 71 is an icon having a shape indicating that the electronic device is currently in the display contraction state. The processor 320 according to an embodiment may perform a display expansion function (extend the display), based on the identification of the execution request for the display expansion function icon 71.

Referring to FIG. 7B, the processor 320 according to an embodiment may identify reception of a second input for tilting the electronic device 301 (lower portion of the electronic device 301) downwards at a specified angle or more in the −Z-axis direction (or for tilting the lower portion of the electronic device 301 downwards more than the upper portion of the electronic device 301) through the gyro sensor while the first input is being held. If the second input for tilting the electronic device 301 (lower portion of the electronic device 301) downwards at a specified angle or more in the −Z-axis direction is received while the first input is being held, the processor 320 according to an embodiment may identify an execution request for the unlock function icon 73. The processor 320 according to an embodiment may perform an unlock function (unlock the screen), based on the identification of the execution request for the unlock function icon 73.

Although the tilt-up and tilt-down inputs have been described by way of example in FIGS. 7A and 7B, a function for the tilt-left or tilt-right input and an icon corresponding thereto may also be performed in the same way. For example, if a second input for tilting the electronic device 301 (right portion of the electronic device 301) to the right at a specified angle or more in the −X-axis direction (or for tilting the right portion of the electronic device 301 to the right more than the left portion of the electronic device 301) is received while the first input is being held, the processor 320 identifies an execution request for the camera function icon 75 and, based on the identification of the execution request for the camera function icon 75, perform a camera function (or application). For example, if a second input for tilting the electronic device 301 (right portion of the electronic device 301) to the left at a specified angle or more in the +X-axis direction (or for tilting the left portion of the electronic device 301 to the left more than the right portion of the electronic device 301) is received while the first input is being held, the processor 320 identifies an execution request for the call function icon 77 and, based on the identification of the execution request for the call function icon 77, perform a call function (or application).

Figure 7C:
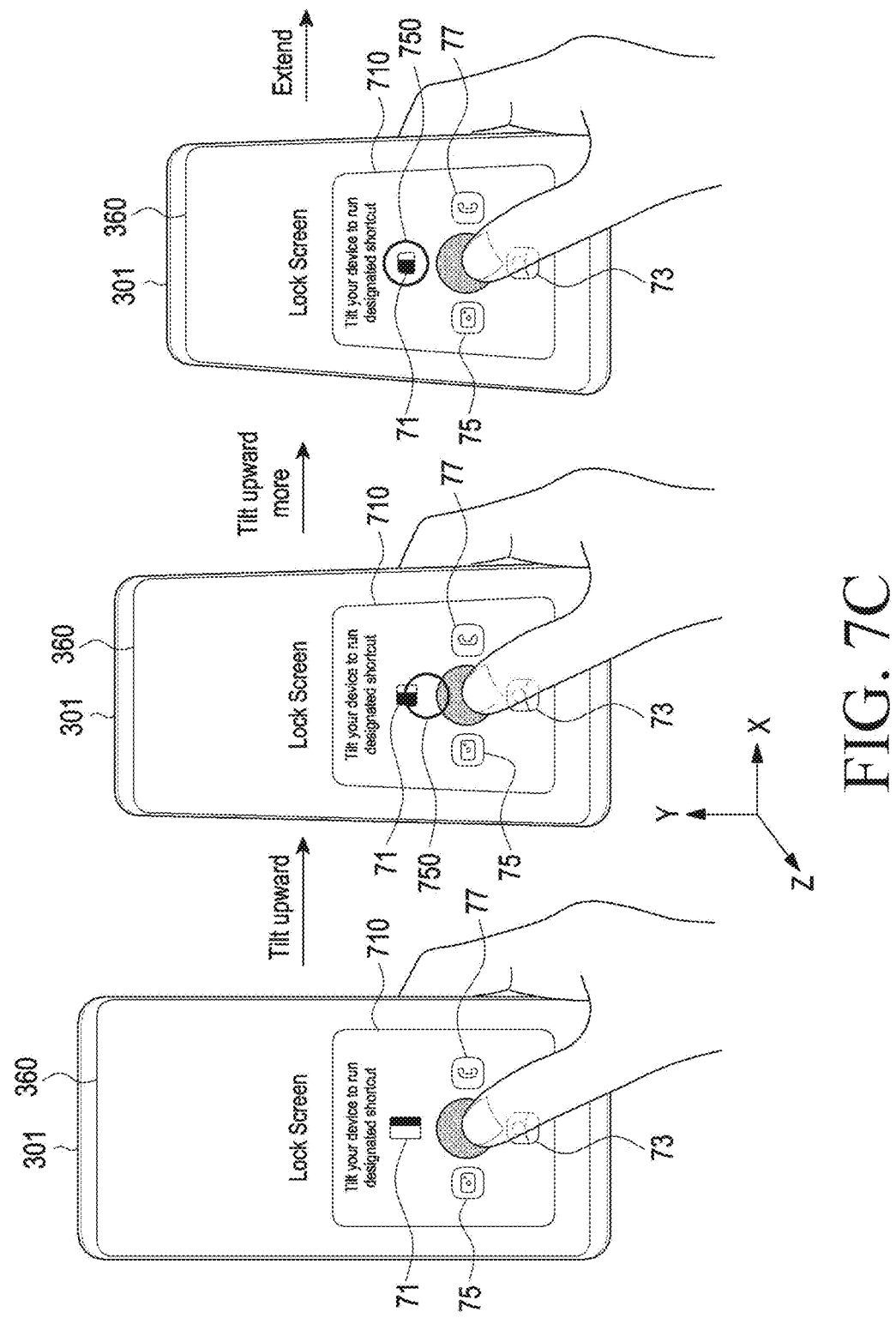
FIG. 7C is a diagram illustrating an example of an indication indicating a tilt-up state when receiving a second input for tilting up an electronic device while holding a first input according to an embodiment of the disclosure.

FIG. 7C is a diagram illustrating an example of an indication indicating a tilt-up state when receiving a second input for tilting up an electronic device while holding a first input according to an embodiment of the disclosure.

Referring to FIG. 7C, as a second input for tilting the electronic device 301 (lower portion of the electronic device 301) upwards at a specified angle or more in the +Z-axis direction is received, the processor 320 according to an embodiment, based on the tilt-up state (or the degree of tilt-up or a tilt-up angle) of the electronic device 301, may display an indication 750 indicating the tilt-up state. For example, the indication 750 enables the user to identify the degree of tilt-up. For example, the indication 750 has the shape of a shaded circle and may be displayed while moving depending on the inclination in respective directions (the upward, downward, left, or right direction). If the tilt-up angle of the electronic device 301 reaches a specified angle (e.g., a reference or threshold angle for selecting a function icon) or more, the processor 320 according to an embodiment may display an indication fixed to the position of a function icon (e.g., the display expansion function icon 71).

Although the tilt-up state and the display expansion function icon 71 have been described by wat of example in FIG. 7C, an indication may also be displayed in the same manner for each of the tilt-down, tilt-left, and tile-right state and icons corresponding thereto.

Figure 8A:
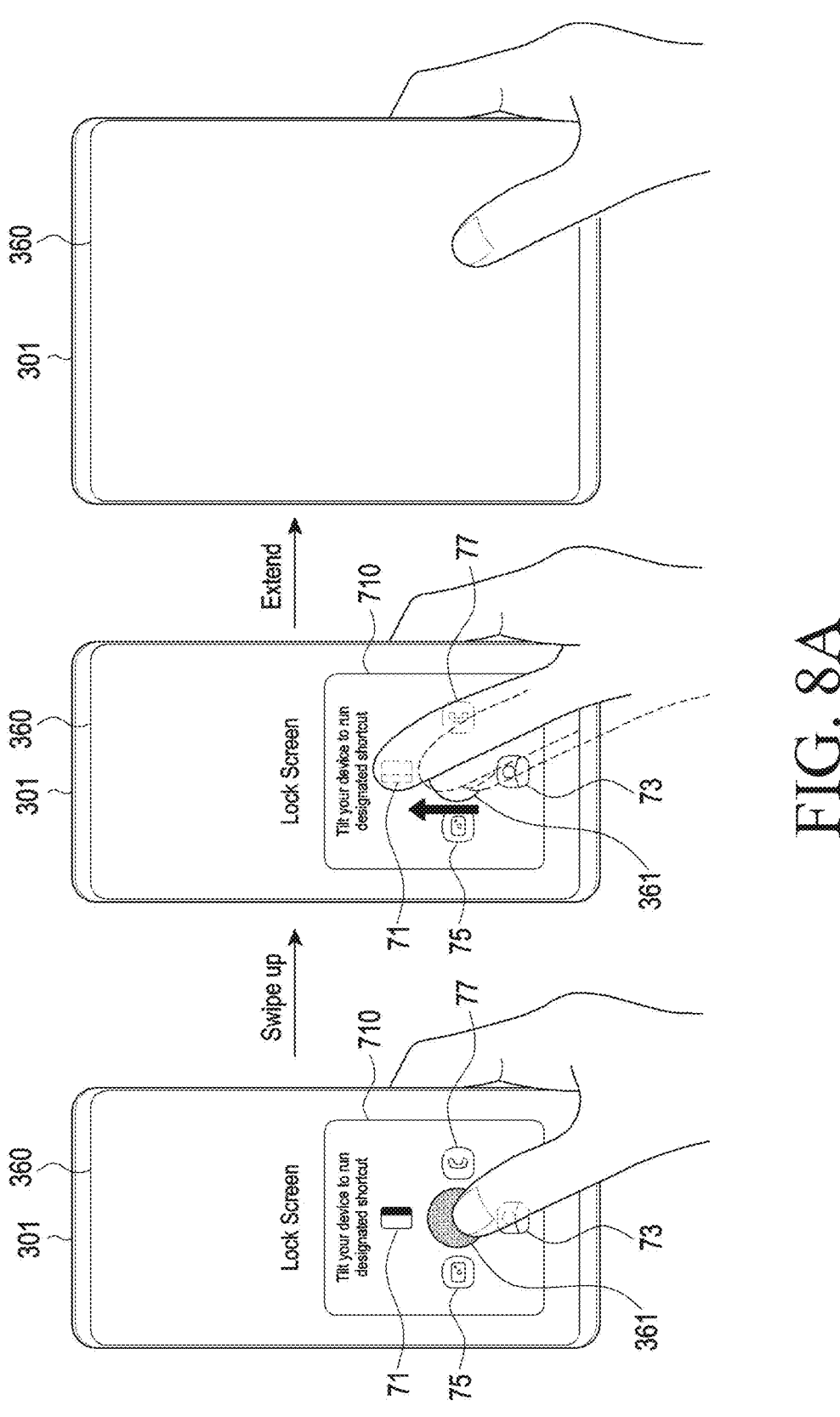
FIG. 8A is a diagram illustrating the case where a second input of swiping up from a first input for fingerprint recognition is received while information indicating at least one specified function is displayed according to an embodiment of the disclosure.

FIG. 8A is a diagram illustrating the case where a second input of swiping up from a first input for fingerprint recognition is received while a user interface including at least one menu is being displayed according to an embodiment of the disclosure.

Figure 8B:
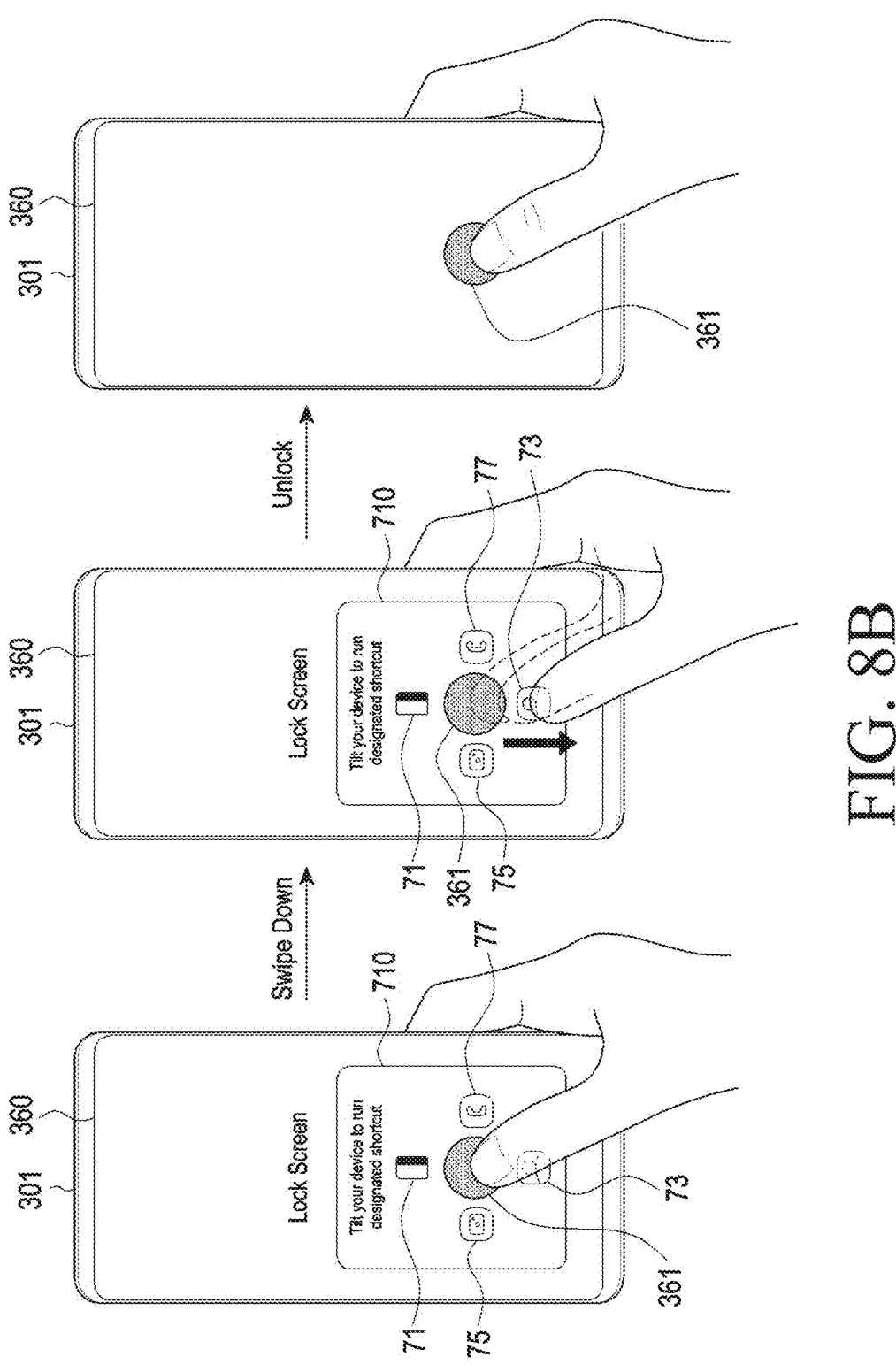
FIG. 8B is a diagram illustrating the case where a second input of swiping down from a first input for fingerprint recognition is received while information indicating at least one specified function is displayed according to an embodiment of the disclosure.

FIG. 8B is a diagram illustrating the case where a second input of swiping down from a first input for fingerprint recognition is received while a user interface including at least one menu is being displayed according to an embodiment of the disclosure.

Referring to FIG. 8A, a processor (e.g., the processor 120 in FIG. 1 or the processor 320 in FIG. 3) of an electronic device 301 (e.g., the electronic device 101 in FIG. 1 or the electronic device 200 in FIGS. 2A and 2B) according to an embodiment may identify whether or not a second input of swiping up from the first input is received while holding the first input in the state where a user interface 710 including at least one menu is being displayed. If a second input of swiping up in a first direction (e.g., toward the display expansion function icon 71) from the first input is received, the processor 320 according to an embodiment may identify an execution request for the display expansion function icon 71. The processor 320 according to an embodiment, based on the identification of the execution request for the display expansion function icon 71, may perform a display expansion function (extend the display).

Referring to FIG. 8B, the processor 320 according to an embodiment may identify a second input of swiping down from the first input is received while holding the first input in the state where a user interface 710 including at least one menu is being displayed. If a second input of swiping down in a second direction (e.g., toward the unlock function icon 73) from the first input is received, the processor 320 according to an embodiment may identify an execution request for the unlock function icon 73. The processor 320 according to an embodiment, based on the identification of the execution request for the unlock function icon 73, may perform an unlock function (unlock the screen).

Figure 9A:
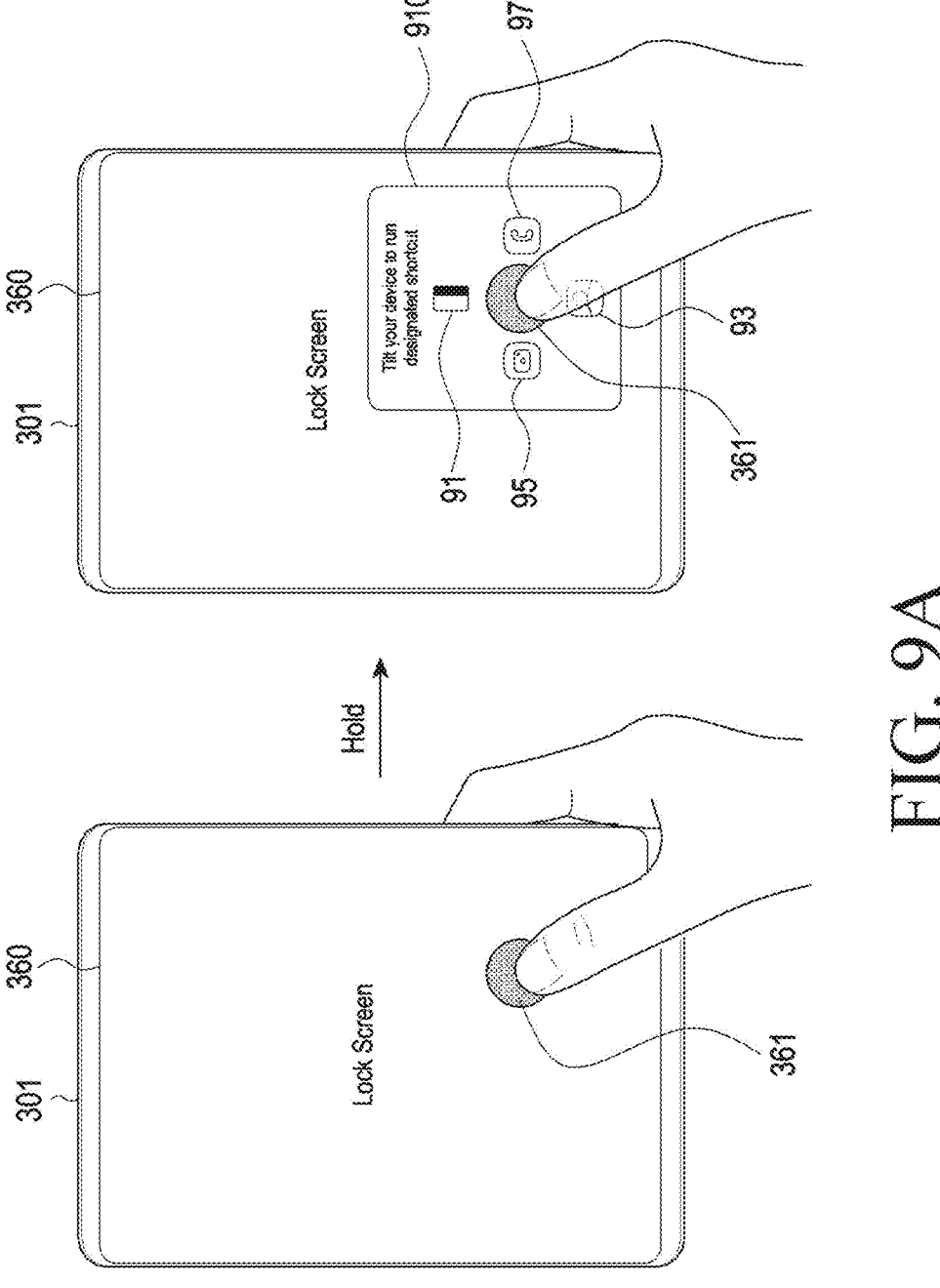
FIG. 9A is a diagram illustrating an example of displaying at least one specified function available for execution request using a second input while holding a first input for fingerprint recognition in a display expansion and locked state according to an embodiment of the disclosure.

FIG. 9A is a diagram illustrating an example of displaying a user interface including at least one menu available for execution request using a second input while holding a first input for fingerprint recognition in a display expansion and locked state according to an embodiment of the disclosure.

Referring to FIG. 9A, a processor (e.g., the processor 120 in FIG. 1 or the processor 320 in FIG. 3) of an electronic device 301 (e.g., the electronic device 101 in FIG. 1 or the electronic device 200 in FIGS. 2A and 2B) according to an embodiment may display a locked screen on the expanded display 360 in a display expansion and locked state. The processor 320 according to an embodiment may receive a first input (e.g., a touch input or a long-touch input) for fingerprint recognition through at least one area (e.g., a fingerprint input area) 361 of the display 360 while the locked screen is being displayed on the extended display 360. The processor 320 of the electronic device 301 according to an embodiment may identify the display expansion and locked state as a first state (e.g., current state) of the electronic device 301, recognize a fingerprint corresponding to the first input through the fingerprint sensor in the display expansion and locked state, and perform user authentication using the recognized fingerprint. The processor 320 of the electronic device 301 according to an embodiment, based on the success in user authentication through fingerprint recognition using the first input, may display a user interface 910 including at least one menu available for execution request using a second input while the first input is being held. For example, the user interface 910 including at least one menu is of a pop-up window (or pop-up menu) type. For example, the user interface 910 including at least one menu includes at least one shortcut menu or function icon 91, 93, 95, and/or 97. For example, the at least one shortcut menu or function icon includes a display contraction function icon 91 for switching a display expansion state to a display contraction state and an unlock function icon 93 for switching a locked state to an unlocked state, and may further include a camera function (or application) icon 95, a phone function (or application) icon 97, and/or other function (or application) icons. For example, the processor 320 displays the user interface 910 including at least one menu in an area adjacent to the fingerprint input area 361 (or an area including the fingerprint input area 361). For example, the processor 320 stops displaying the user interface 910 when the first input is not held. For example, the display contraction function icon 91, the unlock function icon 93, the camera function (or application) icon 95, or the phone function (or application) icon 97 are respectively selected for execution request using a second input (e.g., an additional input or a different type of input from the first input) that is further input while the first input is being held. For example, the second input may include a tilt-up, -down, -left, or -light input, a swipe-up, -down, -left, or -right input, an input of movement of a face subject to face recognition in the upward, downward, left, or right direction, or an input of movement of an iris (or eye) subject to iris recognition in the upward, downward, left, or right direction.

Figure 9B:
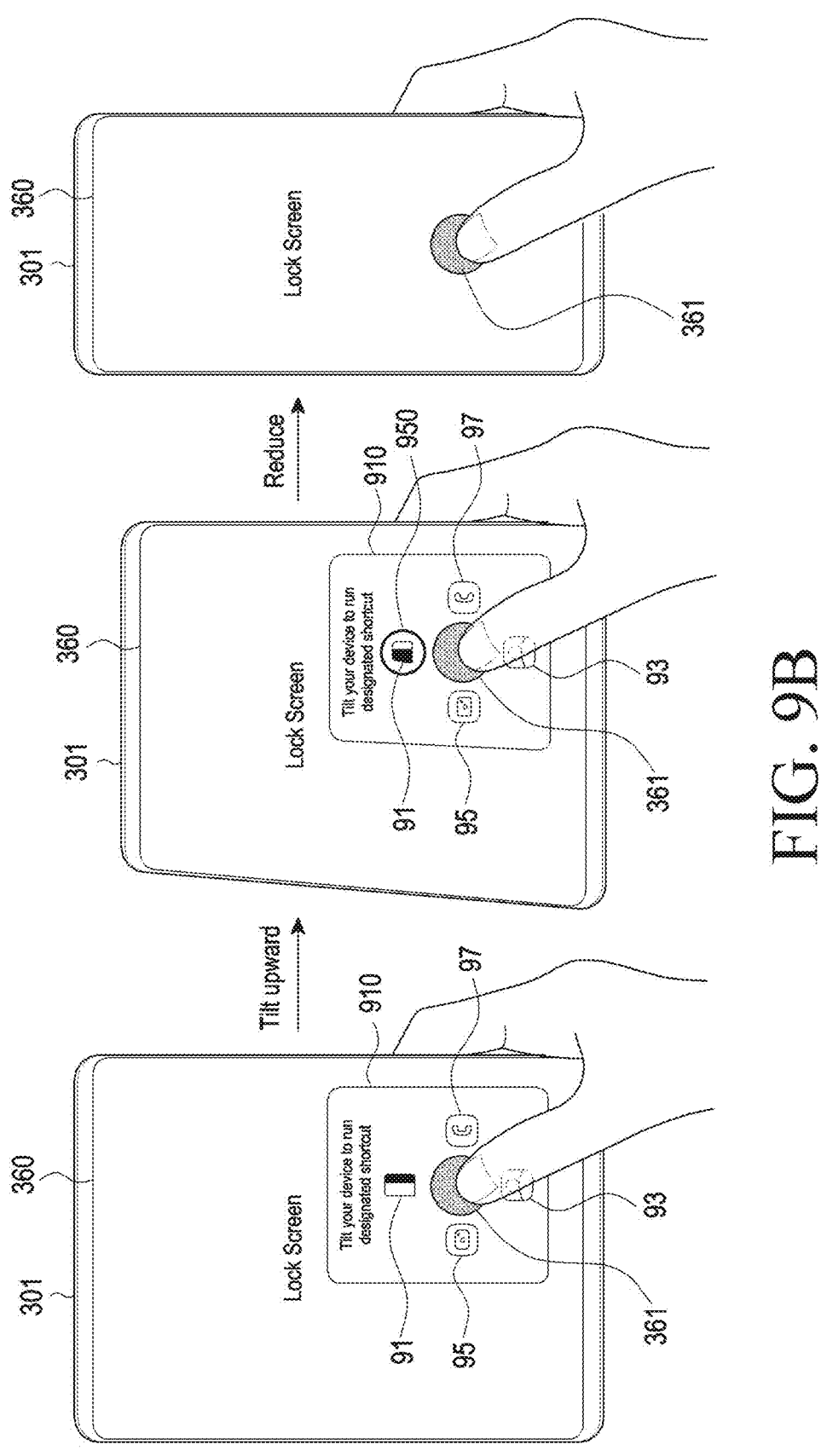
FIG. 9B is a diagram illustrating an example of executing a function selected from among displayed information indicating at least one specified function, based on receiving a second input while holding a first input for fingerprint recognition, according to an embodiment of the disclosure.

FIG. 9B is a diagram illustrating an example of executing a function selected from among displayed user interface indicating at least one menu, based on receiving a second input while holding a first input for fingerprint recognition, according to an embodiment of the disclosure.

Referring to FIG. 9B, the processor 320 according to an embodiment may identify reception of a second input for tilting the electronic device 301 (lower portion of the electronic device 301) upwards at a specified angle or more in the +Z-axis direction (or for tilting the lower portion of the electronic device 301 upwards) through the gyro sensor during the display of a user interface 910 including at least one menu while the first input is being held in the display expansion and locked state. If a second input for tilting the electronic device upwards is received while the first input is being held, the processor 320 according to an embodiment may display an indication 950 indicating the tilt-up state depending on a tilt-up angle. If a second input for tilting the electronic device 301 upwards is received while the first input is being held, the processor 320 according to an embodiment may identify an execution request for the display contraction function icon 91. The processor 320 according to an embodiment, based on the identification of the execution request for the display contraction function icon 91, may perform a display contraction function (reduce the display).

Although the tilt-up input has been described by way of example in FIG. 9B, a function for the tilt-down, tilt-left, or tilt-right input and an icon corresponding thereto may also be performed in the same manner. For example, if a second input for tilting the electronic device 301 (lower portion of the electronic device 301) downwards (or for tilting the lower portion of the electronic device 301 downwards) at a specified angle or more in the −Z-axis direction is received while the first input is being held, the processor 320 identifies an execution request for the unlock function icon 93 and, based on the identification of the execution request for the unlock function icon 93, perform a camera function (or application). For example, if a second input for tilting the electronic device 301 (right portion of the electronic device 301) to the left at a specified angle or more in the −X-axis direction (or for tilting the right portion of the electronic device 301 to the left) is received while the first input is being held, the processor 320 identifies an execution request for the camera function icon 95 and, based on the identification of the execution request for the camera function icon 95, perform a camera function (or application). For example, if a second input for tilting the electronic device 301 (right portion of the electronic device 301) to the right at a specified angle or more in the +X-axis direction (or for tilting the right portion of the electronic device 301 to the right) is received while the first input is being held, the processor 320 may identify an execution request for the call function icon 97 and, based on the identification of the execution request for the call function icon 97, perform a call function (or application).

Figure 10:
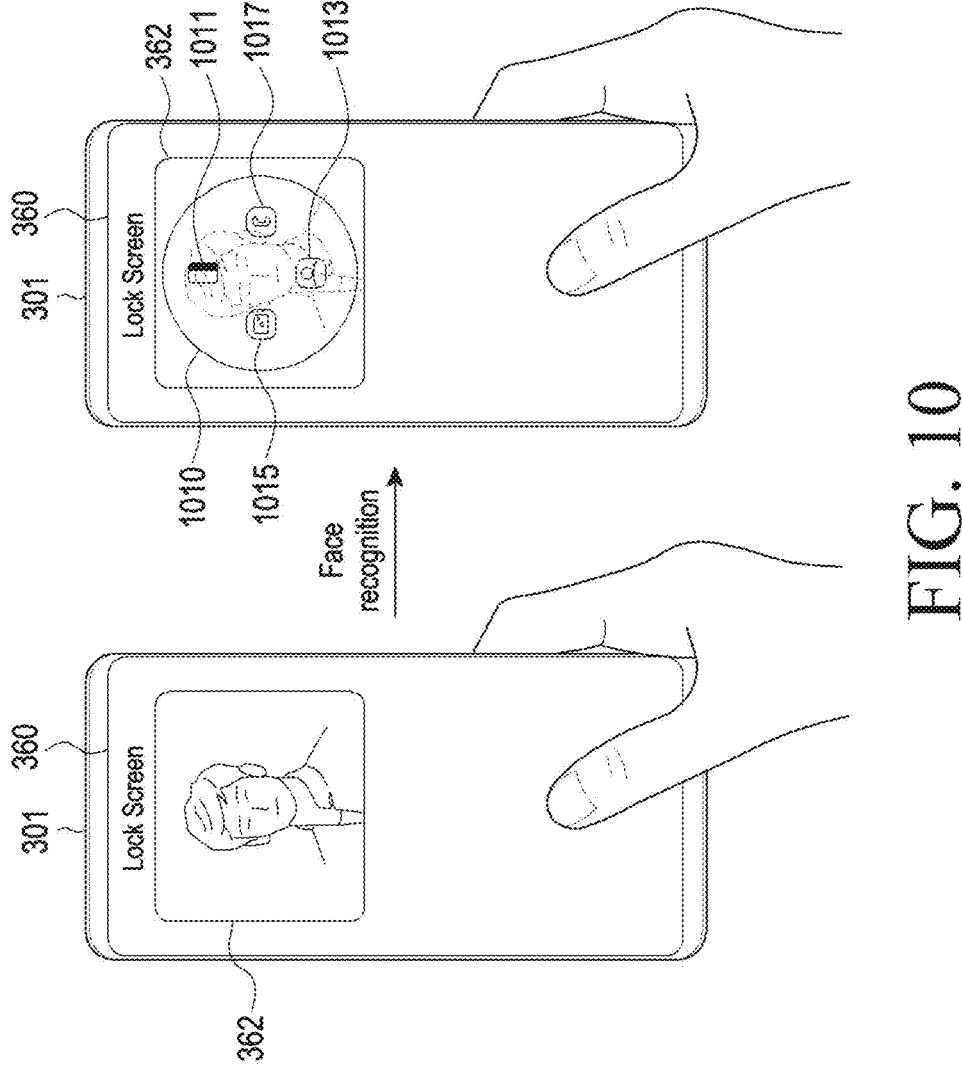
FIG. 10 is a diagram illustrating an example of displaying at least one specified function available for execution request using a second input while holding a first input for face recognition according to an embodiment of the disclosure.

FIG. 10 is a diagram illustrating an example of displaying a user interface including at least one menu available for execution request using a second input while holding a first input for face recognition according to an embodiment of the disclosure.

Referring to FIG. 10, a processor (e.g., the processor 120 in FIG. 1 or the processor 320 in FIG. 3) of an electronic device 301 (e.g., the electronic device 101 in FIG. 1 or the electronic device 200 in FIGS. 2A and 2B) according to an embodiment may display a locked screen on the contracted display 360 in the display contraction and locked state. The processor 320 of the electronic device 301 according to an embodiment may receive a face image through the camera module 380 while a locked screen is being displayed on the contracted display and display the same through at least one area (e.g., a face recognition area) 362 of the display 360, thereby performing face recognition through the face recognition sensor. According to an embodiment, the processor 320 may also perform face recognition without displaying the face recognition area 362 for face recognition and the received face image. The processor 320 of the electronic device 301 according to an embodiment may identify, as a first state (e.g., current state) of the electronic device 301, the display contraction and locked state, recognize a face corresponding to a first input through the face recognition sensor in the display contraction and locked state, and perform user authentication using the recognized face information. The processor 320 of the electronic device 301 according to an embodiment, based on the success in user authentication through face recognition using the first input, may display a user interface 1010 including at least one menu available for execution request using a second input while the first input is being held. For example, the user interface 1010 including at least one menu may be of a pop-up window (or pop-up menu) type. For example, the user interface 1010 including at least one menu may include at least one shortcut menu or function icon (or specified function icon). For example, at least one shortcut menu or function icon includes a display expansion function icon 1011 for switching a display contraction state to a display expansion state and an unlock function icon 1013 for switching a locked state to an unlocked state, and further includes a camera function (or application) icon 1015, a phone function (or application) icon 1017, and/or other function (or application) icons or exclude some icons. For example, the processor 320 displays the user interface 1010 including at least one menu in an area adjacent to the face recognition area 362 (or an area overlapping the face recognition area 362) or display the same at a specified position irrelevant to the position of the face recognition area 362 while face recognition area 362 is not being displayed. The processor 320 according to an embodiment may stop displaying the user interface 1010 including at least one menu when the first input is not held. For example, the display expansion function icon 1011, the unlock function icon 1013, the camera function (or application) icon 1015, or the phone function (or application) icon 1017 are respectively selected for execution request using a second input (e.g., an additional input or a different type of input from the first input) that is further input while the first input is being held. For example, the second input may include a tilt-up, -down, -left, or -light input, a swipe-up, -down, -left, or -right input, an input of movement of a face subject to face recognition in the upward, downward, left, or right direction, or an input of movement of an iris (or eye) subject to iris recognition in the upward, downward, left, or right direction.

Figure 11A:
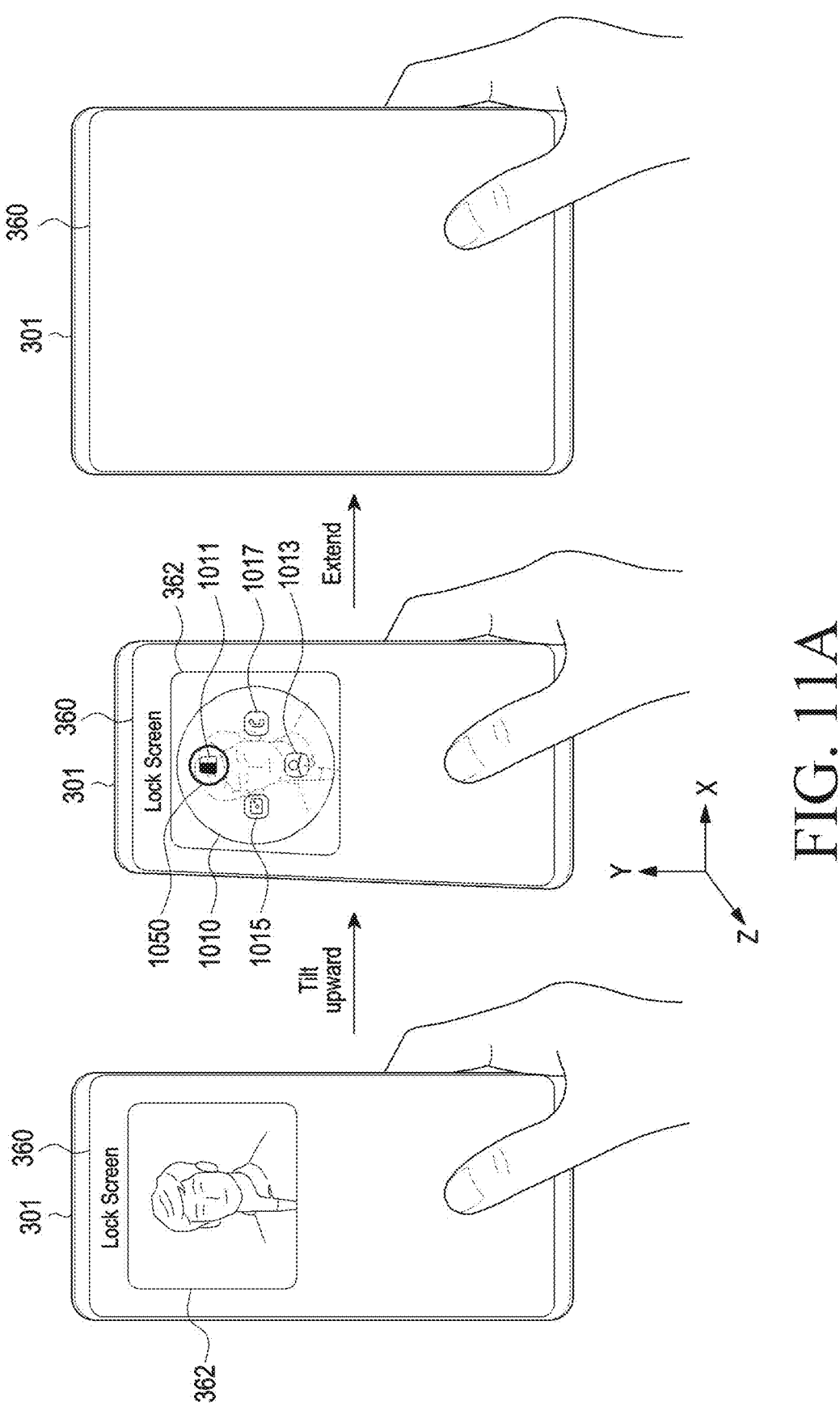
FIG. 11A is a diagram illustrating the case where a second input for tilting up an electronic device is received while holding at least a first input for face recognition according to an embodiment of the disclosure.

FIG. 11A is a diagram illustrating the case where a second input for tilting up an electronic device is received while holding at least a first input for face recognition according to an embodiment of the disclosure.

Figure 11B:
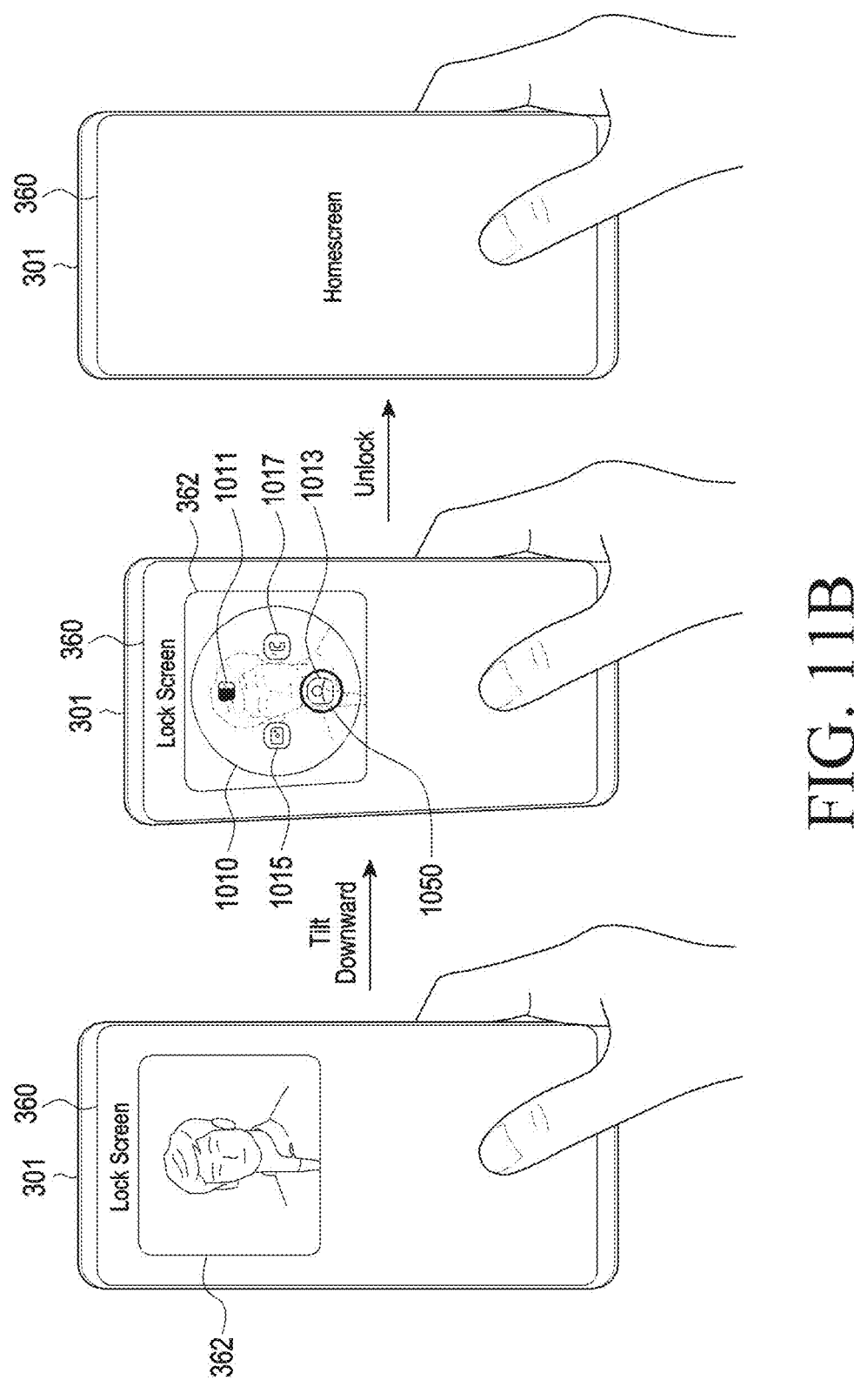
FIG. 11B is a diagram illustrating the case where a second input for tilting down an electronic device is received while holding a first input for face recognition according to an embodiment of the disclosure.

FIG. 11B is a diagram illustrating the case where a second input for tilting down an electronic device is received while holding a first input for face recognition according to an embodiment of the disclosure.

Referring to FIG. 11A, the processor 320 according to an embodiment may identify reception of a second input for tilting the electronic device 301 (lower portion of the electronic device 301) upwards at a specified angle or more in the +Z-axis direction (or for tilting the lower portion of the electronic device 301 upwards) through the gyro sensor during the display of a user interface 1010 including at least one menu, based on a first input being held, after successful user authentication through face recognition using the first input. If a second input for tilting the electronic device 301 (lower portion of the electronic device 301) upwards at a specified angle or more in the +Z-axis direction is received while the first input is being held, the processor 320 according to an embodiment may display an indication 1050 indicating the tilt-up state depending on a tilt-up angle. If a second input for tilting the electronic device 301 upwards at a specified angle or more is received while the first input is being held, the processor 320 according to an embodiment may identify an execution request for the display expansion function icon 1011. The processor 320 according to an embodiment, based on the identification of the execution request for the display expansion function icon 1011, may perform a display expansion function (extend the display).

Referring to FIG. 11B, the processor 320 according to an embodiment may identify reception of a second input for tilting the electronic device 301 (lower portion of the electronic device 301) downwards at a specified angle or more in the −Z-axis direction (or for tilting the lower portion of the electronic device 301 downwards) through the gyro sensor during the display of a user interface 1010 including at least one menu, based on a first input being held, after successful user authentication through face recognition using the first input. If a second input for tilting the electronic device 301 (lower portion of the electronic device 301) downwards at a specified angle or more in the −Z-axis direction is received while the first input is being held, the processor 320 according to an embodiment may display an indication 1050 indicating the tilt-down state depending on a tilt-down angle. If a second input for tilting the electronic device 301 (lower portion of the electronic device 301) downwards at a specified angle or more in the −Z-axis direction is received while the first input is being held, the processor 320 according to an embodiment may identify an execution request for the unlock function icon 1013. The processor 320 according to an embodiment, based on the identification of the execution request for the unlock function icon 1013, may perform an unlock function (unlock the screen).

Although the tilt-up and tilt-down inputs have been described by way of example in FIGS. 11A and 11B, a function for the tilt-left or tilt-right input and an icon corresponding thereto may also be performed in the same way. For example, if a second input for tilting the electronic device 301 (right portion of the electronic device 301) to the left at a specified angle or more in the −X-axis direction (or for tilting the right portion of the electronic device 301 to the left) is received while a first input is being held during the display of a user interface 1010 including at least one menu after successful user authentication through face recognition using the first input, the processor 320 identifies an execution request for the camera function icon 1015 and, based on the identification of the execution request for the camera function icon 1015, perform a camera function (or application). For example, if a second input for tilting the electronic device 301 (right portion of the electronic device 301) to the right at a specified angle or more in the +X-axis direction (or for tilting the right portion of the electronic device 301 to the right) is received during the display of a user interface 1010 including at least one menu after successful user authentication through face recognition using a first input, the processor 320 may identify an execution request for the call function icon 1017 and, based on the identification of the execution request for the call function icon 1017, perform a call function (or application).

Figure 11C:
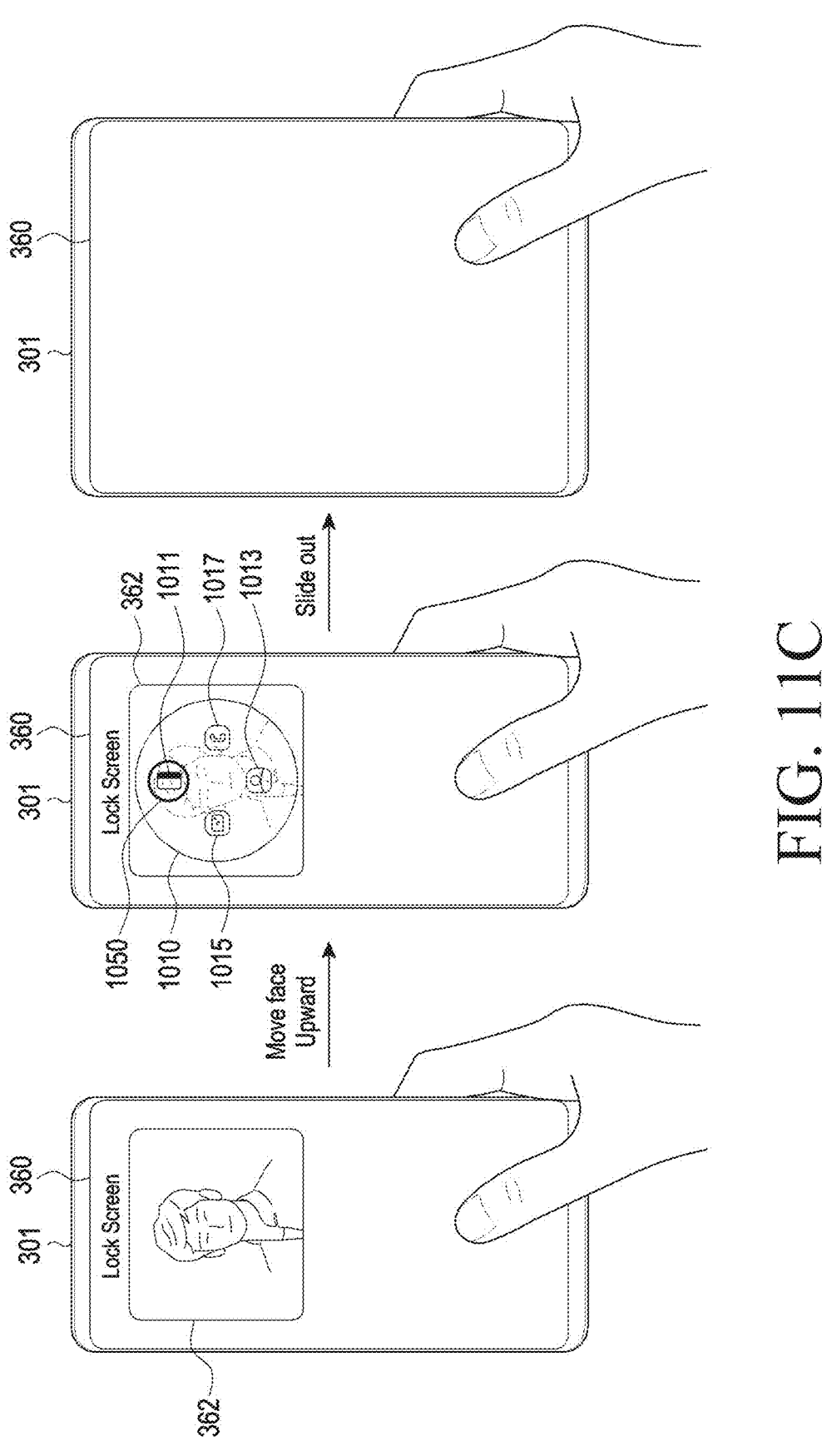
FIG. 11C is a diagram illustrating the case where a second input corresponding to an upward facial movement is received while holding a first input for face recognition according to an embodiment of the disclosure.

FIG. 11C is a diagram illustrating the case where a second input corresponding to an upward facial movement is received while holding a first input for face recognition according to an embodiment of the disclosure.

Figure 11D:
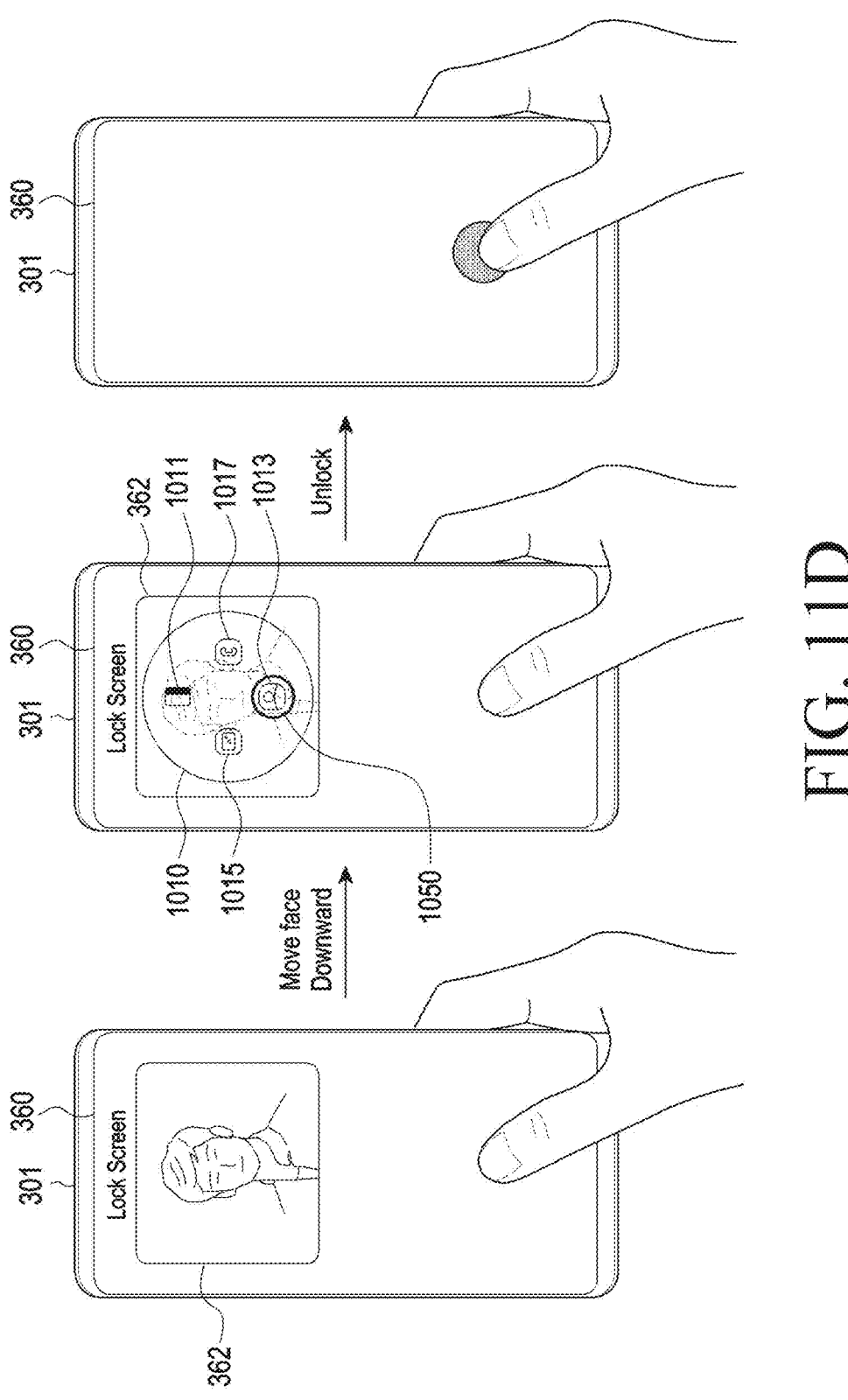
FIG. 11D is a diagram illustrating the case where a second input corresponding to a downward facial movement is received while holding a first input for face recognition according to an embodiment of the disclosure.

FIG. 11D is a diagram illustrating the case where a second input corresponding to a downward facial movement is received while holding a first input for face recognition according to an embodiment of the disclosure.

Referring to FIG. 11C, the processor 320 according to an embodiment may identify the direction (e.g., an upward, downward, left, or right direction) of facial movement through the face recognition sensor during the display of a user interface 1010 including at least one menu, based on a first input being held, after successful user authentication through face recognition using the first input, and obtain (or receive), as a second input, the identified direction of facial movement. If an upward facial movement is identified while displaying the user interface 1010 including at least one menu, based on the first input being held, after successful user authentication through face recognition using the first input, the processor 320 according to an embodiment may display an indication 1050 indicating the upward facial movement state depending on the degree or angle of facial movement in the upward direction. The processor 320 according to an embodiment, based on receiving the second input corresponding to the upward facial movement, may identify an execution request for the display expansion function icon 1011. The processor 320 according to an embodiment, based on the identification of the execution request for the display expansion function icon 1011, may perform a display expansion function (extend the display).

Referring to FIG. 11D, the processor 320 according to an embodiment may receive a second input corresponding to a downward facial movement during the display of a user interface 1010 including at least one menu, based on a first input being held, after successful user authentication through face recognition using the first input. If a downward facial movement is identified while displaying the user interface 1010 including at least one menu, based on the first input being held, after successful user authentication through face recognition using the first input, the processor 320 according to an embodiment may display an indication 1050 indicating the downward facial movement state depending on the degree or angle of facial movement in the downward direction. The processor 320 according to an embodiment, based on receiving the second input corresponding to the downward facial movement, may identify an execution request for the unlock function icon 1013. The processor 320 according to an embodiment, based on the identification of the execution request for the unlock function icon 1013, may perform an unlock function (unlock the screen).

Although the examples of the second input corresponding to the upward or downward facial movement have been described in FIGS. 11C and 11D, a function may also be performed in the same manner for the second input corresponding to the left or right facial movement and icons corresponding thereto. For example, if a second input corresponding to a left facial movement is received while displaying the user interface 1010 including at least one menu, based on a first input being held, after successful user authentication through face recognition using the first input, the processor 320 identifies an execution request for the camera function icon 1015 and, based on the identification of the execution request for the camera function icon 1015, perform a camera function (or application). For example, if a second input corresponding to a right facial movement is received while displaying the user interface 1010 including at least one menu, based on a first input being held, after successful user authentication through face recognition using the first input, the processor 320 identifies an execution request for the call function icon 1017 and, based on the identification of the execution request for the call function icon 1017, perform a call function (or application).

Figure 12:
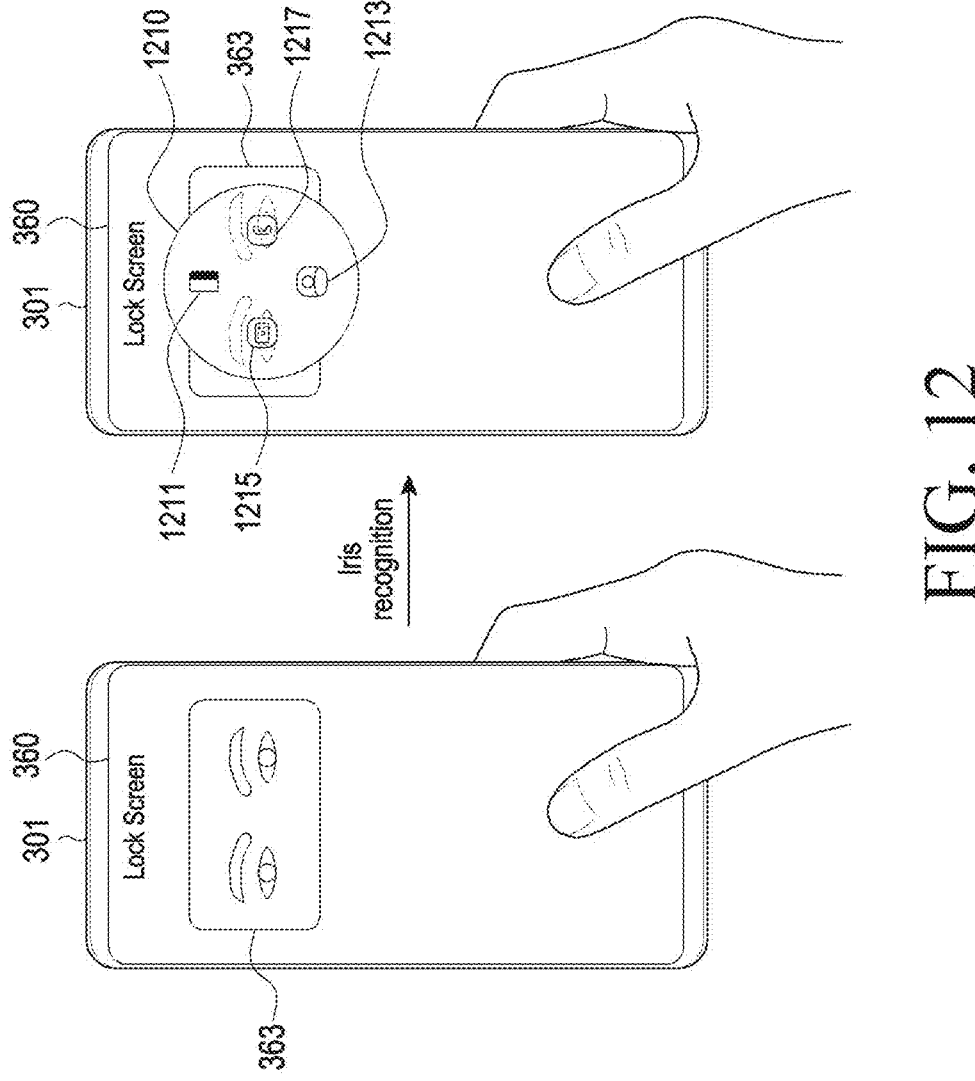
FIG. 12 is a diagram illustrating an example of displaying at least one specified function available for execution request using a second input while holding a first input for iris recognition according to an embodiment of the disclosure.

FIG. 12 is a diagram illustrating an example of displaying a user interface including at least one menu available for execution request using a second input while holding a first input for iris recognition according to an embodiment of the disclosure.

Referring to FIG. 12, a processor (e.g., the processor 120 in FIG. 1 or the processor 320 in FIG. 3) of an electronic device 301 (e.g., the electronic device 101 in FIG. 1 or the electronic device 200 in FIGS. 2A and 2B) according to an embodiment may display a locked screen on the contracted display 360 in the display contraction and locked state. The processor 320 of the electronic device 301 according to an embodiment may receive an iris image through the camera module 380 (or the iris sensor) while a locked screen is being displayed on the contracted display and display the same through at least one area (e.g., an iris recognition area) 363 of the display 360, thereby performing iris recognition. According to an embodiment, the processor 320 may also perform iris recognition without displaying the iris recognition area 363 and the received iris image. The processor 320 of the electronic device 301 according to an embodiment may identify, as a first state (e.g., current state) of the electronic device 301, the display contraction and locked state, recognize an iris corresponding to a first input through the iris recognition sensor in the display contraction and locked state, and perform user authentication using the recognized iris. The processor 320 of the electronic device 301 according to an embodiment, based on the success in user authentication (iris recognition) through iris recognition using the first input, may display a user interface 1210 including at least one menu available for execution request using a second input while the first input is being held. For example, the user interface 1210 including at least one menu may be a pop-up window (or pop-up menu). For example, the user interface 1210 including at least one menu includes at least one shortcut menu or function icon (or specified function icon). For example, at least one shortcut menu or function icon includes a display expansion function icon 1211 for switching a display contraction state to a display expansion state and an unlock function icon 1213 for switching a locked state to an unlocked state, and may further include a camera function (or application) icon 1215, a phone function (or application) icon 1217, and/or other function (or application) icons or exclude some icons. For example, the processor 320 displays the user interface 1210 including at least one menu in an area adjacent to the iris recognition area 363 (or an area overlapping the iris recognition area 363). The processor 320 according to an embodiment may stop displaying the user interface 1210 including at least one menu when the first input is not held. For example, the display expansion function icon 1211, the unlock function icon 1213, the camera function (or application) icon 1215, or the phone function (or application) icon 1217 are respectively selected for execution request using a second input (e.g., an additional input or a different type of input from the first input) that is further input while the first input is being held. For example, the second input may include a tilt-up, -down, -left, or -light input, a swipe-up, -down, -left, or -right input, an input of movement of a face subject to face recognition in the upward, downward, left, or right direction, or an input of movement of an iris (or eye) subject to iris recognition in the upward, downward, left, or right direction.

Figure 13A:
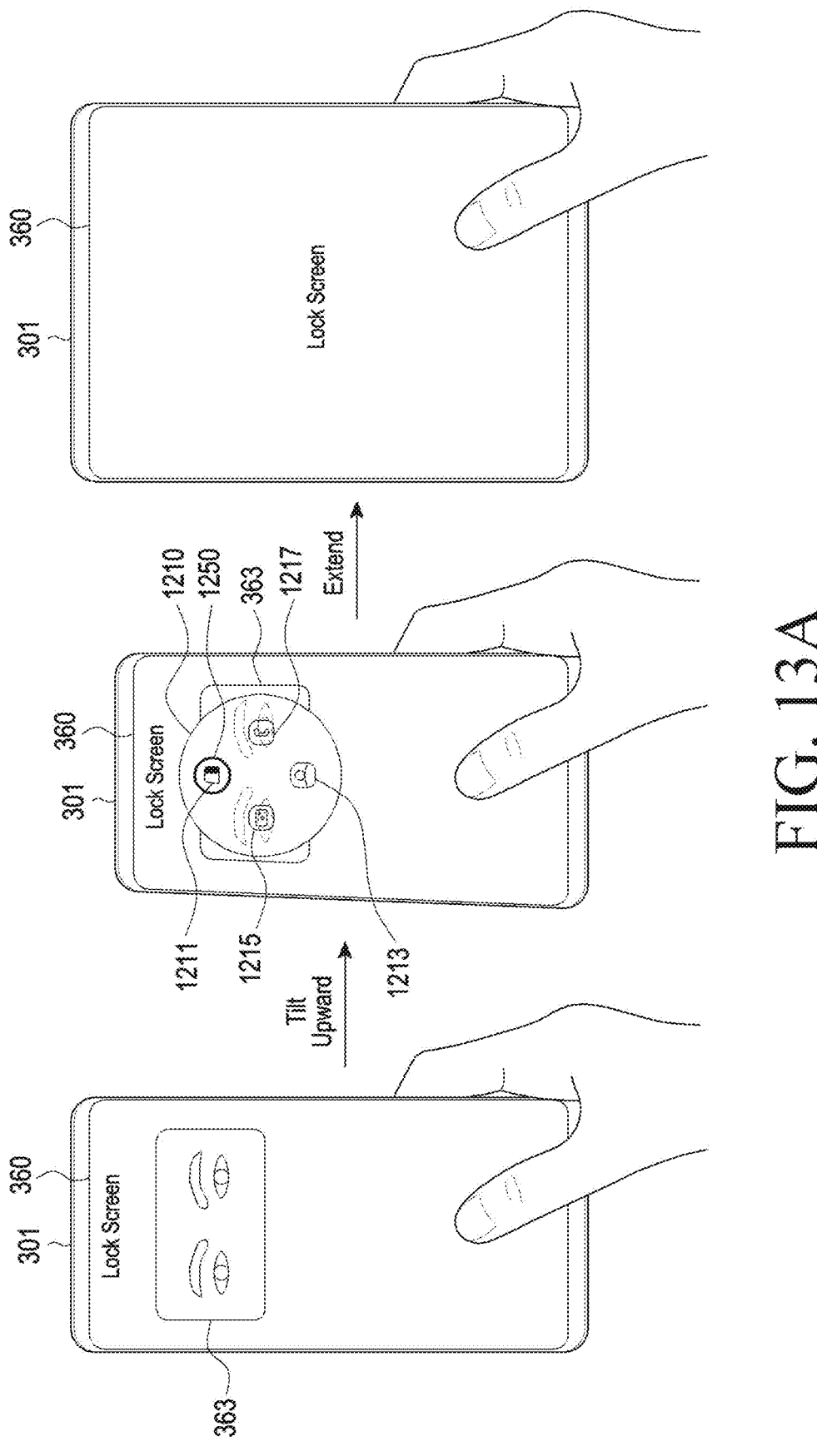
FIG. 13A is a diagram illustrating the case where a second input for tilting up an electronic device is received while holding a first input for iris recognition according to an embodiment of the disclosure.

FIG. 13A is a diagram illustrating the case where a second input for tilting up an electronic device is received while holding a first input for iris recognition according to an embodiment of the disclosure.

Figure 13B:
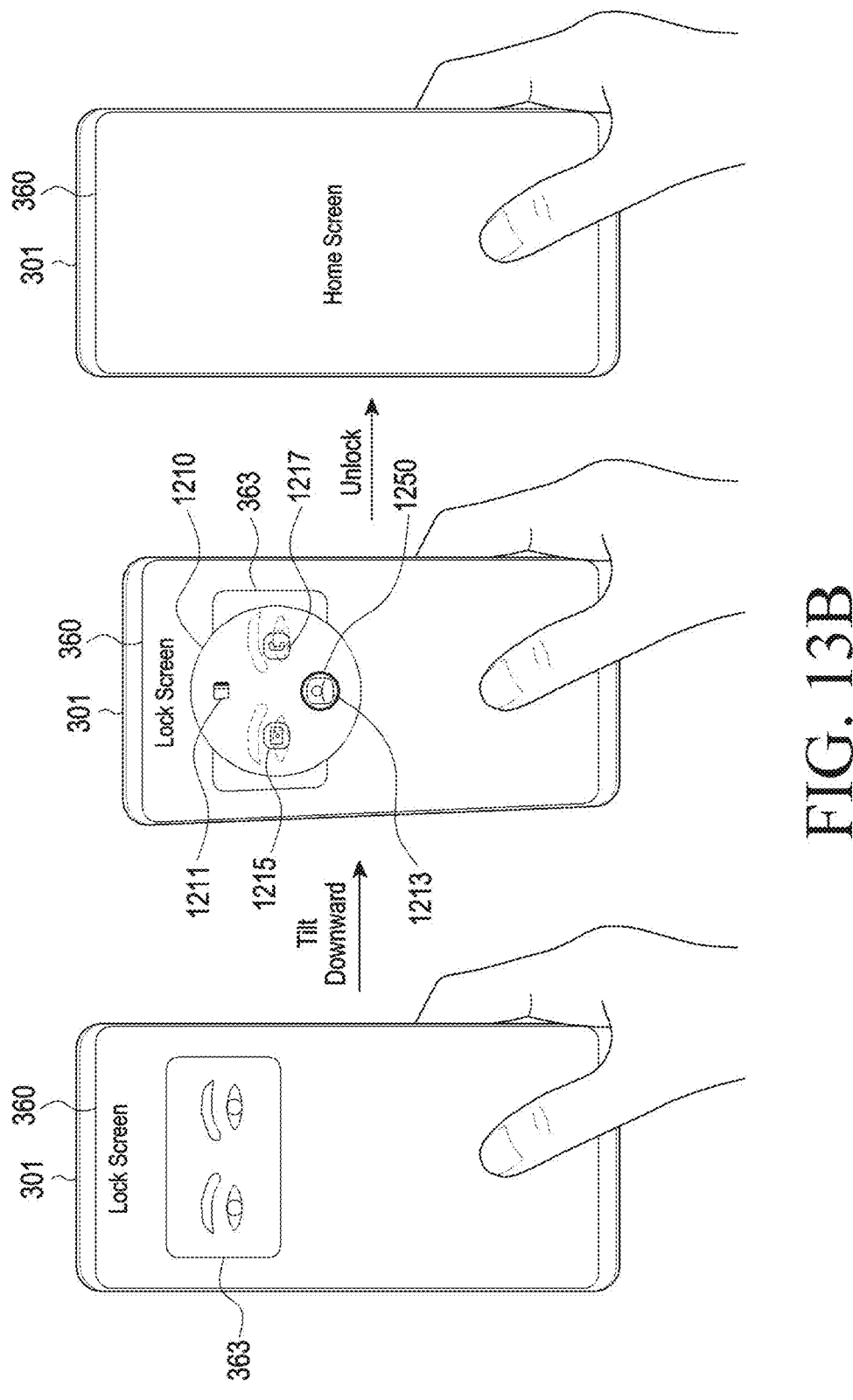
FIG. 13B is a diagram illustrating the case where a second input for tilting down an electronic device is received while holding a first input for iris recognition according to an embodiment of the disclosure.

FIG. 13B is a diagram illustrating the case where a second input for tilting down an electronic device is received while holding a first input for iris recognition according to an embodiment of the disclosure.

Referring to FIG. 13A, the processor 320 according to an embodiment may identify reception of a second input for tilting the electronic device 301 (lower portion of the electronic device 301) upwards at a specified angle or more in the +Z-axis direction (or for tilting the lower portion of the electronic device 301 upwards) through the gyro sensor during the display of a user interface 1210 including at least one menu, based on a first input being held, after successful user authentication through iris recognition using the first input. If a second input for tilting the electronic device 301 (lower portion of the electronic device 301) upwards in the +Z-axis direction is received while displaying the user interface 1210 including at least one menu, the processor 320 according to an embodiment may display an indication 1250 indicating the tilt-up state depending on a tilt-up angle. If a second input for tilting the electronic device 301 (lower portion of the electronic device 301) upwards at a specified angle or more in the +Z-axis direction is received during the display of the user interface 1210 including at least one menu, based on a first input being held, after successful user authentication through iris recognition using the first input, the processor 320 according to an embodiment may identify an execution request for the display expansion function icon 1211. The processor 320 according to an embodiment may perform a display expansion function (extend the display), based on the identification of the execution request for the display expansion function icon 1211.

Referring to FIG. 13B, the processor 320 according to an embodiment may identify reception of a second input for tilting the electronic device 301 (lower portion of the electronic device 301) downwards at a specified angle or more in the −Z-axis direction (or for tilting the lower portion of the electronic device 301 downwards) through the gyro sensor during the display of a user interface 1210 including at least one menu, based on a first input being held, after successful user authentication through iris recognition using the first input. If a second input for tilting the electronic device 301 (lower portion of the electronic device 301) downwards in the −Z-axis direction is received while displaying the user interface 1210 including at least one menu, the processor 320 according to an embodiment may display an indication 1250 indicating the tilt-down state depending on a tilt-down angle. If a second input for tilting the electronic device 301 (lower portion of the electronic device 301) downwards at a specified angle or more in the −Z-axis direction is received during the display of the user interface 1210 including at least one menu, based on a first input being held, after successful user authentication through iris recognition using the first input, the processor 320 according to an embodiment may identify an execution request for the unlock function icon 1213. The processor 320 according to an embodiment may perform an unlock function (unlock the screen), based on the identification of the execution request for the unlock function icon 1213.

Although the tilt-up and tilt-down inputs have been described by way of example in FIGS. 13A and 13B, a function may also be performed in the same manner for the tilt-left or tilt-right input and an icon corresponding thereto. For example, if a second input for tilting the electronic device 301 (right portion of the electronic device 301) to the left at a specified angle or more in the −X-axis direction (or for tilting the right portion of the electronic device 301 to the left) is received while a first input is being held during the display of a user interface 1210 including at least one menu after successful user authentication through iris recognition using the first input, the processor 320 identifies an execution request for the camera function icon 1215 and, based on the identification of the execution request for the camera function icon 1215, perform a camera function (or application). For example, if a second input for tilting the electronic device 301 (right portion of the electronic device 301) to the right at a specified angle or more in the +X-axis direction (or for tilting the right portion of the electronic device 301 to the right) is received while information indicating at least one specified function is being displayed after successful user authentication through iris recognition using a first input, the processor 320 identifies an execution request for the call function icon 1217 and, based on the identification of the execution request for the call function icon 1217, perform a call function (or application).

Figure 13C:
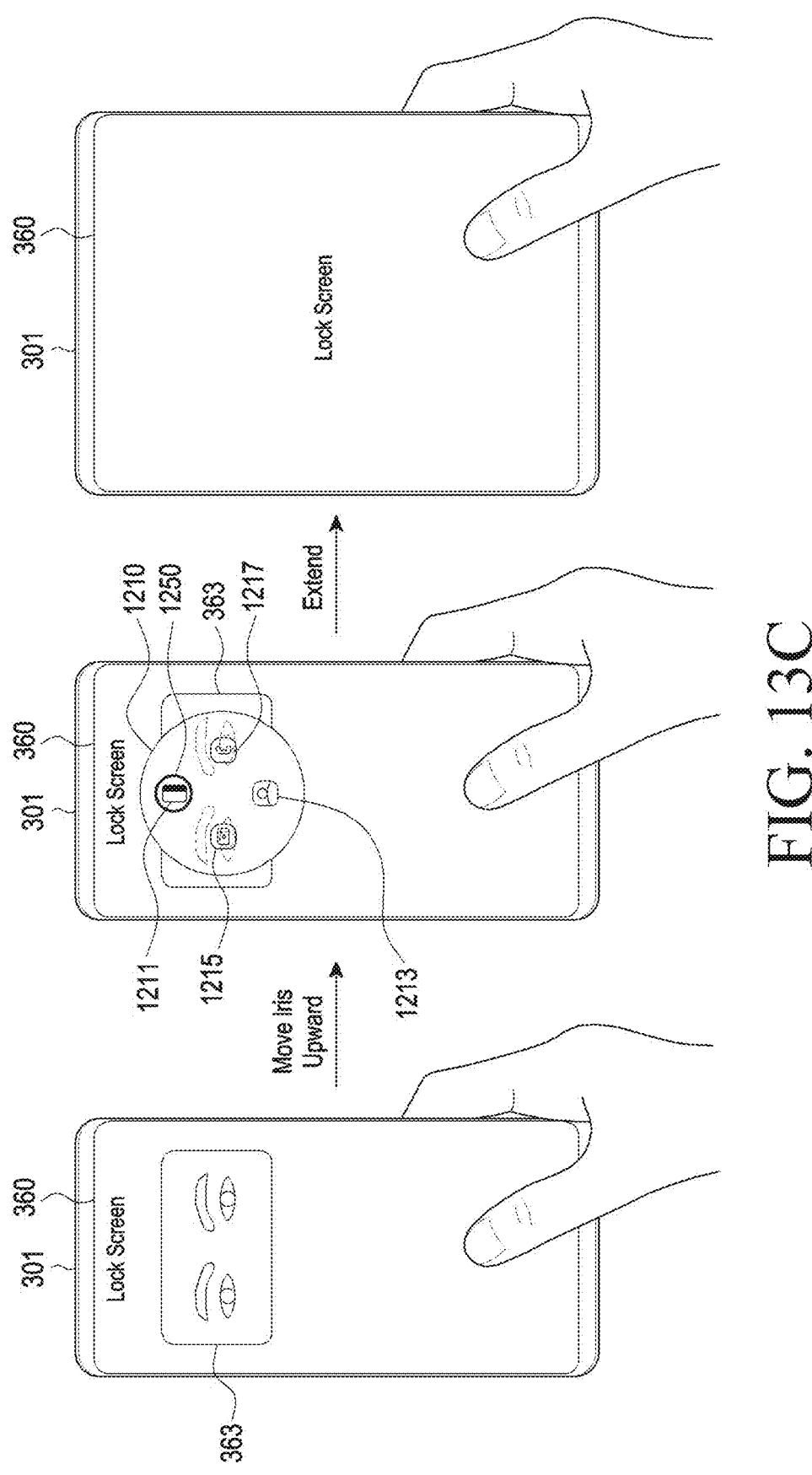
FIG. 13C is a diagram illustrating the case where a second input corresponding to an upward iris movement is received while holding at least a first input for iris recognition according to an embodiment of the disclosure.

FIG. 13C is a diagram illustrating the case where a second input corresponding to an upward iris movement is received while holding at least a first input for iris recognition according to an embodiment of the disclosure.

Figure 13D:
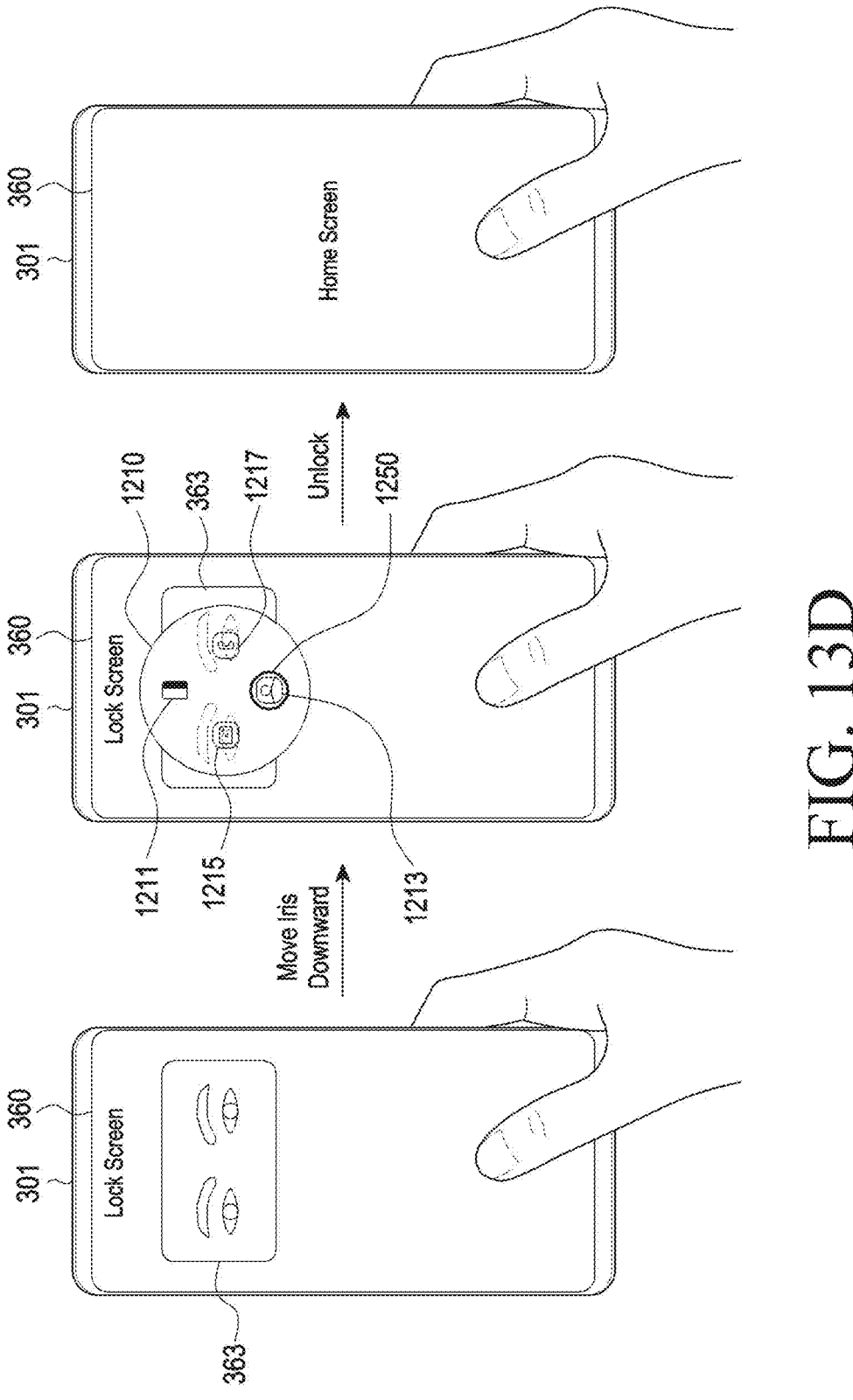
FIG. 13D is a diagram illustrating the case where a second input corresponding to a downward iris movement is received while holding a first input for iris recognition according to an embodiment of the disclosure.

FIG. 13D is a diagram illustrating the case where a second input corresponding to a downward iris movement is received while holding a first input for iris recognition according to an embodiment of the disclosure.

Referring to FIG. 13C, the processor 320 according to an embodiment may identify the direction (e.g., an upward, downward, left, or right direction) of iris (or eye) movement through the iris recognition sensor during the display of a user interface 1210 including at least one menu, based on a first input being held, after successful user authentication through iris recognition using the first input, and obtain (or receive), as a second input, the identified direction of iris movement. If an upward iris movement is identified while displaying the user interface 1210 including at least one menu, based on the first input being held, after successful user authentication through iris recognition using the first input, the processor 320 according to an embodiment may display an indication 1250 indicating the upward iris movement state depending on the degree or angle of iris movement in the upward direction. The processor 320 according to an embodiment, based on receiving the second input corresponding to the upward iris movement, may identify an execution request for the display expansion function icon 1211. The processor 320 according to an embodiment, based on the identification of the execution request for the display expansion function icon 1211, may perform a display expansion function (extend the display).

Referring to FIG. 13D, the processor 320 according to an embodiment may receive a second input corresponding to a downward iris movement during the display of a user interface 1210 including at least one menu, based on a first input being held, after successful user authentication through iris recognition using the first input. If a downward iris movement is identified while displaying the user interface 1210 including at least one menu, based on the first input being held, after successful user authentication through iris recognition using the first input, the processor 320 according to an embodiment may display an indication 1250 indicating the downward iris movement state depending on the degree or angle of iris movement in the downward direction. The processor 320 according to an embodiment, based on receiving the second input corresponding to the downward face movement, may identify an execution request for the unlock function icon 1213. The processor 320 according to an embodiment, based on the identification of the execution request for the unlock function icon 1213, may perform an unlock function (unlock the screen).

Although the examples of the second input corresponding to the upward or downward iris movement have been described in FIGS. 13C and 13D, a function may also be performed in the same manner for the second input corresponding to the left or right iris movement and icons corresponding thereto. For example, if a second input corresponding to a left iris movement is received while displaying the user interface 1210 including at least one menu, based on a first input being held, after successful user authentication through iris recognition using the first input, the processor 320 identifies an execution request for the camera function icon 1215 and, based on the identification of the execution request for the camera function icon 1215, perform a camera function (or application). For example, if a second input corresponding to a right iris movement is received while displaying the user interface 1210 including at least one menu, based on a first input being held, after successful user authentication through iris recognition using the first input, the processor 320 identifies an execution request for the call function icon 1217 and, based on the identification of the execution request for the call function icon 1217, perform a call function (or application).

Figure 14:
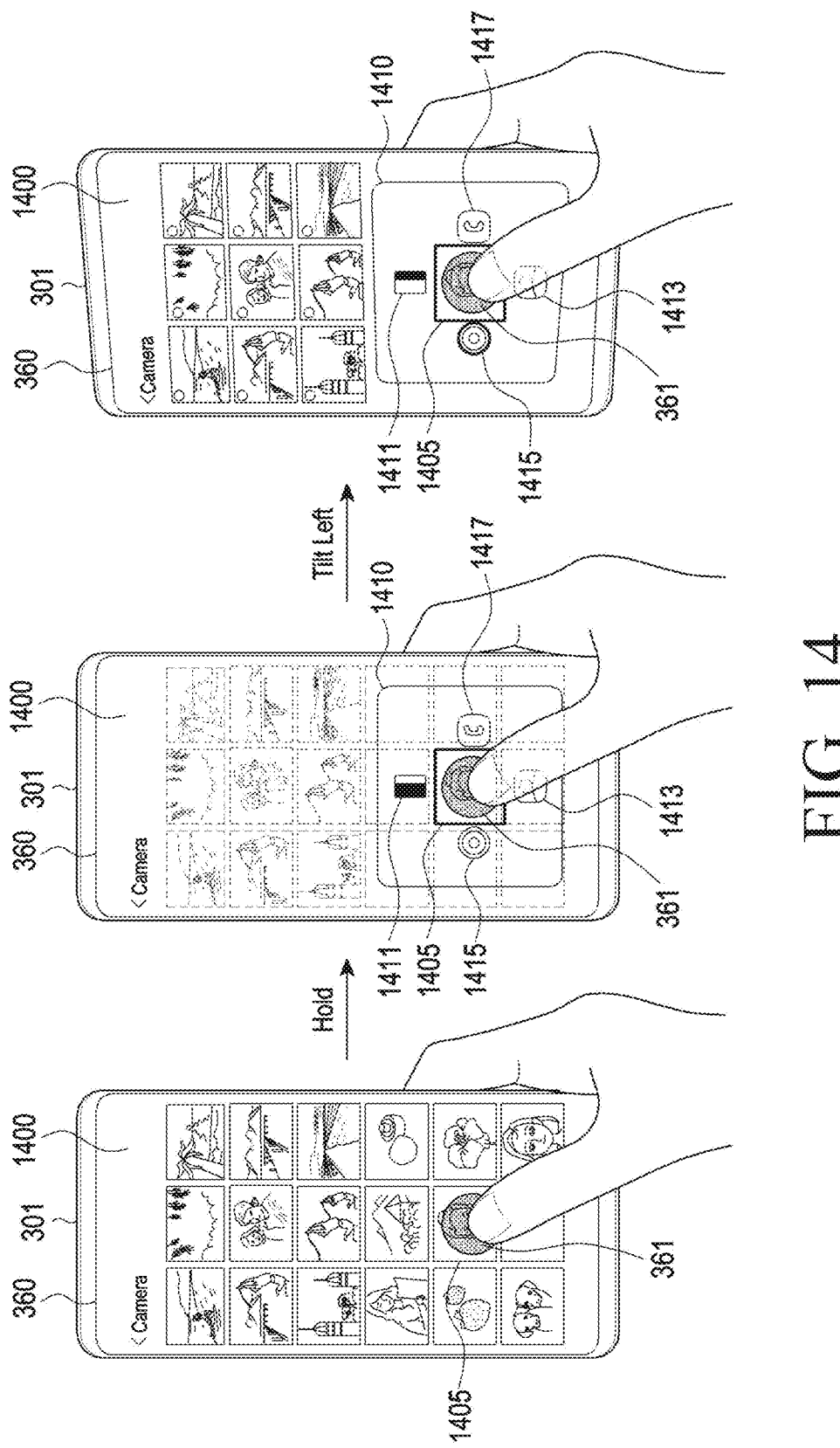
FIG. 14 is a diagram illustrating an example of displaying at least one specified function available for execution request through receiving a second input while holding a first input for fingerprint recognition in a state of displaying a first screen including an object according to an embodiment of the disclosure.

FIG. 14 is a diagram illustrating an example of displaying a user interface including at least one menu available for execution request through receiving a second input while holding a first input for fingerprint recognition in the state of displaying a first screen including an object according to an embodiment of the disclosure.

Referring to FIG. 14, a processor (e.g., the processor 120 in FIG. 1 or the processor 320 in FIG. 3) of an electronic device 301 (e.g., the electronic device 101 in FIG. 1 or the electronic device 200 in FIGS. 2A and 2B) according to an embodiment may receive first input for fingerprint recognition through a fingerprint recognition area (i.e., fingerprint input area 361) while displaying a first screen 1400 including an object 1405 (e.g., a photo application screen including photos). The object 1405 (e.g., a photo) according to an embodiment may be an object capable of calling an object-related function (e.g., a photo selection function), based on a long-press input onto the object 1405. If the fingerprint recognition area (i.e., fingerprint input area 361) and the object 1405 overlap each other when receiving the first input for fingerprint recognition, the processor 320 according to an embodiment may designate (or select or identify) the object-related function as at least one menu (or a user interface including at least one menu) available for execution request using a second input while holding the first input for fingerprint recognition. The processor 320 according to an embodiment may also display an object-related function icon 1415 when displaying a user interface 1410 including at least one menu, based on the first input being held, after successful user authentication through fingerprint recognition using the first input. For example, the processor 320 performs control such that the object-related function icon 1415 is further displayed in addition to at least one shortcut menu or function icon (e.g., a display expansion function icon 1411, an unlock function icon 1413 for switching a locked state to an unlocked state, and a phone function (or application) icon 1417) or such that the object-related function icon 1415 is displayed to replace one of the at least one shortcut menu or function icon (at a specified location or at an arbitrary location).

If a second input for tilting the electronic device 301 (right portion of the electronic device 301) to the left at a specified angle or more in the –X-axis direction (or for tilting the right portion of the electronic device 301 to the left) is received while the first input is being held during the display of the user interface 1410 including at least one menu, the processor 320 according to an embodiment may identify an execution request for the object-related function 1415. For example, the object-related function is a photo selection function using a check box. According to an embodiment, the processor 320 may execute a photo selection function, based on the identification of the execution request for the object-related function 1415, and display a screen according to the execution of the photo selection function.

Figure 15:
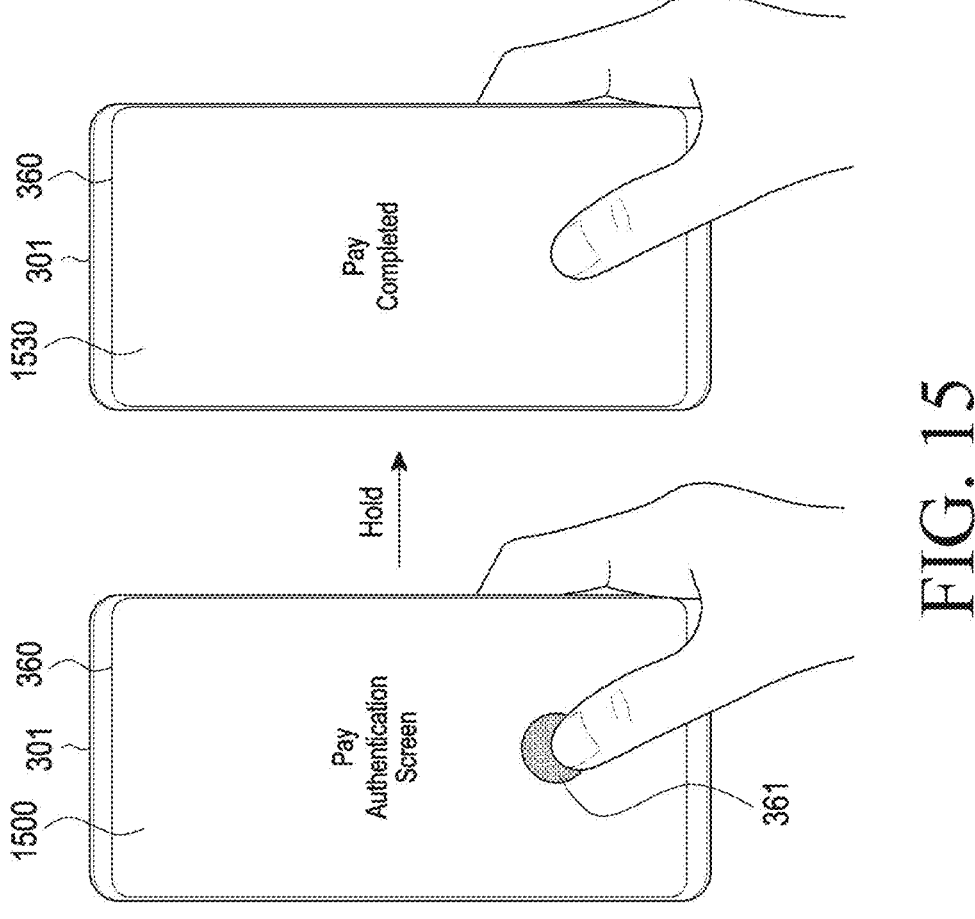
FIG. 15 is a diagram illustrating an example of a screen in the case where a first input for fingerprint recognition is an input requested by a user authentication-related application that is already running according to an embodiment of the disclosure.

FIG. 15 is a diagram illustrating an example of a screen in the case where a first input for fingerprint recognition is an input associated with user authentication in an application that is already running according to an embodiment of the disclosure.

Referring to FIG. 15, a processor (e.g., the processor 120 in FIG. 1 or the processor 320 in FIG. 3) of an electronic device 301 (e.g., the electronic device 101 in FIG. 1 or the electronic device 200 in FIGS. 2A and 2B) according to an embodiment, upon receiving a first input for fingerprint recognition through the fingerprint recognition area 361, may identify whether or not the first input is an input associated with user authentication (e.g., a pay authentication screen) 1500 in an application that is already running. If the first input for fingerprint recognition is an input associated with user authentication 1500 in an application that is already running, the processor 320 according to an embodiment may perform user authentication according to the flow of the running application, instead of displaying a user interface including at least one menu available for execution request using a second input. The processor 320 according to an embodiment, based on the completion of user authentication through user authentication in the application that is already running, may display a user authentication completion screen (e.g., a pay completion screen 1530) on the display 360.

Figure 16:
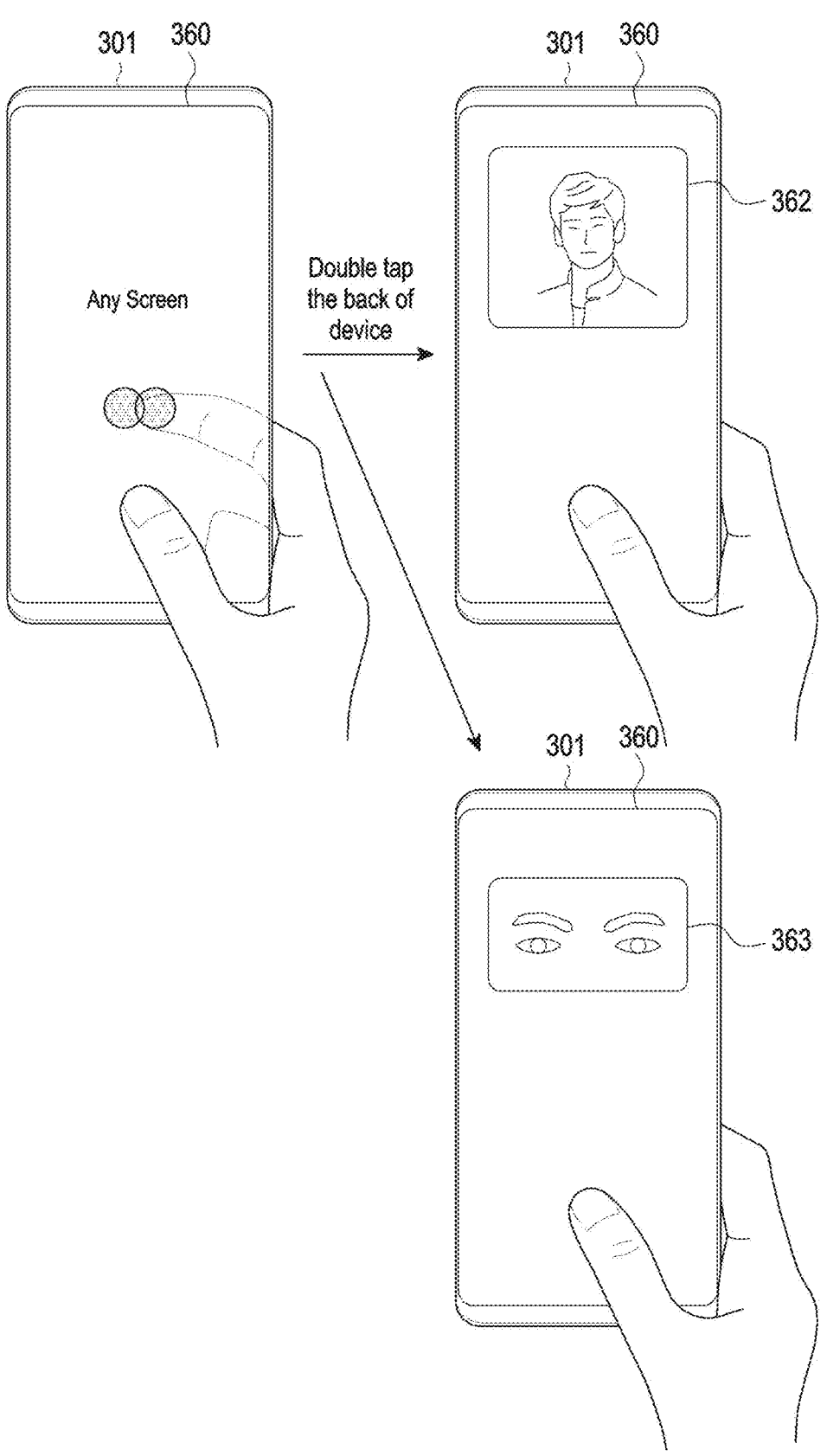
FIG. 16 is a diagram illustrating an example of calling an application for biometric recognition input according to an embodiment of the disclosure.

FIG. 16 is a diagram illustrating an example of calling an application for biometric recognition input according to an embodiment of the disclosure.

Referring to FIG. 16, a processor (e.g., the processor 120 in FIG. 1 or the processor 320 in FIG. 3) of an electronic device 301 (e.g., the electronic device 101 in FIG. 1 or the electronic device 200 in FIGS. 2A and 2B) according to an embodiment may call (or execute) an application for biometric information recognition by tapping (or touching or double-tapping) the rear surface (e.g., the plate 221 (or main case) in FIG. 2A) of the electronic device 301.

For example, if the rear surface of the electronic device 301 is double-tapped, the processor 320 executes an application for face recognition and display a face recognition area 362. The processor 320 according to an embodiment may identify a first state (or current state) of the electronic device 301 while the face recognition area 362 is being displayed and perform user authentication (e.g., first user authentication) associated with the first state. For example, the first state includes a locked state, an unlocked state, a display expansion state, a display contraction state, a specified-application deactivation (or non-execution) state, or a specified-application activation (or execution) state. For example, the processor 320 recognizes a face image input through the face recognition sensor in the first state and compare the recognized face with a pre-registered face of the user, thereby performing user authentication (or identify successful user authentication). The processor 320 according to an embodiment, based on the successful user authentication, may display a user interface (e.g., a pop-up window) including at least one menu available for execution request (or triggerable) using a second input (e.g., an additional input or a different type of input from the first input). For example, at least one or more shortcut menus or function icons are displayed on the pop-up window, and guide (or description) information about a second input (e.g., an input of movement of a face subject to face recognition in the upward, downward, left, or right direction) for executing each specified function may be further displayed thereon. For example, at least one shortcut menu or function icon includes a function of switching the electronic device 301 from a first state (e.g., a locked state, an unlocked state, a display expansion state, a display contraction state, or a specified-application deactivation (or non-execution) state) to a second state (e.g., un unlocked state, a locked state, a display contraction state, a display expansion state, or a specified-application activation (or execution) state). For example, if the first state is a locked state, the second state is an unlocked state, if the first state is a display contraction state, the second state may be a display expansion state, if the first state is a display expansion state, the second state may be a display contraction state, and if the first state is a specified-application deactivation (non-execution) state, the second state may be a specified-application activation (execution) state. For example, the specified application is a phone application, a camera application, a text application, or another application executable in the electronic device.

As another example, if the rear surface of the electronic device 301 is double-tapped, the processor 320 may execute an application for iris recognition and display an iris recognition area 363. Although the example of double-tapping the rear surface of the electronic device 301 has been explained in the above embodiment, various gestures, other than the double-tapping onto the rear surface, may be used to call an application for biometric information recognition.

The processor 320 according to an embodiment may identify a first state (or current state) of the electronic device 301 while the iris recognition area 363 is being displayed and perform user authentication (e.g., first user authentication) associated with the first state. For example, the first state includes a locked state, an unlocked state, a display expansion state, a display contraction state, a specified-application deactivation (or non-execution) state, or a specified-application activation (or execution) state. For example, the processor 320 recognizes an iris image input through the iris recognition sensor in the first state and perform user authentication (or identify successful user authentication). The processor 320 according to an embodiment, based on the successful user authentication, may display a user interface (e.g., a pop-up window) including at least one menu available for execution request (or triggerable) using a second input (e.g., an additional input or a different type of input from the first input). For example, at least one or more shortcut menus or function icons is displayed on the pop-up window, and guide (or description) information about a second input (e.g., an input of movement of an iris (or eye) subject to iris recognition in the upward, downward, left, or right direction) for executing each specified function may be further displayed thereon. For example, at least one shortcut menu or function icon includes a function of switching the electronic device 301 from a first state (e.g., a locked state, an unlocked state, a display expansion state, a display contraction state, or a specified-application deactivation (or non-execution) state) to a second state (e.g., un unlocked state, a locked state, a display contraction state, a display expansion state, or a specified-application activation (or execution) state). For example, if the first state is a locked state, the second state is an unlocked state, if the first state is a display contraction state, the second state may be a display expansion state, if the first state is a display expansion state, the second state may be a display contraction state, and if the first state is a specified-application deactivation (non-execution) state, the second state may be a specified-application activation (execution) state. For example, the specified application is a phone application, a camera application, a text application, or another application executable in the electronic device. Although the example of double-tapping to call (or execute) an application for biometric information recognition has been described n FIG. 16, the application for biometric information recognition may also be called (or executed) by other input operations such as pressing a button (e.g., a side button) twice or pressing a button long, instead of the double-tapping.

Figure 17A:
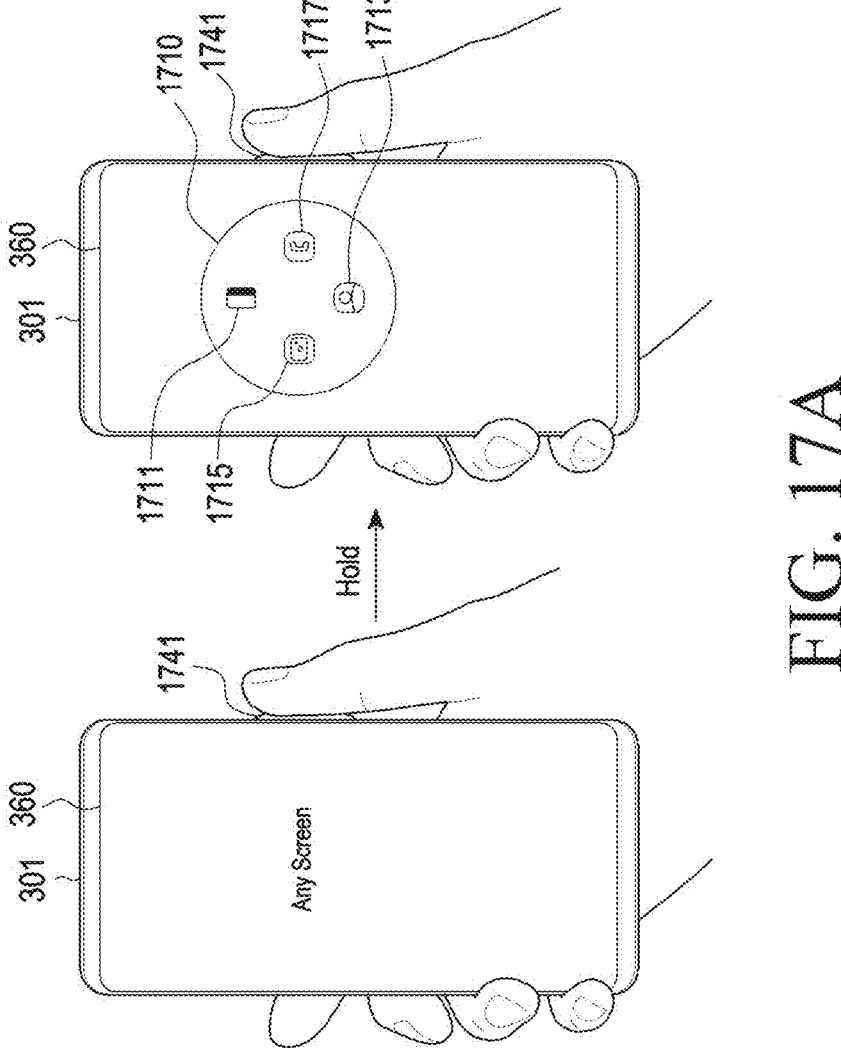
FIG. 17A is a diagram illustrating an example of receiving a first input for fingerprint recognition using a physical key according to an embodiment of the disclosure.

FIG. 17A is a diagram illustrating an example of receiving a first input for fingerprint recognition using a physical key according to an embodiment of the disclosure.

Referring to FIG. 17A, a processor (e.g., the processor 120 in FIG. 1 or the processor 320 in FIG. 3) of an electronic device 301 (e.g., the electronic device 101 in FIG. 1 or the electronic device 200 in FIGS. 2A and 2B) according to an embodiment may display a screen (e.g., any screen) corresponding to the current state on the reduced display 360 in the display contraction state. For example, the processor 320 is displaying a running application screen when the application is running, displaying a home screen in the home screen state, displaying a lock screen in the locked state, or displaying a standby screen in the standby state. In addition, the processor 320 may be displaying various screens according to the current state of the electronic device 301.

The processor 320 of the electronic device 301 according to an embodiment may receive a first input (e.g., a touch input or a long-touch input) for fingerprint recognition through a physical key 1741 (e.g., the key input device 241 in FIGS. 2A and 2B) provided on at least one side (e.g., side surface) of the electronic device 301 in the display contraction state. The processor 320 of the electronic device 301 according to an embodiment may identify the display contraction state as the first state (e.g., current state) of the electronic device 301, recognize a fingerprint corresponding to the first input through the fingerprint sensor in the display contraction state, and perform user authentication using the recognized fingerprint. The processor 320 of the electronic device 301 according to an embodiment, based on the success in user authentication through fingerprint recognition based on the first input, may display a user interface 1710 including at least one menu available for execution request using a second input while the first input is being held. For example, the user interface 1710 including at least one menu is of a pop-up window (or pop-up menu) type. For example, the user interface 1710 including at least one menu may include at least one shortcut menu or function icon (or specified function icon). The processor 320 according to an embodiment may stop displaying the user interface 1710 including at least one menu if the first input is not held. For example, a display expansion function icon 1711, an unlock function icon 1713, a camera function (or application) icon 1715, or the phone function (or application) icon 1717 are respectively selected for execution request using a second input (e.g., an additional input or a different type of input from the first input) that is further input while the first input is being held. For example, the second input may include a tilt-up, -down, -left, or -light input, a swipe-up, -down, -left, or -right input, an input of movement of a face subject to face recognition in the upward, downward, left, or right direction, or an input of movement of an iris (or eye) subject to iris recognition in the upward, downward, left, or right direction.

Figure 17B:
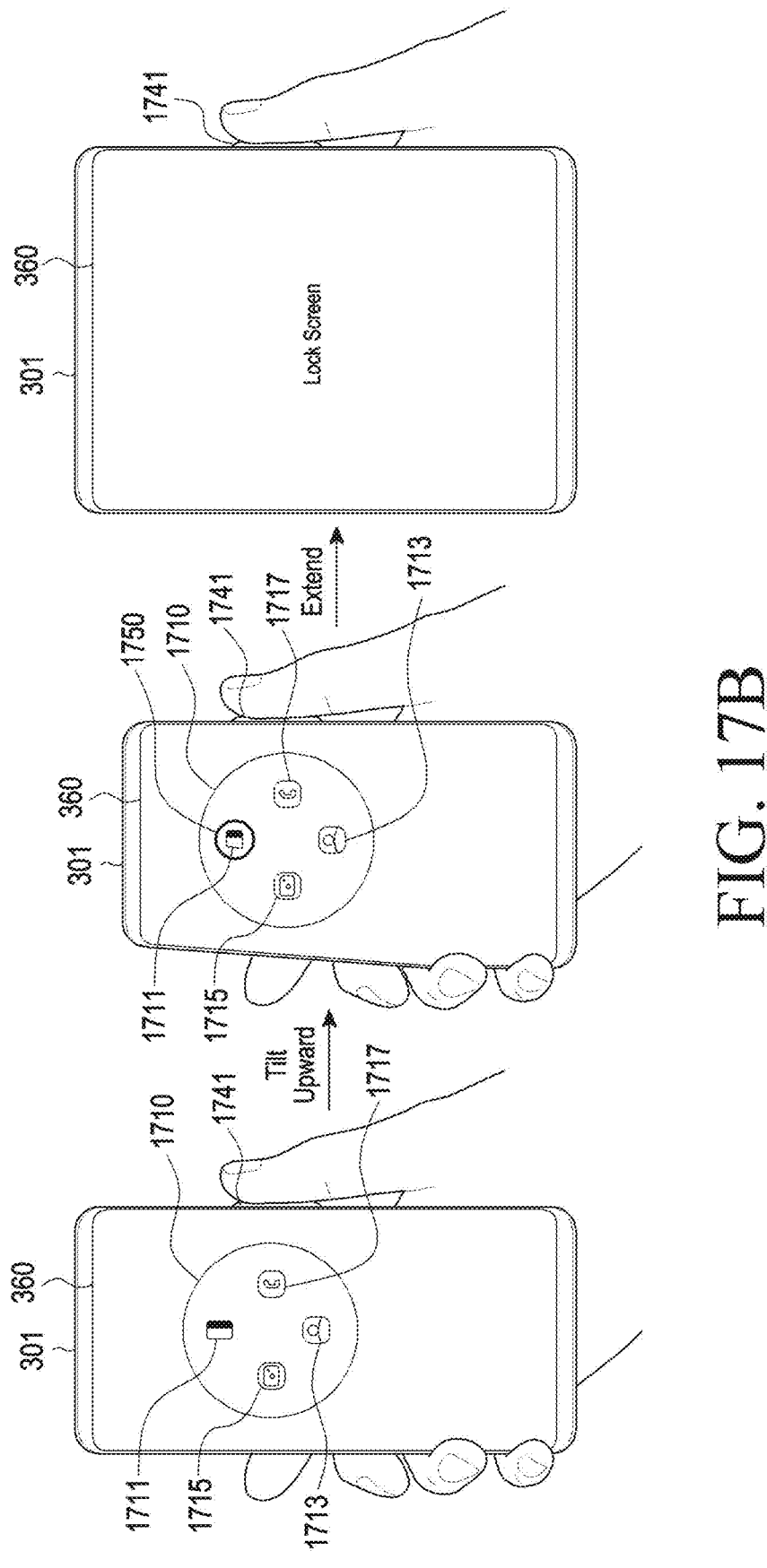
FIG. 17B is a diagram illustrating the case where a second input for tilting up an electronic device is received while holding a first input for fingerprint recognition on a physical key according to an embodiment of the disclosure.
Figure 17C:
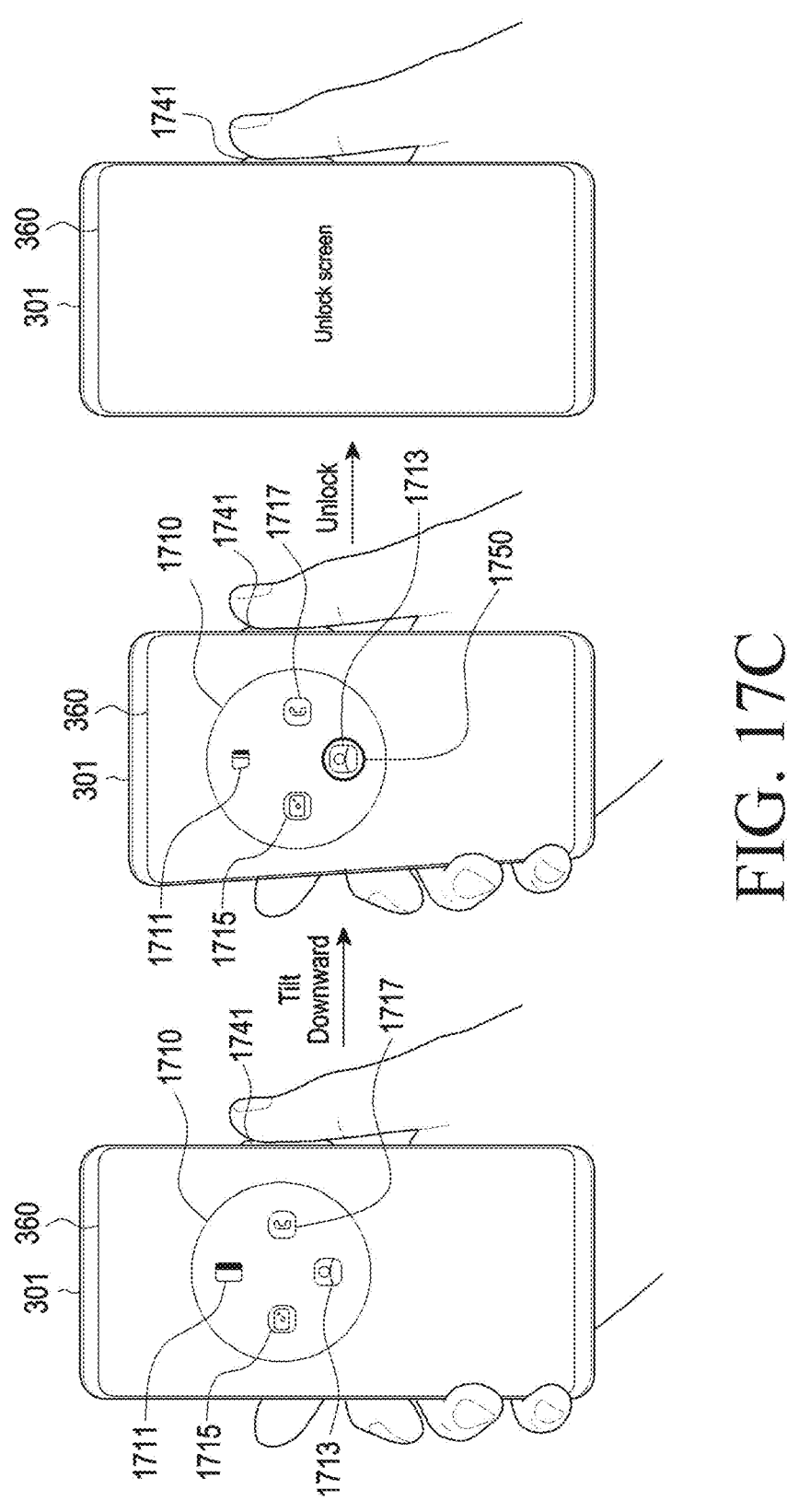
FIG. 17C is a diagram illustrating the case where a second input for tilting down an electronic device is received while holding a first input for fingerprint recognition on a physical key according to an embodiment of the disclosure.

FIG. 17B is a diagram illustrating the case where a second input for tilting up an electronic device is received while holding a first input for fingerprint recognition on a physical key according to an embodiment of the disclosure. FIG. 17C is a diagram illustrating the case where a second input for tilting down an electronic device is received while holding a first input for fingerprint recognition on a physical key according to an embodiment of the disclosure.

Referring to FIG. 17B, the processor 230 according to an embodiment may identify reception of a second input for tilting the electronic device 301 (lower portion of the electronic device 301) upwards at a specified angle or more in the +Z-axis direction through the gyro sensor during the display of a user interface 1710 including at least one menu, based on a first input being held, after successful user authentication through fingerprint recognition using the first input onto a physical key (e.g., a side key) in the display contraction and locked state. If a second input for tilting the electronic device 301 (lower portion of the electronic device 301) upwards in the +Z-axis direction is received while displaying the user interface 1710 including at least one menu, the processor 320 according to an embodiment may display an indication 1750 indicating the tilt-up state depending on a tilt-up angle. If a second input for tilting the electronic device 301 (lower portion of the electronic device 301) upwards at a specified angle or more in the +Z-axis direction is received while displaying the user interface 1710 including at least one menu, based on a first input being held, after successful user authentication through fingerprint recognition using the first input, the processor 320 according to an embodiment may identify an execution request for the display expansion function icon 1711. The processor 320 according to an embodiment may perform a display expansion function (extend the display), based on the identification of the execution request for the display expansion function icon 1711.

Referring to FIG. 17C, the processor 320 according to an embodiment may identify reception of a second input for tilting the electronic device 301 (lower portion of the electronic device 301) downwards at a specified angle or more in the −Z-axis direction (or for tilting the lower portion of the electronic device 301 downwards) through the gyro sensor during the display of a user interface 1710 including at least one menu, based on a first input being held, after successful user authentication through fingerprint recognition using the first input onto a physical key 1741 in the display contraction and locked state. If a second input for tilting the electronic device 301 (lower portion of the electronic device 301) downwards in the −Z-axis direction is received while displaying the user interface 1710 including at least one menu, the processor 320 according to an embodiment may display an indication 1750 indicating the tilt-down state depending on a tilt-down angle. If a second input for tilting the electronic device 301 (lower portion of the electronic device 301) downwards at a specified angle or more in the −Z-axis direction is received while displaying the user interface 1710 including at least one menu, based on a first input being held, after successful user authentication through fingerprint recognition using the first input, the processor 320 according to an embodiment may identify an execution request for the unlock function icon 1713. The processor 320 according to an embodiment, based on the identification of the execution request for the unlock function icon 1713, may perform an unlock function (unlock the screen).

Although the tilt-up and tilt-down inputs have been described by way of example in FIGS. 17A and 17B, a function for the tilt-left or tilt-right input and an icon corresponding thereto may also be performed in the same manner. For example, if a second input for tilting the electronic device 301 (right portion of the electronic device 301) to the left at a specified angle or more in the −X-axis direction (or for tilting the right portion of the electronic device 301 to the left) is received while a first input is being held during the display of a user interface 1710 including at least one menu after successful user authentication through fingerprint recognition using the first input onto the physical key 1741, the processor 320 may identify an execution request for the camera function icon 1715 and, based on the identification of the execution request for the camera function icon 1715, perform a camera function (or application). For example, if a second input for tilting the electronic device 301 (right portion of the electronic device 301) to the right at a specified angle or more in the +X-axis direction (or for tilting the right portion of the electronic device 301 to the right) is received during the display of a user interface 1010 including at least one menu after successful user authentication through fingerprint recognition using a first input onto the physical key 1741, the processor 320 may identify an execution request for the call function icon 1717 and, based on the identification of the execution request for the call function icon 1717, perform a call function (or application).

Figure 18A:
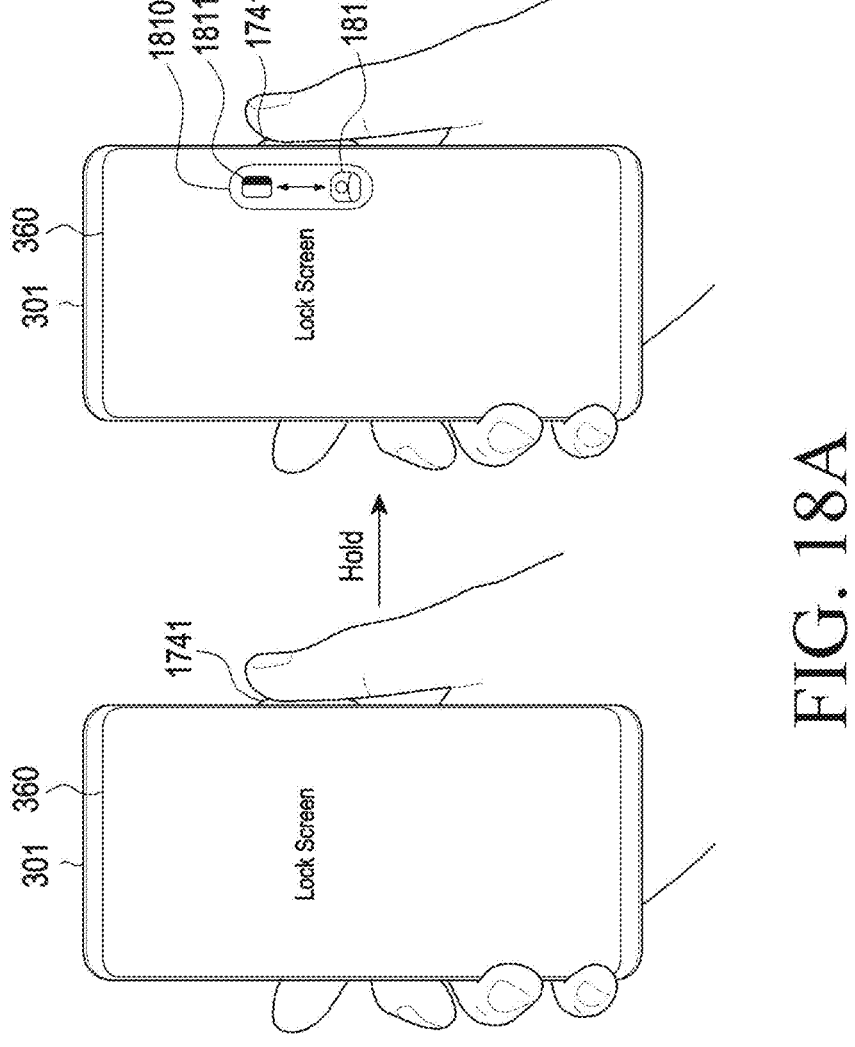
FIG. 18A is a diagram illustrating an example of displaying information indicating at least one specified function at a location adjacent to a physical key according to an embodiment of the disclosure.

FIG. 18A is a diagram illustrating an example of displaying a user interface including at least one menu at a position adjacent to a physical key according to an embodiment of the disclosure.

Referring to FIG. 18A, a processor (e.g., the processor 120 in FIG. 1 or the processor 320 in FIG. 3) of an electronic device 301 (e.g., the electronic device 101 in FIG. 1 or the electronic device 200 in FIGS. 2A and 2B) according to an embodiment, based on the successful user authentication through fingerprint recognition based on a first input, may display, at a position adjacent to the physical key 174, a user interface 1810 including at least one menu available for execution request using a second input while the first input is being held.

For example, the user interface 1810 including at least one menu is of a sliding bar type. For example, the user interface 1810 including at least one menu includes at least one shortcut menu or function icon 1811 or 1813. The processor

320 according to an embodiment may stop displaying the user interface 1810 including at least one menu if the first input is not held. For example, the display expansion function icon 1811 and the unlock function icon 1813 are respectively selected for execution request using a second input (e.g., a swipe-up or swipe-down input) while the first input is being held.

Figure 18B:
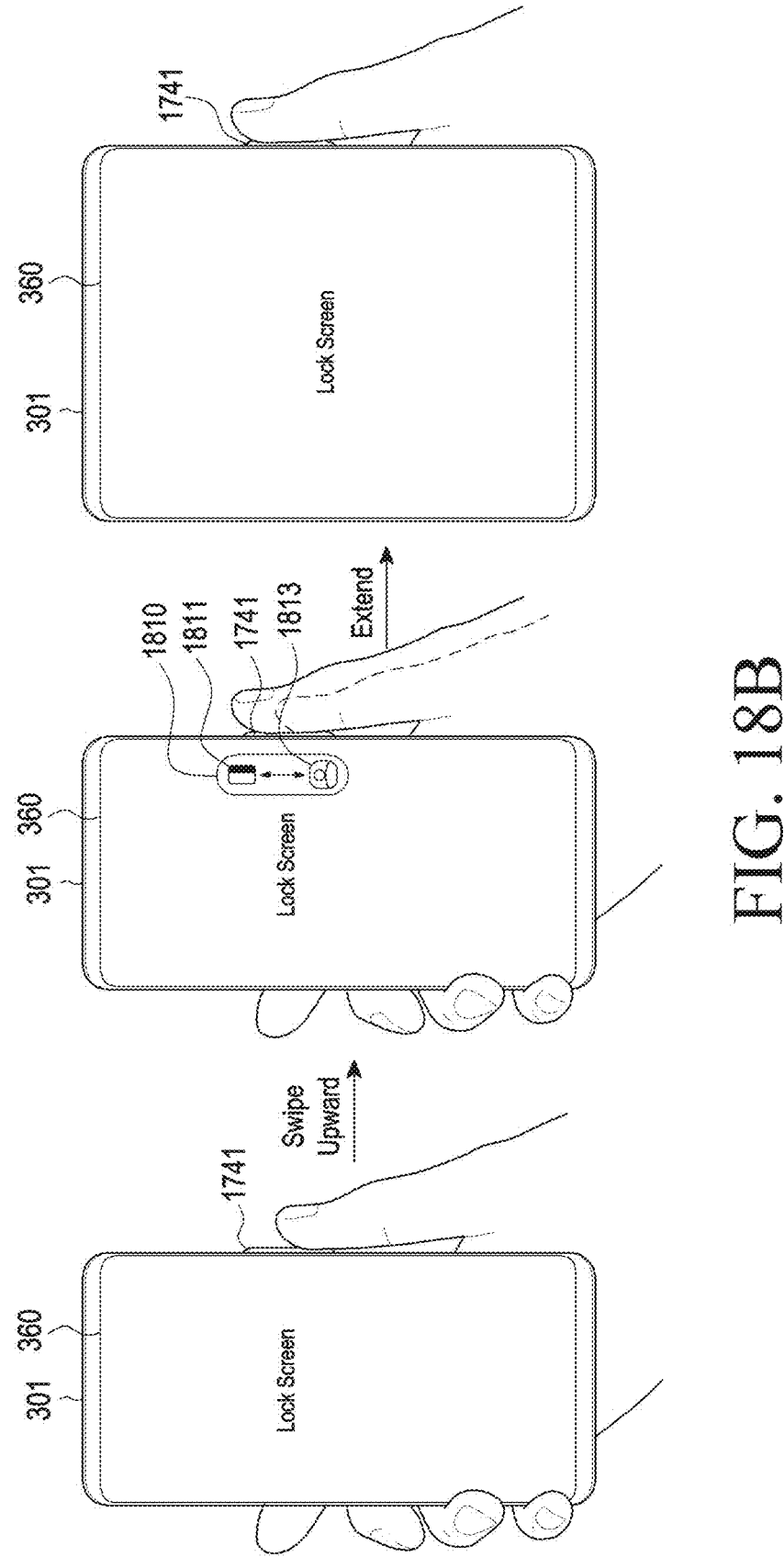
FIG. 18B is a diagram illustrating the case of receiving a second input of swiping up from a first input for fingerprint recognition onto a physical key according to an embodiment of the disclosure.

FIG. 18B is a diagram illustrating the case of receiving a second input of swiping up from a first input for fingerprint recognition onto a physical key according to an embodiment of the disclosure.

Figure 18C:
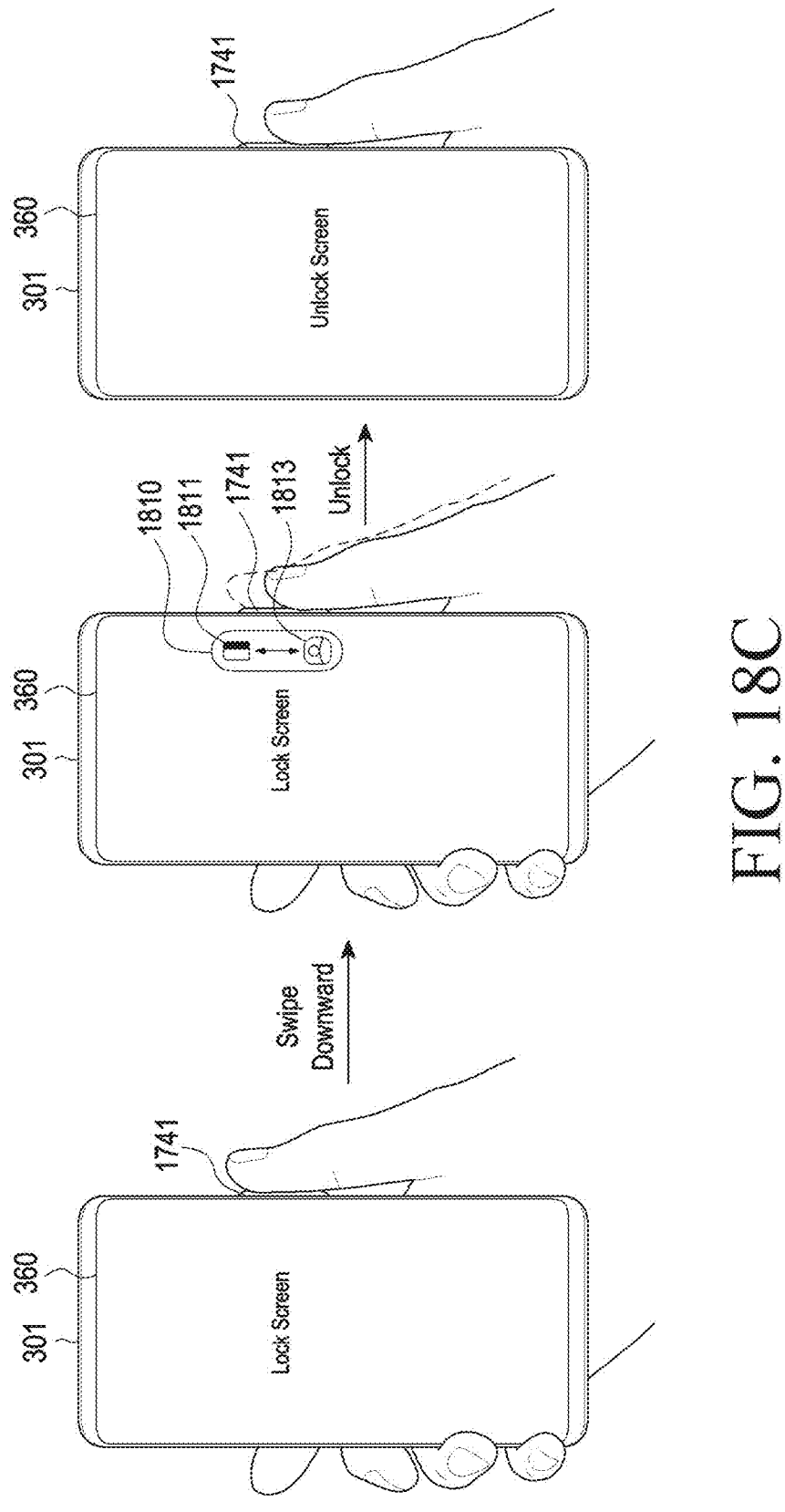
FIG. 18C is a diagram illustrating the case of receiving a second input of swiping down from a first input for fingerprint recognition onto a physical key according to an embodiment of the disclosure.

FIG. 18C is a diagram illustrating the case of receiving a second input of swiping down from a first input for fingerprint recognition onto a physical key according to an embodiment of the disclosure.

Referring to FIG. 18B, the processor 230 according to an embodiment, if a second input of swiping up is received while displaying a user interface 1810 including at least one menu, based on a first input being held, after successful user authentication through fingerprint recognition using the first input, may identify an execution request for a display expansion function icon 1811. The processor 320 according to an embodiment may perform a display expansion function (extend the display), based on the identification of the execution request for the display expansion function icon 1811.

Referring to FIG. 18C, the processor 320 according to an embodiment may identify reception of a second input of swiping down is received while displaying the user interface 1810 including at least one menu, based on a first input being held, after successful user authentication through fingerprint recognition using the first input onto the physical key 1741. If a second input of swiping down the electronic device 301 is received while displaying a user interface 1810 including at least one menu, based on a first input being held, after successful user authentication through fingerprint recognition using the first input, the processor 320 according to an embodiment may identify an execution request for an unlock function icon 1813. The processor 320 according to an embodiment may perform an unlock function (unlock the screen), based on the identification of the execution request for the unlock function icon 1813.

Figure 19:
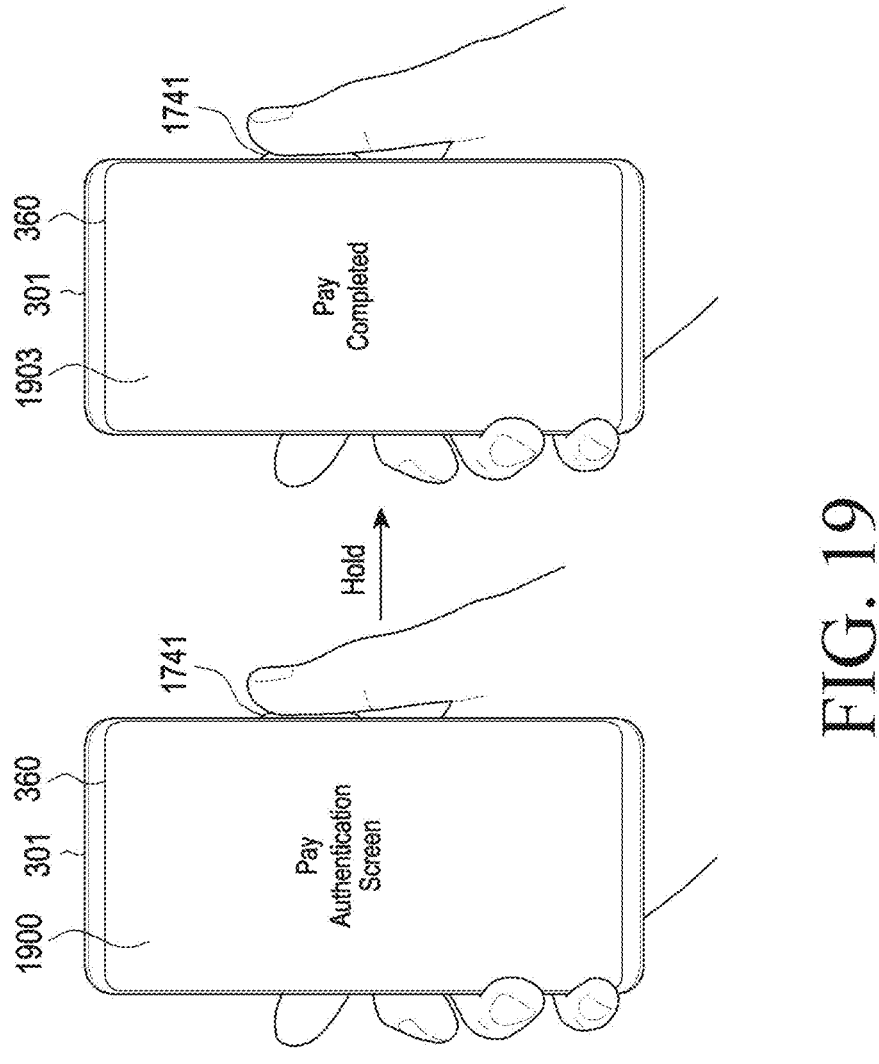
FIG. 19 is a diagram illustrating an example of a screen in the case where a first input for fingerprint recognition onto a physical key is an input requested by a user authentication-related application that is already running according to an embodiment of the disclosure.

FIG. 19 is a diagram illustrating an example of a screen in the case where a first input for fingerprint recognition onto a physical key is an input associated with user authentication in an application that is already running according to an embodiment of the disclosure.

Referring to FIG. 19, a processor (e.g., the processor 120 in FIG. 1 or the processor 320 in FIG. 3) of an electronic device 301 (e.g., the electronic device 101 in FIG. 1 or the electronic device 200 in FIGS. 2A and 2B) according to an embodiment, upon receiving a first input for fingerprint recognition through the physical key 1741, may identify whether or not the first input is an input associated with user authentication (e.g., a pay authentication screen) 1900 in an application that is already running. If the first input for fingerprint recognition is an input associated with user authentication 1900 in an application that is already running, the processor 320 according to an embodiment may perform user authentication of the running application, instead of displaying a user interface including at least one menu available for execution request using a second input. The processor 320 according to an embodiment, based on the completion of user authentication of the application that is already running, may display a user authentication completion screen (e.g., a pay completion screen) 1903 on the display 360.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to various embodiments, there may be provided a non-volatile storage medium storing instructions configured to cause, when executed by at least one processor, the at least one processor to perform at least one operation, wherein the at least one operation may include receiving a first input for recognizing biometric information through at least one biometric recognition sensor, identifying, in response to the first input, whether or not the first input is an input associated with user authentication in a running application, performing, in response to the first input not being an input associated with user authentication in the running application, user authentication associated with a state of the electronic device, based on success in the user authentication, displaying, on a display, a user interface comprising at least one menu available for execution request by receiving a second input while the first input is being held, and performing a function corresponding to a menu selected using the user interface, based on receiving the second input while the first input is being held.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
a housing;
a flexible display;
a slide driver configured to slide the flexible display in an expansion direction or a contraction direction, wherein the flexible display is configured to be in an expansion state where at least a portion of the flexible display is exposed to a front face of the electronic device or in a contraction state where the portion is not exposed to the front face of the electronic device by moving in the expansion direction or the contraction direction with respect to the housing by the slide driver;
one or more sensors comprising at least one biometric recognition sensor;

memory storing one or more computer programs; and
one or more processors communicatively coupled to the flexible display, the one or more sensors and the memory,
wherein the one or more computer programs include computer-executable instructions that, when executed by the one or more processors, cause the electronic device to:
receive a first input for recognizing biometric information through the at least one biometric recognition sensor in a locked state,
based on success of a user authentication as result of the recognizing biometric information, display, on the flexible display, a user interface comprising at least one menu to receive a second input while the first input is being held, wherein the at least one menu comprises one of a display expansion menu or a display contraction menu, and
when the second input, corresponding to one of the display expansion menu or the display contraction menu, is received while the first input is being held, control the slide driver to slide the flexible display in the expansion direction or the contraction direction.

2. The electronic device of claim 1,
wherein the one or more computer programs further include computer-executable instructions that, when executed by the one or more processors, cause the electronic device to display the user interface in proximity to the first input.

3. The electronic device of claim 2, further comprising:
wherein the one or more computer programs further include computer-executable instructions that, when executed by the one or more processors, cause the electronic device to:
display the user interface comprising the display expansion menu for switching from the display contraction state to the display expansion state when the electronic device is in the display contraction state, and
display the user interface comprising the display contraction menu for switching from the display expansion state to the display contraction state when the electronic device is in the display expansion state.

4. The electronic device of claim 1, wherein the one or more computer programs further include computer-executable instructions that, when executed by the one or more processors, cause the electronic device to display, when the electronic device is in the locked state, the user interface comprising an unlock menu for switching the locked state to the unlocked state.

5. The electronic device of claim 2, wherein the one or more computer programs further include computer-executable instructions that, when executed by the one or more processors, cause the electronic device to display, when the electronic device is in the specified-application deactivation state, the user interface comprising a specified-application execution menu for switching the specified-application deactivation state to the specified-application activation state.

6. The electronic device of claim 1,
wherein the at least one biometric recognition sensor comprises at least one of a fingerprint sensor, a face recognition sensor, or an iris sensor, and wherein the first input for recognizing biometric information comprises at least one of a fingerprint input, a face input, or an iris input.

7. The electronic device of claim 1, wherein the second input comprises an input corresponding to a direction of tilting of at least a portion of the electronic device and obtained through a gyro sensor, a swipe input on the display, an input corresponding to a direction of moving of a face subject to face recognition and obtained through the at least one biometric recognition sensor, or an input corresponding to a direction of moving of an iris subject to iris recognition and obtained through the at least one biometric recognition sensor.

8. The electronic device of claim 1, wherein the one or more computer programs further include computer-executable instructions that, when executed by the one or more processors, cause the electronic device to, when the at least one menu comprises a plurality of menus, display, through the flexible display, the plurality of menus so as to surround the first input.

9. A user interface method performed by an electronic device using biometric recognition, the user interface method comprising:

receiving, by the electronic device, a first input for recognizing biometric information through at least one biometric recognition sensor in a locked state;

based on success of a user authentication as result of the recognizing biometric information, displaying, by the electronic device, on a display, a user interface comprising at least one menu to receive a second input while the first input is being held, wherein the at least one menu comprises one of a display expansion menu or a display contraction menu; and when the second input, corresponding to one of the display expansion menu or the display contraction menu, is received while the first input is being held, control a slide driver of the electronic device to slide a flexible display of the electronic device in a expansion direction or a contraction direction.

10. The method of claim 9, further comprising:

displaying, through the flexible display, the user interface in proximity to the first input.

11. The method of claim 10, wherein the flexible display is in an expansion state where at least a portion of inside of a housing is exposed to a front face of the electronic device or in a contraction state where the at least the portion is not exposed to the front face of the electronic device by moving in an expansion direction or a contraction direction with respect to the housing by the slide driver.

12. The method of claim 11, further comprising:

displaying the user interface comprising the display expansion menu for switching from the display contraction state to the display expansion state when the electronic device is in the display contraction state; and displaying the user interface comprising the display contraction menu for switching from the display expansion state to the display contraction state when the electronic device is in the display expansion state.

13. The method of claim 10, further comprising:

displaying, when the electronic device is in the locked state, the user interface comprising an unlock menu for switching the locked state to the unlocked state.

14. The method of claim 10, further comprising:

displaying, when the electronic device is in the specified-application deactivation state, the user interface comprising a specified-application execution menu for switching the specified-application deactivation state to the specified-application activation state.

15. The method of claim 9, wherein the at least one biometric recognition sensor comprises at least one of a fingerprint sensor, a face recognition sensor, or an iris sensor, and wherein the first input for recognizing biometric information comprises at least one of a fingerprint input, a face input, or an iris input.

16. The method of claim 9, wherein the second input comprises an input corresponding to a direction of tilting of at least a portion of the electronic device and obtained through a gyro sensor, a swipe input on the display, an input corresponding to a direction of moving of a face subject to face recognition and obtained through the at least one biometric recognition sensor, or an input corresponding to a direction of moving of an iris subject to iris recognition and obtained through the at least one biometric recognition sensor.

17. The method of claim 9, further comprising:

performing the user authentication associated with the locked state of the electronic device by recognizing at least one of a fingerprint input, a face input, and an iris input using at least one of a fingerprint sensor, a face recognition sensor, or an iris sensor.

18. The method of claim 9, further comprising:

when the at least one menu comprises a plurality of menus, displaying, through the flexible display, the plurality of menus so as to surround the first input.

19. One or more non-transitory computer-readable storage media storing one or more computer programs including computer-executable instructions that, when executed by one or more processors of an electronic device, cause the electronic device to perform operations, the operations comprising:

receiving, by the electronic device, a first input for recognizing biometric information through at least one biometric recognition sensor in a locked state;

based on success of a user authentication as result of the recognizing biometric information, displaying, by the electronic device, on a display, a user interface comprising at least one menu to receive a second input while the first input is being held, wherein the at least one menu comprises one of a display expansion menu or a display contraction menu; and when the second input, corresponding to one of the display expansion menu or the display contraction menu, is received while the first input is being held, control a slide driver of the electronic device to slide a flexible display of the electronic device in a expansion direction or a contraction direction.

20. The one or more non-transitory computer-readable storage media of claim 19, wherein the first input for recognizing biometric information comprises at least one of a fingerprint input, a face input, or an iris input, wherein the operations further comprise performing the user authentication by recognizing at least one of the fingerprint input, the face input, or the iris input using at least one of a fingerprint sensor, a face recognition sensor, or an iris sensor, and wherein the second input comprises an input corresponding to a direction of tilting of at least a portion of the electronic device and obtained through a gyro sensor, a swipe input on the display, an input corresponding to a direction of moving of a face subject to face recognition and obtained through the at least one biometric recognition sensor, or an input corresponding to a direction of moving of an iris subject to iris recognition and obtained through the at least one biometric recognition sensor.

* * * * *